United States Patent
Brewster et al.

(10) Patent No.: US 11,461,304 B2
(45) Date of Patent: *Oct. 4, 2022

(54) SIGNATURE-BASED CACHE OPTIMIZATION FOR DATA PREPARATION

(71) Applicant: DataRobot, Inc., Boston, MA (US)

(72) Inventors: Dave Brewster, Redwood City, CA (US); Victor Tze-Yeuan Tso, Redwood, CA (US)

(73) Assignee: DataRobot, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/814,134

(22) Filed: Mar. 10, 2020

(65) Prior Publication Data
US 2020/0210399 A1 Jul. 2, 2020

Related U.S. Application Data

(63) Continuation of application No. 14/883,582, filed on Oct. 14, 2015, now Pat. No. 10,642,814.

(51) Int. Cl.
*G06F 16/00* (2019.01)
*G06F 16/23* (2019.01)
(Continued)

(52) U.S. Cl.
CPC ............ *G06F 16/23* (2019.01); *G06F 16/217* (2019.01); *G06F 16/2282* (2019.01);
(Continued)

(58) Field of Classification Search
CPC .... G06F 16/217; G06F 16/2282; G06F 16/23; G06F 16/2379; G06F 16/24524;
(Continued)

(56) References Cited

U.S. PATENT DOCUMENTS

| | | |
|---|---|---|
| 7,082,454 B1 | 7/2006 | Gheith |
| 8,244,741 B2 | 8/2012 | Wolge |

(Continued)

FOREIGN PATENT DOCUMENTS

| | | |
|---|---|---|
| EP | 2790113 | 10/2014 |
| JP | 113340 | 1/1999 |

(Continued)

OTHER PUBLICATIONS

Anonymous, "Spark Programming Guide—Spark 1.2.0 Documentation", Oct. 11, 2015 (Oct. 11, 2015). XP055554350. Retrieved from the Internet: URL: https://web.archive.org/web/20151011083922/ https://spark.apache.org/docs/1.2.0/programming-guide.html [retrieved on Feb. 8, 2019].

(Continued)

*Primary Examiner* — Dinku W Gebresenbet
(74) *Attorney, Agent, or Firm* — Foley & Lardner LLP

(57) ABSTRACT

Signature-based cache optimization for data preparation includes: performing a first set of sequenced data preparation operations on one or more sets of data to generate a plurality of transformation results; caching one or more of the plurality of transformation results and one or more corresponding operation signatures, a cached operation signature being derived based at least in part on a subset of sequenced operations that generated a corresponding result; receiving a specification of a second set of sequenced operations; determining an operation signature associated with the second set of sequenced operations; identifying a cached result among the cached results based at least in part on the determined operation signature; and outputting the cached result.

21 Claims, 39 Drawing Sheets

(51) Int. Cl.
*G06F 16/248* (2019.01)
*G06F 16/2453* (2019.01)
*G06F 16/21* (2019.01)
*G06F 16/22* (2019.01)

(52) U.S. Cl.
CPC ........ *G06F 16/2379* (2019.01); *G06F 16/248* (2019.01); *G06F 16/24539* (2019.01)

(58) Field of Classification Search
CPC .......... G06F 16/24539; G06F 16/2455; G06F 16/248; G06F 3/0482; G06F 40/157; G06F 40/18; G06F 9/445; G06F 9/4494
See application file for complete search history.

(56) References Cited

U.S. PATENT DOCUMENTS

| | | |
|---|---|---|
| 2003/0130991 A1 | 7/2003 | Reijerse |
| 2005/0240570 A1* | 10/2005 | Ozbutun ............ G06F 16/24539 |
| 2006/0184656 A1 | 8/2006 | Roddy |
| 2007/0157188 A1 | 7/2007 | Jourdan |
| 2011/0145307 A1 | 6/2011 | Ananthanarayanan |
| 2013/0086662 A1 | 4/2013 | Roth |
| 2013/0097150 A1* | 4/2013 | Cushing ................ G06F 16/283 707/718 |
| 2014/0006717 A1 | 1/2014 | Steely, Jr. |
| 2014/0075285 A1* | 3/2014 | Di Blas ................ G06F 40/143 715/234 |
| 2015/0106827 A1 | 4/2015 | Fiedel |
| 2015/0370853 A1* | 12/2015 | Lee ..................... G06F 16/2453 707/718 |

FOREIGN PATENT DOCUMENTS

| | | |
|---|---|---|
| JP | 2007-534087 A | 11/2007 |
| JP | 2010-027058 A | 2/2010 |
| WO | 2005106717 | 11/2005 |

OTHER PUBLICATIONS

Muller Stephan et al, "Aggregates Caching in Columnar In-Memory Databases", Jan. 14, 2015 (Jan. 14, 2015) International Conference On Simulation, Modeling, And Programming For Autonomous Robots Simpar 2010; [Lecture Notes In Computer Science; Lect. Notes Computer], Springer, Berlin. Heidelberg. pp. 69-81. XP047338014. ISBN: 978-3-642-17318-9.
Communication on EP Appl. Ser. No. 16855900.3 dated Jun. 16, 2020 (5 pages).
Extended European Search Report on EP Appl. Ser. No. 16855900.3 dated Feb. 20, 2019 (8 pages).
Final Office Action on U.S. Appl. No. 14/883,582 dated Jan. 28, 2019 (18 pages).
International Preliminary Report on Patentability on PCT Appl. Ser. No. PCT/US2016/049313 dated Apr. 17, 2018 (11 pages).
International Search Report and Written Opinion on PCT Appl. Ser. No. PCT/US2016/049313 dated Nov. 4, 2016 (12 pages).
Non-Final Office Action on U.S. Appl. No. 14/883,582 dated Aug. 8, 2019 (17 pages).
Non-Final Office Action on U.S. Appl. No. 14/883,582 dated Jun. 29, 2018 (19 pages).
Notice of Allowance on U.S. Appl. No. 14/883,582 dated Dec. 16, 2019 (8 pages).
Notice of Reasons for Refusal on JP Appl. Ser. No. 2018-519829 dated May 14, 2019 (12 pages).

* cited by examiner

DS1 Pipeline (After Import Step)

Part 0

| DS1.part0.Refs_Table |
|---|
| (0,0) |
| (0,1) |

| DS1.part0.Reference_Stack | |
|---|---|
| import_ds1 | C00  C10 |

Part 1

| DS1.part1.Refs_Table |
|---|
| (1,0) |
| (1,1) |

| DS1.part1.Reference_Stack | |
|---|---|
| import_ds1 | C00  C10 |

DS2 Pipeline (After Import Step then LC on C11)

Part 0

| DS2.part0.Refs_Table |
|---|
| (0,0) |

| DS2.part0.Reference_Stack | |
|---|---|
| LC_ds2.C11_import_ds2 | C11 |
| import_ds2 | C01 |

File Set written by DS2.Part0 - "LC_ds2.C11_import_ds2_p0"
Lookup Table

| Row_ID | C11_idx |
|---|---|
| (0,0) | 0 |

| C11_file |
|---|
| a |

Part 1

| DS2.part1.Refs_Table |
|---|
| (1,0) |

| DS2.part1.Reference_Stack | |
|---|---|
| LC_ds2.C11_import_ds2 | C11 |
| import_ds2 | C01 |

File Set written by DS2.Part1 - "LC_ds2.C11_import_ds2_p1"
Lookup Table

| Row_ID | C11_idx |
|---|---|
| (1,0) | 0 |

| C11_file |
|---|
| b |

Part 2

| DS2.part2.Refs_Table |
|---|
| (2,0) |

| DS2.part2.Reference_Stack | |
|---|---|
| LC_ds2.C11_import_ds2 | C11 |
| import_ds2 | C01 |

File Set written by DS2.Part2 - "LC_ds2.C11_import_ds2_p2"
Lookup Table

| Row_ID | C11_idx |
|---|---|
| (2,0) | 0 |

| C11_file |
|---|
| c |

DS1 Pipeline (After import Step)

Part 0

| DS1.part0.Refs_Table | DS1.part0.Reference_Stack | | |
|---|---|---|---|
| (0,0) | | C00 | C10 |
| (0,1) | import_ds1 | | |

Part 1

| DS1.part1.Refs_Table | DS1.part1.Reference_Stack | | |
|---|---|---|---|
| (1,0) | | C00 | C10 |
| (1,1) | import_ds1 | | |

DS2 Pipeline (After import Step then LC on C11)

Part 0

| DS2.part0.Refs_Table | DS2.part0.Reference_Stack | |
|---|---|---|
| (0,0) | LC_ds2.C11_import_ds2 | C11 |
| | import_ds2 | C01 |

Part 1

| DS2.part1.Refs_Table | DS2.part1.Reference_Stack | |
|---|---|---|
| (1,0) | LC_ds2.C11_import_ds2 | C11 |
| | import_ds2 | C01 |

Part 2

| DS2.part2.Refs_Table | DS2.part2.Reference_Stack | |
|---|---|---|
| (2,0) | LC_ds2.C11_import_ds2 | C11 |
| | import_ds2 | C01 |

FIG. 11H

Project Pipeline

Part 0

| Proj.part0.Refs_Table | Proj.part0.Reference_Stack | | |
|---|---|---|---|
| (0,0) | | C0 | C1 |
| (0,1) | import_ds1 | | |

Part 1

| Proj.part1.Refs_Table | Proj.part1.Reference_Stack | | |
|---|---|---|---|
| (1,0) | | C0 | C1 |
| (1,1) | import_ds1 | | |

Part 2

| Proj.part2.Refs_Table | Proj.part2.Reference_Stack | |
|---|---|---|
| (0,0) | LC_ds2.C11_import_ds2 | C1 |
| | import_ds2 | C0 |

Part 3

| Proj.part3.Refs_Table | Proj.part3.Reference_Stack | |
|---|---|---|
| (1,0) | LC_ds2.C11_import_ds2 | C1 |
| | import_ds2 | C0 |

Part 4

| Proj.part4.Refs_Table | Proj.part4.Reference_Stack | |
|---|---|---|
| (2,0) | LC_ds2.C11_import_ds2 | C1 |
| | import_ds2 | C0 |

Step 9 (Append results of step 4 and results of step 8)

Project Part 0

| PROJ.P0.REFS_TABLE | |
|---|---|
| (1,0) | (0,0) |
| (0,0) | (0,1) |

| PROJ.P0.REF_STACK | | |
|---|---|---|
| import_ds2 | B | J2 |
| import_ds1 | A | J1 |

Project Part 1

| PROJ.P1.REFS_TABLE | |
|---|---|
| ∅ | (1,0) |
| (1,1) | (1,1) |

| PROJ.P1.REF_STACK | | |
|---|---|---|
| import_ds2 | B | J2 |
| import_ds1 | A | J1 |

Project Part 2

| PROJ.P2.REFS_TABLE |
|---|
| ∅ |

| PROJ.P2.REF_STACK | | |
|---|---|---|
| import_ds2 | B | J2 |

Project Part 3

| PROJ.P3.REFS_TABLE |
|---|
| (1,2) |

| PROJ.P3.REF_STACK | | |
|---|---|---|
| import_ds2 | B | J2 |

FIG. 12E

DS1 Pipeline (As of Completion of Import stage in DS1 Pipeline)

Part 0

| Refs Table | | Reference Stack | |
|---|---|---|---|
| (0,0) | | Import_ds1 | A   J1 |
| (0,1) | | | |

Part 1

| Refs Table | | Reference Stack | |
|---|---|---|---|
| (1,0) | | Import_ds1 | A   J1 |
| (1,1) | | | |

DS2 Pipeline (As of Completion of Import stage in DS2 Pipeline)

Part 0

| Refs Table | | Reference Stack | |
|---|---|---|---|
| (0,0) | (0,0) | LC_DS2.J2 | J2 |
| | | Import_ds2 | B |

Part 1

| Refs Table | | Reference Stack | |
|---|---|---|---|
| (1,0) | (1,0) | LC_DS2.J2 | J2 |
| (1,1) | (1,1) | Import_ds2 | B |
| (1,2) | (1,2) | | |

FIG. 12F

Project Pipeline

Project Part 0

| PROJ.P0.REFS_TABLE | | |
|---|---|---|
| ∅ | ∅ | (0,0) |
| ∅ | ∅ | (0,1) |

| PROJ.P0.REF_STACK | |
|---|---|
| LC_ds2_J2 | J2 |
| import_ds2 | B _ |
| import_ds1 | A  J1 |

Project Part 1

| PROJ.P1.REFS_TABLE | | |
|---|---|---|
| ∅ | ∅ | (1,0) |
| ∅ | ∅ | (1,1) |

| PROJ.P1.REF_STACK | |
|---|---|
| LC_ds2_J2 | J2 |
| import_ds2 | B _ |
| import_ds1 | A  J1 |

Project Part 2

| PROJ.P2.REFS_TABLE | |
|---|---|
| (0,0) | (0,0) |

| PROJ.P2.REF_STACK | |
|---|---|
| LC_J2 | J2 |
| Import_ds2 | B _ |

Project Part 3

| PROJ.P3.REFS_TABLE | |
|---|---|
| (1,0) | (1,0) |
| (1,1) | (1,1) |
| (1,2) | (1,2) |

| PROJ.P3.REF_STACK | |
|---|---|
| LC_J2 | J2 |
| Import_ds2 | B _ |

SIGNATURE-BASED CACHE OPTIMIZATION FOR DATA PREPARATION

CROSS REFERENCE TO OTHER APPLICATIONS

This application is a continuation of co-pending U.S. patent application Ser. No. 14/883,582, entitled SIGNATURE-BASED CACHE OPTIMIZATION FOR DATA PREPARATION filed Oct. 14, 2015 which is incorporated herein by reference for all purposes.

BACKGROUND OF THE INVENTION

When evaluating data, operator-users often wish to try performing different operations on the data to see what different results might emerge. Typically, re-computation is performed on the data. For large scale web applications, which may have millions or even billions of records, this can be computationally intensive, which can lead to slow application response times.

BRIEF DESCRIPTION OF THE DRAWINGS

Various embodiments of the invention are disclosed in the following detailed description and the accompanying drawings.

FIG. 11F illustrates an example embodiment of partitions and data traversal programs.

FIG. 11G illustrates an example embodiment of data traversal programs prior to an append.

FIG. 11H illustrates an example embodiment of data traversal programs subsequent to an append.

FIG. 11I illustrates an example embodiment of data traversal programs and file sets.

FIGS. 12C-E illustrate an example embodiment of a process for performing a join.

FIG. 12F illustrates an example embodiment of data traversal programs prior to a join.

FIG. 12G illustrates an example embodiment of data traversal programs subsequent to a join.

FIGS. 15A-E illustrate example embodiments of user interfaces of a step editor.

DETAILED DESCRIPTION

Figure 1:
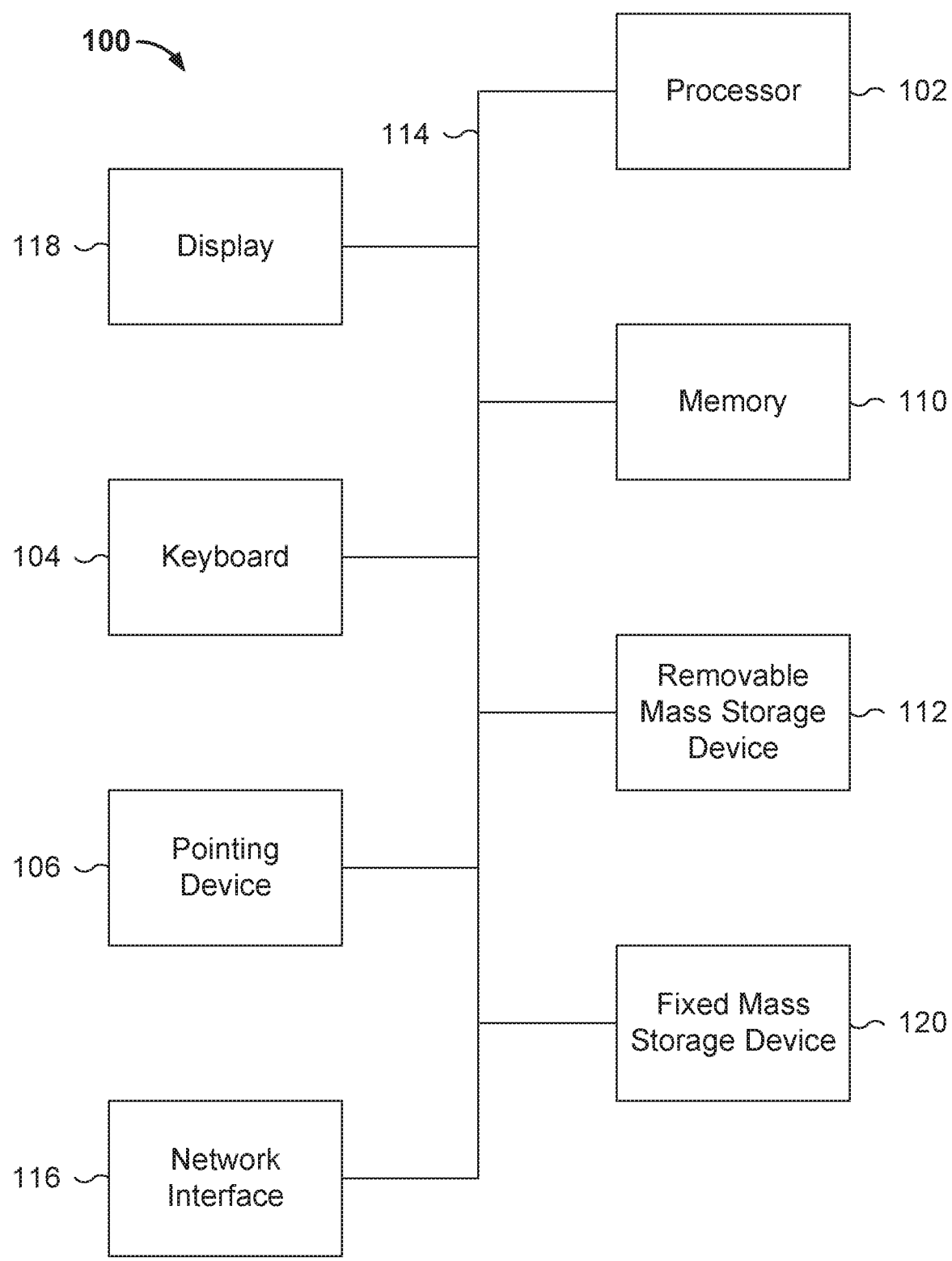
FIG. 1 is a functional diagram illustrating a programmed computer system for performing signature-based cache optimization for data preparation in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Using the techniques described herein, a distributed computing platform such as Apache Spark™ can be efficiently utilized to perform sequenced data preparation operations (i.e., a set of operations that are applied in sequential order) on data sets to generate transformation results. As used herein, a data preparation operation refers to an operation used to transform/mutate an input data. The input data is accessible dynamically upon execution of a set of sequenced operations, where the data is not necessarily stored, but may be computed on-the-fly, as needed. This is in contrast to operating against data stored at a fixed and known location, and is performed without the advantages of prior indexing and partitioning. The input data includes data that is organized (e.g., into rows and columns). Various examples of data preparation operations include clustering, joining, appending, sorting, uppercase, lowercase, filtering, deduplicating, grouping by, adding or removing columns, adding or removing rows, pivoting, depivoting, order dependent operations, etc. The representation of the transformation results is referred to herein as a "data traversal program," which indicates how to assemble one or more affected columns in the input data to derive a transformation result. The representation of the transformation results can be stored for reuse along with corresponding operation signatures, allowing cached results to be identified and obtained for reuse.

Cache optimization using signatures is disclosed. In some embodiments, a first set of sequenced data preparation operations on one or more sets of data to generate a plurality of transformation results is performed. One or more of the transformation results and corresponding operation signatures are stored. A stored operation signature is derived based at least in part on a subset of sequenced operations that generated a corresponding result. At a later time, when a specification of a second set of sequenced operations is received, an operation signature associated with the second set of sequenced operations is determined. A stored result is identified using the determined operation signature. The stored result is then outputted.

FIG. 1 is a functional diagram illustrating a programmed computer system for performing signature-based cache optimization for data preparation in accordance with some embodiments. As will be apparent, other computer system architectures and configurations can be used to perform automated join detection. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to provide pipeline server 206 of FIG. 2 and/or executes/performs process 500, 1300, 1400, and/or 1600.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data, and objects used by the processor 102 to perform its functions (e.g., programmed instructions). For example, memory 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storages 112, 120 generally store additional programming instructions, data, and the like that typically are not in active use by the processor 102. It will be appreciated that the information retained within mass storages 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing.

Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
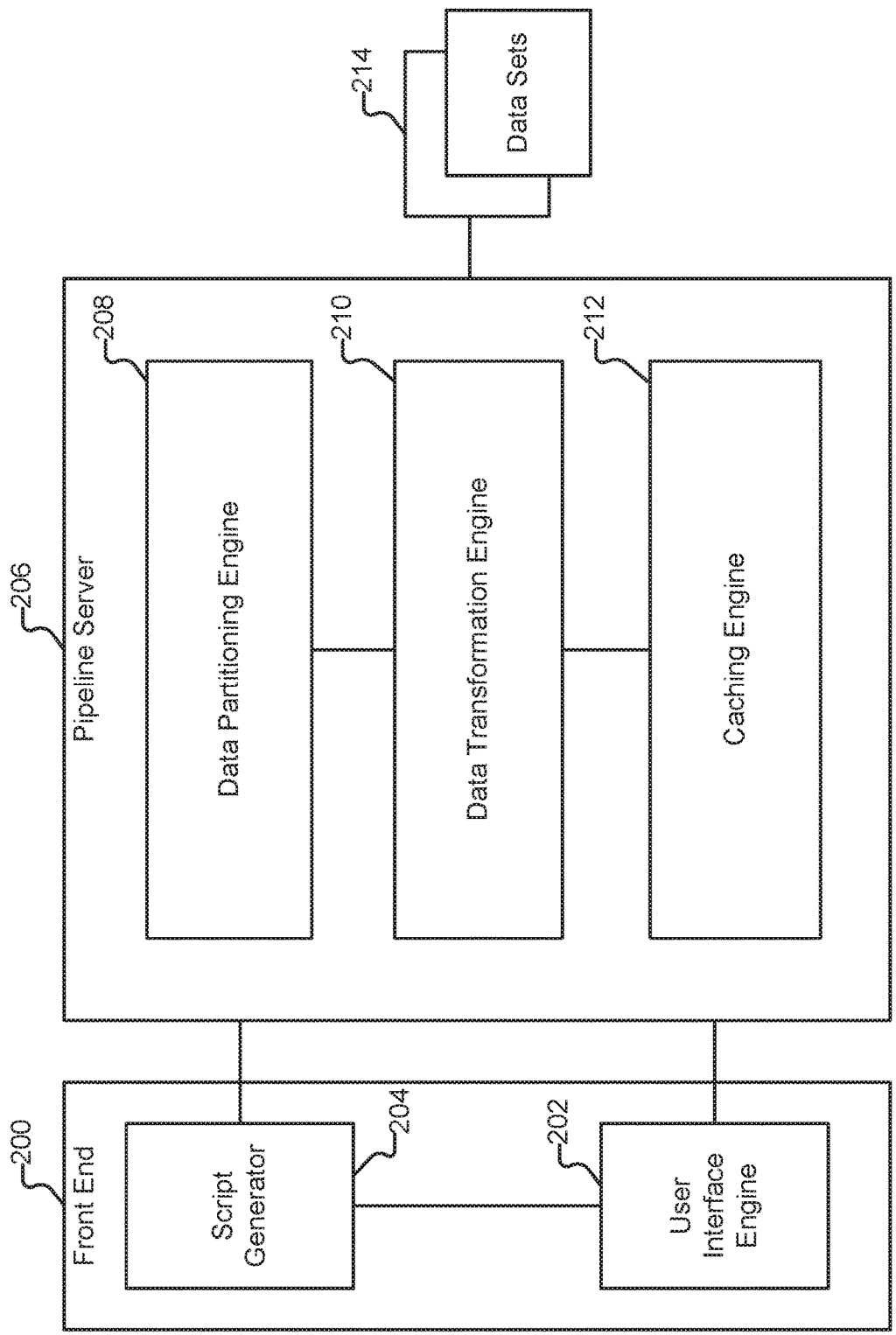
FIG. 2 is a system diagram illustrating an embodiment of a system for data preparation.

FIG. 2 is a system diagram illustrating an embodiment of a system for data preparation. The system includes front end 200 and pipeline server 206.

Front end 200 is configured to provide an interface for configuring data preparation. Front end 200 interacts with the pipeline server 206. In various embodiments, front end 200 can be implemented as a standalone application and/or a browser-based client application executing on a client device and communicating with the pipeline server, as a J2EE application server such as Tomcat or Jetty, or a combination thereof. Front end 200 includes user interface engine 202 and script generator 204.

User interface engine 202 is configured to interact with pipeline server 206 to present table data, configuration options, results of sequenced operations, and any other appropriate information to the user in user interface screens and receive user input from user interface components. For example, user interface engine 202 is configured to provide editor user interfaces by which users can specify a sequence of data preparation operations to be performed on one or more sets of data to generate one or more transformation results. The specified sequenced set of operations, which are to be applied in a specified order, forms a pipeline through which one or more sets of data are processed. The data sets include tables of data that include data records organized in rows and columns. Examples of user interfaces provided by user interface engine 202 are described in conjunction with FIGS. 15A-E.

Script generator 204 is configured to generate a script based on the data sets and sequence of operations specified by a user using the one more user interfaces provided by user interface engine 202. The script includes a formatted set of instructions that includes a specification of the one or more data sets to be operated on and the sequenced set of operations specified to be performed on the one or more data sets. In some embodiments, the pipeline specified in the script is referred to as an application. An example of a script generated using script generator 204 is described in conjunction with FIG. 6A.

Pipeline server 206 is configured to perform data preparation. In some embodiments, the pipeline server receives a script from script generator 204, and performs a sequenced set of data preparation operations (which form a pipeline) on one or more input data sets (e.g., data sets 214) according to the script. A data set can be stored in a memory (e.g., a random access memory), read or streamed from a storage (e.g., a local disk, a network storage, a distributed storage server, etc.), or obtained from any other appropriate sources. Pipeline server 206 can be implemented on one or more servers in a network-based/cloud-based environment, a client device (e.g., a computer, a smartphone, a wearable device, or other appropriate device with communication capabilities), or a combination. In some embodiments, the pipeline server is deployed as an application. The pipeline server can be implemented using a system such as 100. In some embodiments, the pipeline server is implemented using a distributed computing platform, such as Apache Spark™. While example embodiments involving Apache Spark™ are described below, any other distributed computing platform/architecture can be used, with the techniques described herein adapted accordingly. Pipeline server 206 includes data partitioning engine 208, data transformation engine 210, and caching engine 212.

Data partitioning engine 208 is configured to partition input data sets (e.g., data sets 214) and distribute them to a cluster of processing nodes in a distributed computing environment. In some embodiments, the data partitioning engine is configured to pre-process the input data so that it can be translated into a form that can be provided to a distributed computing platform such as Apache Spark™. Determining the distribution of the data in a data set includes determining how obtained data sets should be divided/partitioned into logical partitions/work portions, and includes determining how many partitions should be generated, as well as the load to assign each partition. In some embodiments, the partition determination is based on various cost functions. The operations of the data partitioning engine are described in greater detail below.

Data transformation engine 210 is configured to perform data preparation. Performing data preparation includes determining transformation results by performing a sequenced set of data preparation operations on one or more sets of data. In some embodiments, the data transformation engine is a columnar data transformation engine. In some embodiments, the data transformation engine is also configured to perform caching of results, as well as lookups of existing cached results for reuse.

As will be described below, the data transformation engine is configured to efficiently perform the sequenced data preparation operations by generating a compact representation (referred to herein as a "data traversal program") of the transformation results of a set of sequenced operations on one or more sets of data. The data traversal program includes references and reference stacks which, when used in conjunction with column files, indicate how to assemble one or more affected columns in the one or more sets of data that were operated on to derive a transformation result. The operations of the data transformation engine are described in greater detail below.

Caching engine 212 is configured to perform caching and cache identification. For example, the data traversal program/representation of the results determined using data transformation engine 210 can be cached at various points (e.g., after a particular subset of sequenced data preparation operations) for reuse. The data being cached can be stored in a cache layer, for example in memory (e.g., random access memory), stored on a local or networked storage device (e.g., a disk or a storage server), and/or any other appropriate devices. The results can be cached, for example, based on an explicit request from a user (e.g., via an interaction with a step editor user interface provided by user interface engine 202). The results can also be cached automatically, for example, based on factors such as the complexity of operations that were performed to arrive at the result. The cached representations can be identified based on corresponding signatures. For example, the caching engine can take as input a set of sequenced operations (e.g., received in a script generated from user input via step editor user interfaces provided by user interface engine 202), derive an operation signature, and compare it to the signatures associated with existing cached results. The operations of the caching engine are described in greater detail below.

Figure 3:
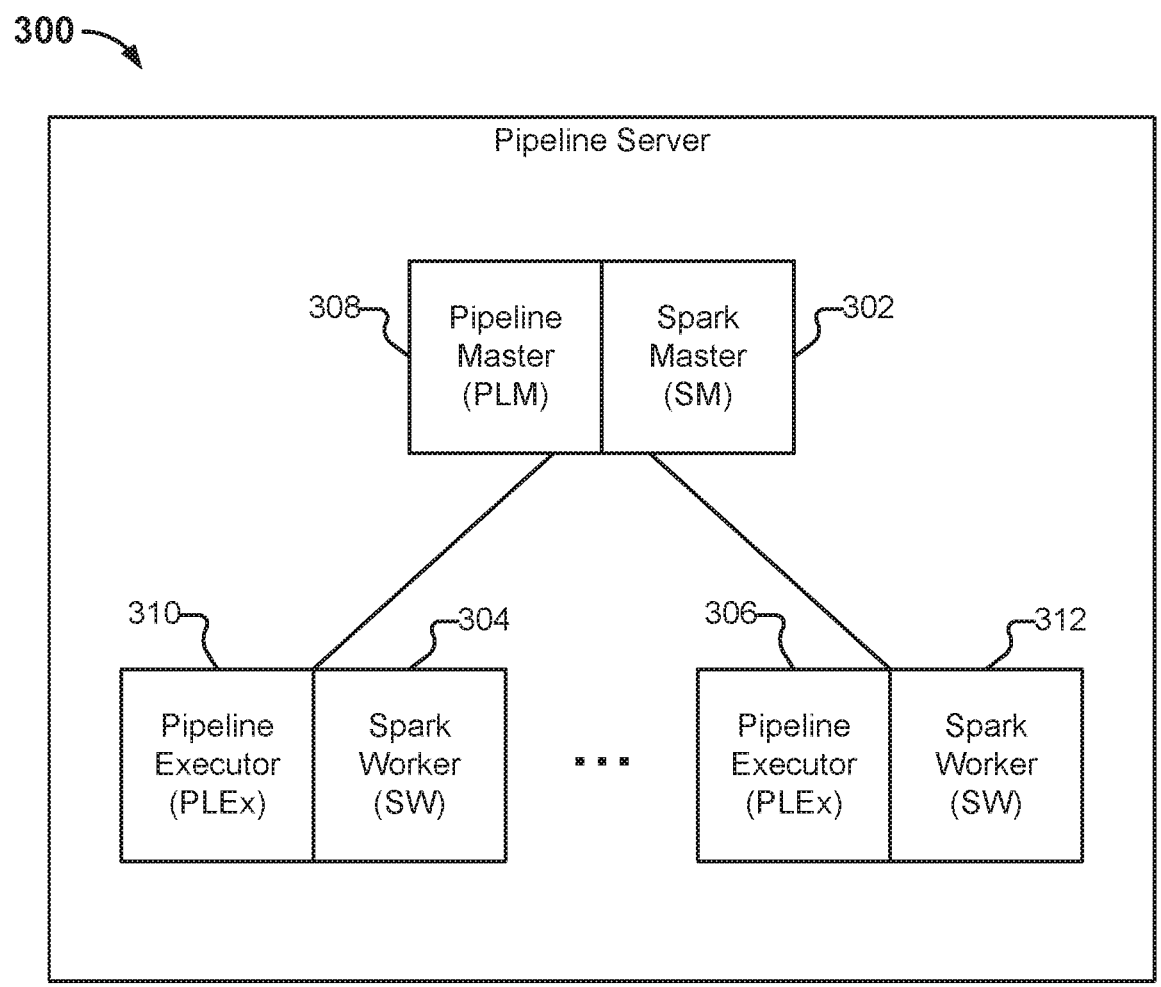
FIG. 3 is a system diagram illustrating an embodiment of a pipeline server.

FIG. 3 is a system diagram illustrating an embodiment of a pipeline server. In some embodiments, pipeline server 300 is an example of pipeline server 206 of FIG. 2. In this example, pipeline server 300 is implemented using a distributed computing platform. In some embodiments, the distributed computing platform of pipeline server 300 is used to implement data partitioning engine 208, data transformation engine 210, and caching engine 212 of FIG. 2.

Shown in pipeline server 300 is an example embodiment of a Spark cluster. The cluster includes a Spark master (302) and Spark workers (304 and 312). In some embodiments, the Spark cluster is implemented using a master-slave architecture. In some embodiments, the Spark master is configured to coordinate all work that is to be executed (in possibly a distributed manner). In some embodiments, the Spark workers are responsible for receiving and executing pieces of work that point at some data with instructions as to the operations to perform. The Spark master and workers can be implemented, for example, as Java applications.

In some embodiments, the Spark master is configured to receive requests (e.g., jobs) from external clients. The Spark master is configured to break down the job into smaller chunks (work portions) and distribute the work to the various Spark workers. When a Spark worker completes its portion of the work, it returns the results to the Spark master. Once all of the workers return their respective results, the Spark master compiles all of the worker results and returns the final result to the requesting client.

In some embodiments, when run in a standalone mode, the Spark master is configured to track the health/status of the workers manage work scheduling.

In some embodiments, both the Spark master and workers use a companion application (e.g., a purpose-built Spark application) to perform the actual work. In some embodiments, the companion application runs on all of the machines that run a Spark process (both Master and workers). The run-time instance of the companion application (also referred to herein as a "pipeline" application) that runs on the worker machine is referred to herein as a Spark "pipeline executor." A Spark worker is configured to perform its job through the executor application.

In this example, while two Spark workers are shown, any number of Spark workers may be established in the cluster. In some embodiments, an application (e.g., data preparation application initiated by a front end such as front end 200) provisions the cluster of nodes to perform a set of sequenced operations comprising a pipeline through which data sets are pushed. In some embodiments, each Spark master or worker is a node comprising either a physical or virtual computer, implemented in various embodiments as a device, a processor, a server, etc.

In this example, the Spark master is designated to communicate with a "pipeline master" (308), and the Spark workers are designated to communicate with pipeline executors (310 and 306). The pipeline masters/executors connect with Spark software residing on their corresponding nodes.

As described above, the pipeline server receives a script that specifies one or more input data sets and a set of sequenced data preparation operations that form a pipeline through which the input data sets are to be processed. The pipeline server, using the distributed computing platform, processes the input data according to the received script.

Data Partitioning

In this example, the pipeline master is configured to perform partitioning of the input data sets. In some embodiments, the pipeline master is used to implement data partitioning engine 208 of FIG. 2. Partitioning includes dividing a data set into smaller chunks (e.g., dividing a data set with one hundred rows into five partitions with twenty rows each). In some embodiments, the set of data is divided into work portions, or pieces of work that are to be performed. The pipeline master is also configured to distribute the partitions to the various established pipeline executors in the provisioned cluster for processing. In a Spark implementation, a division/partition (also referred to as a "portion of work" or "work portion") of the data set is represented as a Resilient Distributed Dataset (RDD). Other partition formats are possible for other distributed platform implementations.

When partitioning data, various tradeoffs exist when determining how many partitions to create and/or how many rows/how much to include in each partition. For example, while an increase in the number of slices of data can lead to an increase in parallelism and computation speed, the increased number of partitions also results in increased overhead and increased communication bandwidth requirement, due to data having to be communicated back and forth between an increasing number of nodes. This can result in inefficiencies. Using the techniques described herein, partitioning can be optimized. For example, an optimal number of partitions and/or an optimal size/number of rows per partition can be determined.

The master node is configured to devise or consume an intelligent strategy to partition a data set by taking into consideration various pieces of information. In various embodiments, the considered information includes information about the data being operated on, the data preparation operations to be performed, the topology/performance characteristics of the distributed computing environment, etc. By considering such information, a partitioning strategy can be devised that optimizes, for example, for reliable throughput throughout the nodes of a cluster so that the nodes can complete processing at approximately the same time. Thus, for example, straggling in the distributed computing environment can be reduced (e.g., where some workers are spending more time performing their portion of the work as compared to other workers, and must be waited upon).

The information about the data being operated on includes metadata information about the data. In one example embodiment, the Spark (pipeline) master queries an input data set (e.g., obtained from a source location described in a received script). The pipeline master probes the data set to determine metadata describing the data set. In various embodiments, the metadata includes the number of rows that are in the data set, the number of columns that are in the data set, etc. In some embodiments, the metadata that is determined/generated includes statistical information, such as histogram information about how data is distributed within the data set. For example, it may be determined that some rows in the data set are denser than others. The metadata determined as a result of the analysis (e.g., statistical analysis) is used in part by the pipeline master to devise an intelligent partitioning strategy.

Example embodiments of partitioning strategies are described below.

Example Strategy 1: Partitioning Based on Row Count

In this example strategy, a data set is divided based on row count, so that in this context-free approach (e.g., where metadata information about the rows or other information is not utilized), each Spark worker/pipeline executor is given a fixed (e.g., same) number of rows. In some embodiments, an assumption is made that each row will take the same amount of resources and time to process.

Example Strategy 2: Partitioning Based on a Size of Rows/Amount of Data

In this example strategy, a data set is divided in part based on the sizes of the rows in the data set. A statistical analysis is performed on the data to determine the density and/or amount of the data in the rows of the data set (e.g., the amount of data may vary from row to row). For example, metadata indicating the amount of space that a row takes is determined. The data set is divided in a manner such that each partition includes the same amount of data (but may include varying numbers of rows).

In some embodiments, the number of rows is utilized as a secondary criterion in addition to the size of the rows. For example, a number of rows that has a data size of a given amount is determined for a partition. If the number of rows exceeds a threshold number of rows (or is more than a threshold number of deviations away from a mean number of rows), then the number of rows in the partitions is trimmed, and capped at the threshold. For example, each partition is assigned 100 MB of data or 200,000 rows, whichever produces fewer rows.

The use of the number of rows as a secondary criterion is based in part on the columnar nature of the data transformation, where data is transformed based on data preparation operations performed with respect to a particular column or columns, and it is those columns which are affected by the data preparation operations which determine the amount of computational effort needed to perform an operation. However, a row includes data cells in every column of a data set, and the size of the row may be concentrated in data cells that are in columns that do not materially contribute to the cost of an operation. By using a number of rows as a secondary criterion, columns that have outlier distributions in terms of size can be eliminated (assuming that most common data preparations are operating on data that is fairly uniform in distribution). This provides a limiter for how much data will ultimately be processed in the distributed computing system.

Figure 4:
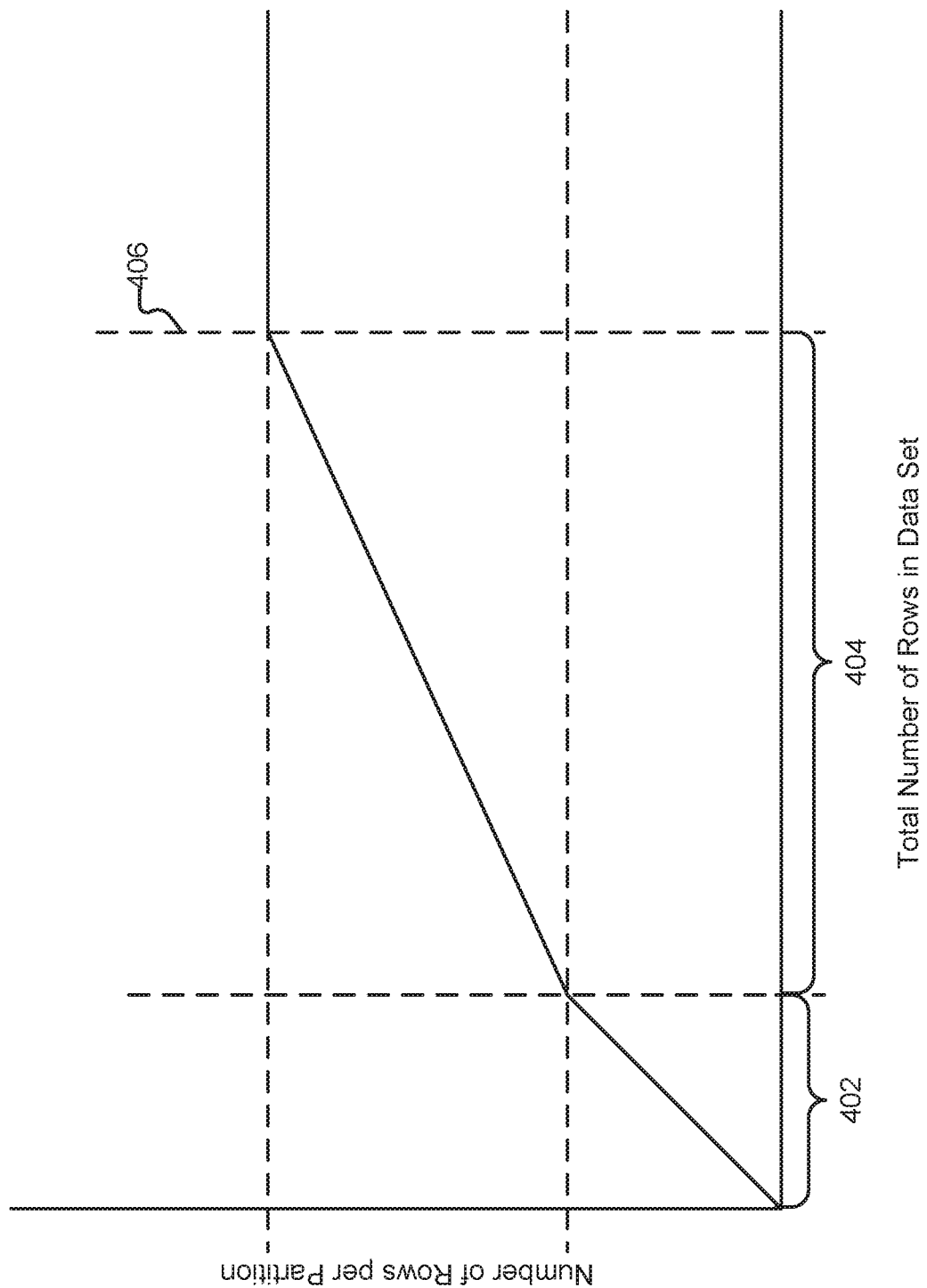
FIG. 4 illustrates an example embodiment of a three-part function.

In some embodiments, the limit/maximum number of rows per partition is determined as a function of the total number of rows for an entire data set. An example plot illustrating an embodiment of a three-part function is shown in FIG. 4. The slopes and transition points of the line segments shown in the figure are empirically determined and may vary in different embodiments. In this example, for data sets whose number of rows falls within range 402, partitions are loaded with a larger proportion of the total number of rows of the data set. For example, for very small data sets, a single partition is loaded with all of the data. By doing so, data will not need to be distributed across partitions (and potentially to different nodes), reducing resource overhead. Thus, in this first region 402, for smaller input data sets, it is more efficient to divide the data set into fewer partitions; in other words, the partitioning technique favors putting more rows into a single partition.

For data sets with a total number of rows in range 404, new partitions are steadily added as the total number of rows are increased, where the size of each partition grows steadily. In comparison to region 402, in region 404, the rate at which rows are added to partitions is slower. For example, in this range, the addition of new partitions is favored over adding rows to those partitions. While rows are still added to partitions steadily, which may sacrifice some partitions' performance on a node (as the node will have to process more row data), they are added at a rate such that the number of partitions to be processed does not expand too much.

For data sets whose total number of rows exceeds threshold 406, the number of rows that can be included in a partition is frozen and does not grow, where the addition of more partitions is favored. Thus, an upper bound on the number of rows that can be included in a single partition is established, allowing for the knowledge that each partition will be able to process a limited (upper-bounded) amount of data in a relatively fixed amount of time.

Example Strategy 3: Partitioning Based on a Size of Active Portions of Rows

In this strategy, as in strategy 2, an amount of data to include in a partition is considered. However, only the data in those columns that are involved (i.e., active) in (or affected by) an operation (or set of sequenced operations) is considered. For example, if, out of four total columns, only three of those columns are involved in a data preparation operation (e.g., a join operation that uses these three columns), then only the data in those three columns is determined. The data set is then partitioned according to the amount of data in the active columns (e.g., as described above in strategy 2). In some embodiments, a density of data in the active portions of rows is used as another factor to determine partitioning.

In some embodiments, strategies 2 and 3 are context aware, and take into account attributes and characteristics of the data set to be processed (e.g., metadata information determined about the rows of the data set). In some embodiments, the context aware strategies also take into account the physical characteristics of the cluster, such as the amount of memory that a partition will require and the amount of memory that a pipeline executor working on a partition can accommodate. For example, the amount (memory size) of data that can be in a partition can be set so that it does not exceed the memory that an executor is allocated to use. Other physical characteristics of the cluster that are taken into account include performance metrics such as an amount of processing power, network bandwidth metrics, etc., as will be described in further detail below.

The nodes in a cluster may be physical machines with varying performance characteristics. For example, suppose that a cluster includes two computing nodes. The first has 8 processor cores, with 10 GB of memory per core (i.e., a total of 80 GB of memory), while a second node has 16 processor cores, also with 10 GB of memory per core (i.e., a total of 160 GB of memory). Based on these memory/processing characteristics of the nodes, and using a heuristic in which a worker is allocated 10 GB per processor core, a number of workers that is a multiple of three should perform the work across the two nodes. This is because the first node has one-third of the total memory, while the second node has two-thirds of the total memory (i.e., the ratio of memory for the two nodes is 1:2), and having a number of workers that is a multiple of three will ensure that the total amount of memory in the cluster is fully utilized.

However, given that the nodes of the cluster may vary in performance characteristics, and that the cluster structure may change, in some embodiments, the creation of partitions is done without explicit knowledge of the actual processing capabilities of the cluster. Rather, each partition is allocated a pre-specified amount of computing resources, such as an amount of memory (e.g., 10 GB) per core. The data set is then divided according to the performance heuristic/characteristic (e.g., into chunks that are some multiple of 10 GB). Thus, for example, if a partition is allocated a maximum of 10 GB of memory per core, then the first node, with 80 GB of total memory across 8 cores can support 8 partitions/workers (where one partition corresponds to one worker). In this example, the property of an amount of RAM per core has been reduced down to a principle/heuristic that can be applied to tasks (and without explicit knowledge of the actual hardware of the cluster).

In some embodiments, a partition is processed by one worker, and the amount of resources that can be allocated to a partition/worker is embodied in an atomic computing unit, which defines the performance characteristics of a worker unit that can work on a partition. The atomic computing unit is associated with a set of performance metrics whose values indicate the amount of resources that a worker/pipeline executor has to process the partition. In addition to an amount of memory per core, as described above, other properties that can be reduced down into this higher level form include network bandwidth, latency, and core performance. By defining a higher level view of the amount of resources available to a single worker unit (working on a partition), the cost in resources for adding partitions (and more worker units) can be determined. For example, a cost function can be used to determine, given a set of performance characteristics/heuristics, a cost of computing a result. In some embodiments, a unit of cost is computed (e.g., for a worker to process some number of rows/amount of data). The data is then divided based on the computed unit of cost to determine a number of workers needed to process the data.

Thus, using the higher level view of the performance characteristics of an atomic worker unit, a number of workers needed to work on a data set can be determined (i.e., the number of pieces of work/partitions into which the data should be divided). Additionally, the number of partitions/pieces of work to create versus the number of rows to add to a partition can be evaluated based on computation costs.

In some embodiments, the determination of how to partition a data set is based on the characteristics of an operation to be performed. For example, different types of operations will have different computational costs. As one example, a function that takes a single input and provides an output solely based on that input, such as an uppercase operation, has a constant cost. Other types of operations, such as sort, which may require partitions to communicate with each other, may have larger costs (e.g., order of log n divided by the number of partitions for sort). A data set can then be partitioned based in part on the cost to perform the operations specified in a received script.

Any combination of the strategies and techniques described above can be used to determine a strategy for partitioning a data set according to a cost function. In some embodiments, the partitions are contiguous and non-overlapping. As one example, suppose that a data set of 200 rows, indexed from 0 to 199, is divided equally into four logical partitions (e.g., using strategy 1 described above). A first partition will have rows 0-49, a second partition will have rows 50-99, a third partition will include rows 100-149, and a fourth partition will include rows 150-199. In some embodiments, the partitions are ordered as well, such that the rows obtained/read from partition N+1 follow the rows obtained/read from partition N. Thus, a data set can be read in row order by reading each partition in sequential order. The partitions are then distributed to the pipeline executors/Spark workers in the distributed computing deployment architecture. For example, a Spark scheduler determines where (e.g., node) a partition/piece of work is to be assigned and processed.

Figure 5:
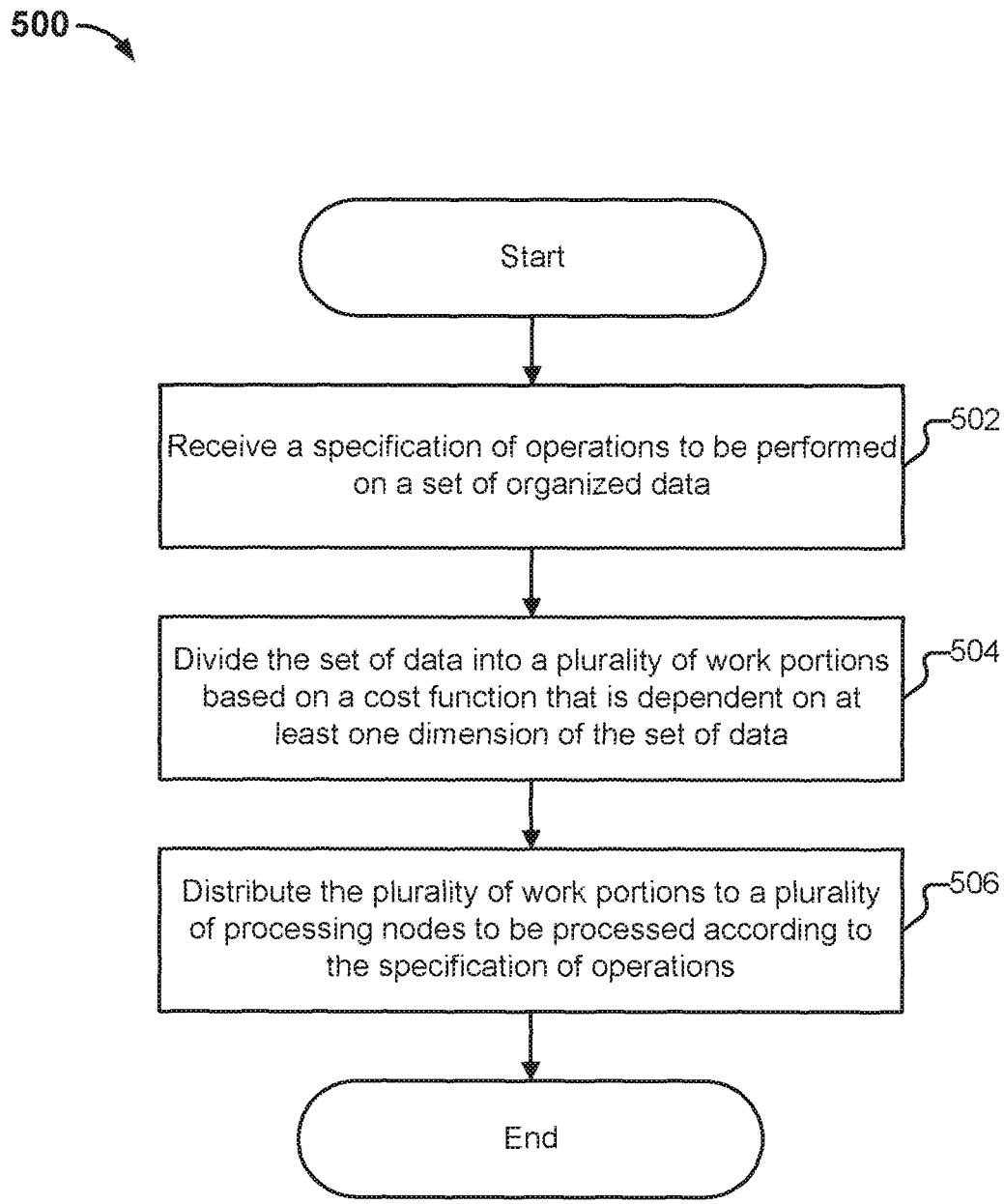
FIG. 5 is a flow diagram illustrating an example embodiment of a process for partitioning.

FIG. 5 is a flow diagram illustrating an example embodiment of a process for partitioning. In some embodiments, process 500 is executed by data partitioning engine 208 of FIG. 2. The process begins at 502 when a specification of a set of sequenced operations to be performed on a set of organized data is received. In some embodiments, the sequenced operations include data preparation operations. As one example, the set of data can be organized into rows and columns, or any other appropriate dimensions. The specification of the set of sequenced operations to be performed on the set of organized data can be received in the form of a script (e.g., generated based on user input via a step editor user interface, imported from a file, etc.), as described above.

At 504, the set of data is divided into a plurality of work portions based on a cost function that is dependent on at least one dimension of the set of data. In some embodiments, the set of data is divided based on a cost function that takes into account a number of rows to include in a work portion. The cost function can take into account various factors, such as an amount of data to be processed, the computational cost of creating additional work portions/partitions, the cost to add rows to a partition/work portion, the computational cost of operations to be performed, etc. Examples of techniques and strategies for dividing a set of data into a plurality of work portions/partitions are described above. If multiple data sets are specified in the specification, the data sets can be divided into logical partitions in their own respective namespaces.

At 506, the plurality of work portions is distributed to a plurality of processing nodes to be processed according to the specification of operations. For example, a scheduler (e.g., Spark scheduler) distributes the determined work portions to processing nodes in a distributed computing cluster. In some embodiments, the determined work portions are sent to the processing nodes via a tree-structured description of dependent operations to be performed on some input data. An example of dependent operations is as follows:

making a change to column A that depends on a change to column B that depends on a cache of columns A, B, and C.

The above described strategies and techniques for distributed pipeline optimization provide various benefits. For example, as described above, a data set can be distributed to workers in an intelligent manner that takes into consideration the characteristics of the data itself (e.g., the amount of data in a row, the active columns in the row, etc.). This allows workers, for example, to process similar amounts of data, reducing the amount of time needed to wait for stragglers (e.g., that are taking longer to compute their portion of work). As another example, by considering the physical characteristics of a cluster, work portions can be generated that efficiently utilize the resources of the cluster. As another example, using the strategies described above, an optimal number of work portions and/or number of rows/amount of data to include in a work portion can be determined to minimize additional overhead and maximize parallelism. Thus, distributed computing can be performed more efficiently and predictably.

Data Transformation and Cache Optimization

Once an input data set has been partitioned and distributed, a set of sequenced data preparation operations can be applied to the data set according to the specification of a received script. For example, the pipeline master 308, having divided one or more input data sets and distributed them to workers/nodes in a distributed computing cluster, is configured to cooperate with the pipeline executors to determine transformation results. In some embodiments, each pipeline executor working on a partition/work portion is configured to provide a subset of the overall results of performing a sequenced set of operations. The pipeline master has the responsibility of collating/combining the result subsets into the overall result. In some embodiments, the pipeline master of the cluster is used to implement data transformation engine 210 and caching engine 212 of FIG. 2.

In some cases, distributed computing platforms such as Spark include native functionality for performing various operations. However, the manner in which these platforms execute operations typically requires data to be replicated, which can be resource intensive and inefficient.

Using the techniques described herein, a set of sequenced operations can be performed without replicating data at each stage of the pipeline, thereby increasing the speed and efficiency with which the sequenced set of operations can be performed and data transformation results obtained. An example illustrating how a platform such as Spark replicates data when performing an operation, in contrast to the techniques described herein, will be shown with respect to the sort operation described below in conjunction with FIGS. 10A-10F.

As will be described in further detail below, data fragments including column files and data traversal programs can be generated and executed as data is processed through a pipeline. The data fragments are used to represent the cumulative results at various stages of the pipeline (e.g., the result of having performed a subset of the sequenced data preparation operations). The fragments representing the transformation results can be cached at various stages of the pipeline for reuse. For example, for a given piece of work that was operated on, the cumulative results (or representation of the results) of operations on the piece of work up to a particular stage in the pipeline can be saved to disk or stored to a cache layer. The cached representation can be later used to reconstruct the state of the data as of the particular stage in the sequence of operations. The data fragments/representation can be cached not only at the end of the pipeline, but in the middle as well. This allows for intermediary results at the various stages of a pipeline to be viewed. Further, edits to the sequenced set of data preparation operations defined in a script (e.g., using an editor interface provided by user interface engine 202 of FIG. 2) can reuse the same cached result without having to perform re-computation of the sequenced set of steps that led to the cached result. For example, in some embodiments, the cached representation is identified using a signature that is a function (e.g., hash function such as SHA hash function) of the (e.g., string) description of the sequenced set of operations that led to the results represented by the cached representation. When new data preparation scripts are received (e.g., as a user configures data preparation via an editor interface), signatures can be generated from the operations of the new script and used to determine whether there is an existing cached representation that can be leveraged.

In some embodiments, the cached representation described herein is optimized for columnar workloads. The columnar workloads include data preparation operations that are used to perform columnar data transformations. In some embodiments, the data formats and structures used to generate cached representations are also optimized for speed and efficiency, for example, to limit the flow of data throughout a pipeline server so that as little data as is necessary is worked on as quickly as possible.

(Re)use of the columnar workload-optimized cache, including the generation and reuse of data traversal programs, will be described below in conjunction with various example data preparation operations. While example details of several data preparation operations are provided for illustrative purposes, the list is not exhaustive, and the techniques described herein can be adapted accordingly for any other data preparation operations as appropriate.

Data Preparation Operation Examples

Figures 6A, 6B:
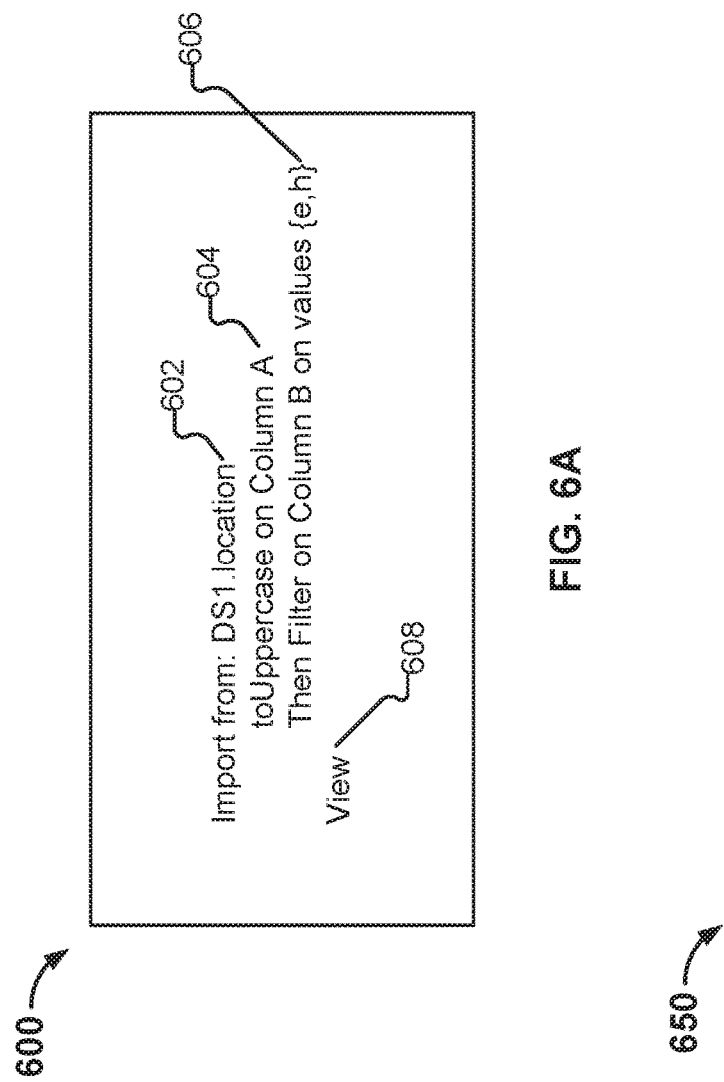
FIG. 6A illustrates an example embodiment of a script.
FIG. 6B illustrates an example embodiment of a data set to be processed.

Suppose that a user has specified a data set and a set of sequenced data preparation operations to perform on the data set via a user interface (e.g., provided by user interface engine 202 of front end 200 of FIG. 2), resulting in the script shown in FIG. 6A being generated (e.g., using script generator 204 of FIG. 2). The script is received by a pipeline server (e.g., pipeline server 300 of FIG. 3 from front end 200 of FIG. 2), implemented using a distributed computing platform such as Apache Spark.

FIG. 6A illustrates an example embodiment of a script. As shown, script 600 includes a description of the data set (referred to as "DS1" in this example) to be worked on (and imported) at 602. The contents of the data set to be processed are shown in conjunction with FIG. 6B. The script also includes a set of sequenced operations to perform on the data set. In this example, the set of sequenced operations includes an uppercase operation on column A of the data set (604) and a filter operation on column B of the data set (606) on the values "e" and "h." The sequenced set of operations forms a pipeline through which the data set will be processed. In this example, the logical sequence of the operations is also the physical execution sequence, but need not be (e.g., the physical execution sequence may be different, for example, in the presence of a smart optimization compiler). For example, suppose that a sequence of data preparation operations includes two operations, "f" and "g," in successive positions, in that order. A smart compiler may determine that performing "g" before "f" would result in exactly the same result, and would be faster to compute. For instance, in the example operations specified in script 600, the final result could also be obtained by swapping the uppercase and filter steps. Doing so would result in the uppercase operation being performed on far fewer rows, increasing the speed (and efficiency) of the computation.

As shown in this example, the data preparation operations are columnar in nature, where an operation to be performed on a data set is defined with respect to a particular column. For example, the uppercase operation is performed on column "A" of the data set, and the filter operation is performed based on particular values found in a specific column (column "B"). For such data preparation operations, how an entire data set is transformed is based on how particular columns are affected by an operation, or based on the characteristics of the particular columns implicated in an operation. This will be leveraged to provide techniques for optimized and efficient performance of data preparation operations, as will be described in further detail below.

At 608, the script indicates how the results of the data preparation operations are to be outputted. In this example, the results are to be viewed (e.g., presented to a user in a user interface provided by user interface engine 202 of FIG. 2). Another example of an option for outputting results is to publish the results (e.g., export them to another file).

FIG. 6B illustrates an example embodiment of a data set to be processed. In this example, data set 650 corresponds to the data set specified at 602 of script 600 of FIG. 6A.

The processing performed at each stage of the pipeline formed by the set of sequenced operations defined in script 600 will be described in further detail below. For illustrative purposes, the files written as of each step in the sequenced operations are saved (cached), but need not be.

Import/Start

The first operation of script 600 is Import/Start. After the decision on how rows should be divided and distributed is made (e.g., by data partitioning engine 208 of FIG. 2), the data assigned to the various partitions is imported. In some embodiments, importing the data includes preparing the data such that it can be quickly accessed sequentially (e.g., read a column of data quickly from top to bottom).

Figure 7A:
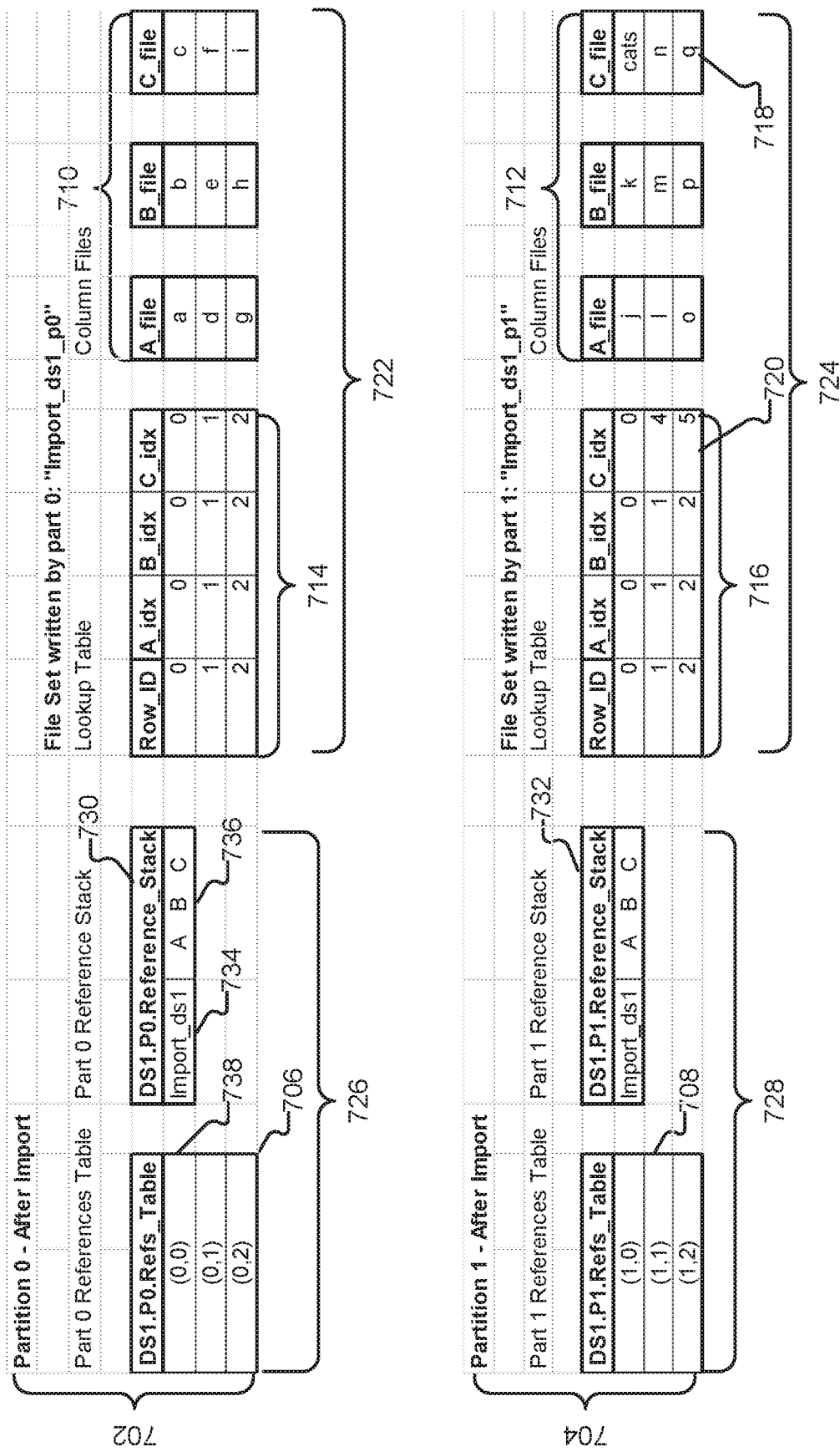
FIG. 7A illustrates an example embodiment of data structures generated during an import operation.

FIG. 7A illustrates an example embodiment of data structures generated during an import operation. In some embodiments, the example of FIG. 7A continues from the example of FIG. 6B. In some embodiments, the data being imported in FIG. 7A is the data from data set 650 (DS1) of FIG. 6B.

Suppose in this example that DS1 has been split into two logical partitions, partition zero (702) and partition one (704). The partitions are each processed by one or more workers (e.g., Spark workers/pipeline executors, as described above). As described above, each partition includes a subset of the rows of DS1, and collectively the two partitions comprise the entire data set. The subsets of rows among the partitions are non-overlapping and are contiguous.

With the work (data) having been partitioned, each row of DS1 is uniquely identified by a set of coordinates. In some embodiments, the coordinates indicate the partition in which the row can be found, and an identifier of the row within the partition. In the examples described herein, the coordinates are organized as follows: (partition number, row identifier). An example of the unique row identifiers is shown in references tables 706 and 708, which correspond to partitions zero and one, respectively.

As shown, data set DS1 has been equally divided into two partitions, with the top three rows of the data set assigned to partition zero, and the bottom three rows assigned to partition one.

In this example, each partition stores the data into sets of files corresponding to the columns, as shown at 710 and 712. For example, at 710, separate column files corresponding to the columns "A," "B," and "C," respectively, of data set DS1 are written (e.g., the contents of the data set DS1 are obtained from their source (specified in a script) and re-written into the column files). Each separate column sequentially describes the cells for all of the rows of DS1 that are in the partition. In some embodiments, the column values that are written are read from the source of the input data set (as specified in a script), and the original source data set is not modified (e.g., the values of the source data set are copied into the column files).

Accompanying column files 710 and 712 are lookup tables 714 and 716, respectively. Each row of the lookup table includes a row identifier ("Row_ID") and indices into the column files (indicating the location of the data values for an identified row). In this example, the indices shown in the index columns are byte indices into their respective column files.

The structure of the lookup table and the column files are optimized for sequential access such that, for example, all of the data can be read down a column quickly. The structures shown also allow for efficient non-sequential row probes (e.g., random access probing of a row). For example, to access a specific value in a row of a column, a lookup of the table can be performed by using a row identifier of the row of interest and the column of interest. The index value corresponding to that (row, column) coordinate is obtained from the lookup table and used to access the corresponding column file. The value at the index of the column file can then be retrieved directly, without requiring other data not of interest to be loaded and read.

In this example, the values in the column file are stored sequentially and are indexed by byte order. As the values can be of different types (e.g., char, int, etc.) and can be of different sizes (e.g., in bytes), the indices in the lookup table indicate the location of a cell in a column file by its starting byte location in the file. For purposes of illustration, throughout this and other examples described herein, assume that a character has a size of one byte. The numeric values shown in the examples described herein are, also for illustrative purposes, integers with a size of two bytes.

Take for example the column file (718) corresponding to column "C" written by partition one as part of the import operation. The column file includes the values 'cats,' 'n,' and 'q.' The corresponding byte indices for the column file are shown at 720 of lookup table 716. The starting byte in the "C_file" for the value 'cats' is 0, as it is the initial data value written in the column file. The starting byte in the "C_file" for the value 'n' is 4. This is because the value 'cats,' which is a word including 4 characters, has a size of 4 bytes. Thus, the zeroth byte in column file 718 includes the value for the first row of the "C" column file (in partition one), the fourth byte starts the second row, and the fifth byte starts the third row of the column. Thus, data can be read from the column files by byte index.

By using byte (or any other appropriate data unit of size) indexes, the column values can be tightly packed into a column file, without spaces/gaps between values. This allows for space efficient-storage of column values as well as efficient lookup of those values. As the column files are stored separately and compactly, if an operation requires operating on an entire particular column, the corresponding column file can be read directly (e.g., without indexing) and without reading values from any other columns that are not of interest. Thus, the data structures/formats shown are space-efficient, columnar, and optimized for specific column operations. As described above, the data format shown is optimized for both random and sequential access.

In some embodiments, the set of column files and corresponding lookup table are included together into a file set. In this example, lookup table 714 and column files 710 are included in file set 722. Lookup table 716 and column files 712 are included in file set 724. Each file set is associated with a file name/cache identifier, which can be used to locate the file set including the actual column values. In this example, the file set name/identifier is generated based on the name of the step that resulted in the column files being written, and the partition that wrote the file. For example, the file set 722 written by partition zero is called "import_ds1_p0," indicating that the file set was written by partition zero ("p0") for the step of importing ds1 ("import_ds1"). Similarly, the file set 724 written by partition one is called "import_ds1_p1," indicating that the file set was written by partition one ("p1") for the step of importing ds1 ("import_ds1"). When generating the file sets for an operation that is performed across all of the partitions, the handle/cache id that is generated is consistent across all of the partitions. In this example, for partitions zero and one participating in the import DS1 operation, the handle of the file sets ("import_ds1") written by the partitions is consistent across both partitions, with the difference being the partition number that is concatenated to the end of the file set name. In some embodiments, the file sets are written to a cache/storage and can be obtained using the identifiers described above. The use of such cache identifiers/file set names will be described in further detail below.

While a data set may have been divided across multiple partitions, as shown, the processing performed with respect to only one partition is shown for the remaining steps of script 600, as the specified set of sequenced operations do not require movement of information between partitions (i.e., rows will not move between partitions). Similar processing is performed in the other logical partition(s) into which the input data set has been divided. Examples of operations that result in transfer of rows between partitions will be described in further detail below.

In addition to the file sets that are written, each partition is associated with what is referred to herein as a "data traversal program" (DTP). The data traversal program includes a references table and a reference stack, which together provide information for how to read the state of a portion of the data as of a certain stage of a pipeline (e.g., how to read what is the cumulative result of having performed some portion of the sequenced set of operations on the input data set). A references table includes references of row transformations during a set of sequenced operations, and a reference stack includes a record of the sequenced operations and columns that are changed by the sequenced operations. In some embodiments, as each operation in a sequenced set of operations is performed, the references table and the reference stack of the data traversal program for the partition are updated to reflect the cumulative transformation result after having performed the sequenced set of operations up to a given operation. In some embodiments, the data traversal program is stored in a cache layer. This allows the data traversal program to be quickly accessed and updated as operations are performed, thereby allowing efficient access of the results of the operations (including intermediate results) without having to repeat the operations.

In some embodiments, a data traversal program of a partition, when executed, uses the references table and reference stack of the partition to obtain a sequenced set of rows that are a subset of the data set resulting from a sequenced set of operations having been performed on an input data set. The position of the sequenced subset of rows in the entire resulting data set is based on the position of the corresponding partition in the sequence of partitions. For example, the sequenced subset of rows obtained from the data traversal program for partition "N" is immediately followed by the sequenced subset of rows obtained from the data traversal program for partition "N+1." The sequenced subsets of rows from the various partitions are non-overlapping. The sequenced subsets of rows, when read in this order, collectively form the results of a sequenced set of data preparation operations performed on one or more input sets of data.

In some embodiments, the references table and the reference stack of the data traversal program are updated as each data preparation operation is performed to reflect the cumulative result of having performed the sequenced set of operations up to a given point in the pipeline. As the pipeline includes various stages and intermediary results, which, for example, a user may wish to revisit, in some embodiments, a copy of the data traversal program can be cached at a save point (e.g., before it is updated by the next step in the sequence of data preparation operations). The caching allows, for example, incremental saving of the data that is changing as the data progresses through various points of the pipeline/sequenced set of operations.

As shown in the example of FIG. 7A, partitions zero and one are each associated with their own data traversal programs, 726 and 728, respectively. Data traversal program 726 associated with partition zero includes the references table 706 and reference stack 730. Data traversal program 728 associated with partition one includes references table 708 and reference stack 732. In some embodiments, the data traversal programs (including corresponding references tables and reference stacks) are initialized (created) as a result of the import being performed. As will be described in further detail below, in some embodiments, the data traversal program represents a result of a set of sequenced data preparation operations and indicates how to assemble one or more affected columns to derive the result.

Reference stack 730 of partition zero is now described. In this example, the first row of reference stack 730 (which currently includes only one row after the import step) includes cache identifier ("cache id") 734. The cache identifier projects out the columns "A," "B," and "C," as indicated by the corresponding entry in the row at 736. Cache id 734, when combined with an indicator of the partition (partition 0), will result in a file name corresponding to file set 722 ("import_ds1_p0"). This indicates the location of the data that was written due to the import by part 0. The reference stack is used in conjunction with the corresponding references table to read a sequenced set of rows that is a subset of the overall data set resulting from the import operation having been performed.

An example of reading the result of importing DS1 is as follows. Suppose, for example, that a user would like to see the state of the data set DS1 after it has been operated (which should appear the same, as import does not make modifications to the data set). The files and data traversal programs shown in FIG. 7A can be used as follows to assemble DS1 (e.g., for viewing) as of the import step.

In order to read the imported data in its proper order, the data traversal programs of the partitions are executed in the order of the partitions to which they correspond. Thus, data traversal program 726 of partition zero is executed first (the data traversal programs of the partitions can also be executed in parallel, with the sub-results from each data traversal program placed in their correct order as they are obtained).

Data traversal program 726 is executed as follows. References table 706 includes three rows. This indicates that the data traversal program (which is associated with partition zero), when executed, will provide the first three rows of the imported data set. The first row of the imported data set is obtained as follows. The value of the first (and as yet, only) column in the first row (738) of references table 706, the coordinates (0,0), is obtained. This column of the references table corresponds to the first (and as yet, only) row in the reference stack. The row includes cache identifier 734 and identifies columns "A," "B," and "C" at 736.

The partition number from the obtained coordinates (zero) is appended to cache id 734 to obtain the file name "import_ds1_p0," which corresponds to file set 722 of the same name. File set 722 is then accessed. The row identifier of the obtained coordinates (zero) is then obtained. The obtained row identifier is used in conjunction with the columns "A," "B," and "C" identified at 736 to perform a lookup of lookup table 714 of file set 722. As columns "A," "B," and "C" have been identified, the obtained row number "zero" is used to look up, using the lookup table, the values in the zeroth row of those columns. The corresponding byte indexes in the zeroth row of the index columns of the lookup table are obtained and used to access the column files 710. Thus, the row including the values "a," "b," and "c" for columns "A," "B," and "C" is obtained from corresponding column files 710.

Figure 7B:
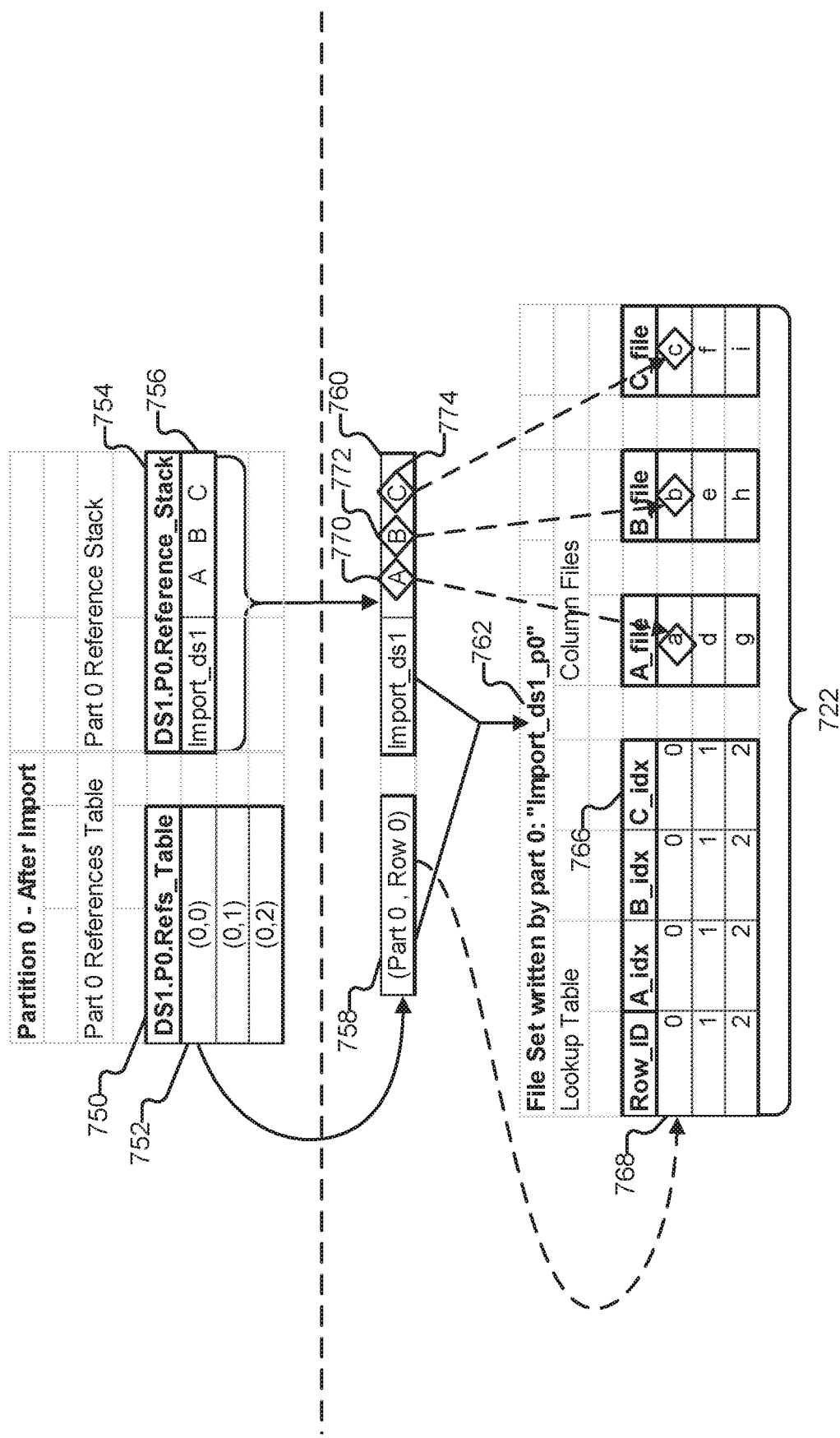
FIG. 7B illustrates an example embodiment of executing a data traversal program.

The processing performed by the data execution program to arrive at the first row of the imported ds1 data set is described again in conjunction with FIG. 7B.

FIG. 7B illustrates an example embodiment of executing a data traversal program. In the example of FIG. 7B, the various references tables, reference stacks, and file sets described correspond to their respective counterparts in FIG. 7A.

The data traversal program (e.g., data traversal program 728 of FIG. 7A) for partition zero is executed. The data traversal program begins by reading the first row (752) of references table 750 (which corresponds to references table 706 of FIG. 7A). The single entry in this row includes the coordinates (0,0), which is a reference indicating partition zero, row id zero.

As shown, row 752 includes a single column, which is mapped/corresponds to the only row in reference stack 754, row 756. In this example, reference stack 754 corresponds to reference stack 730 of FIG. 7A. Row 756 includes two entries, one for a cache identifier. As will be shown below, the cache identifier is combined with the partition number identified in the coordinates obtained from row 752 to locate a file set. The second entry in row 756 includes an indication of the columns whose values are to be obtained using the located file set.

The coordinates obtained from row 752 are shown at 758, and indicate, as shown, a partition number (zero) and a row identifier (zero). The entries obtained from row 756 of reference stack 754 are shown at 760. The obtained values shown at 758 and 760 are used together as follows.

The partition number "zero" extracted from reference 758 is combined with the cache id "import_ds1" value extracted from 760 to generate the file name "import_ds1_p0" (762). The combination is performed, for example, by concatenating strings, generating a hash of the combined values, or by any other appropriate combination function. This is used to locate and access the file set of the same name (file set 722 of FIG. 7A), which was written as a result of the import step, as described above in conjunction with FIG. 7A.

The row identifier "zero" extracted from reference 758 is then used to perform a lookup of lookup table 766 of file set 722. Based on the extracted row identifier "zero," row 768 of lookup table 766 is identified and accessed.

Based on the column titles 770-774 ("A," "B," and "C," respectively) specified in reference stack row 760, the values for those specified column titles corresponding to row 768 are looked up and obtained. This is performed as follows. Because columns "A," "B," and "C," have been specified, the index values for those corresponding columns in row 768 are obtained from lookup table 766. Those indices are then used to lookup actual data values written to respective corresponding column files in the file set. In this example, the corresponding values of the specified column titles "A," "B," and "C" are "a," "b," and "c." Thus, the first row of imported ds1 has been read/obtained.

The next two rows of imported ds1 are then read by moving down the entries in the reference table and performing the same process described above. For example, the entry in the second row of references table 750 (with the reference coordinate (0, 1)) is combined with the first row of reference stack 754 (based on the mapping of the first and only column of the references table with the first and only row of the references stack) using the data traversal program processing described above to obtain the values "d," "e," and "f" from file set 722 The third and last row of imported DS1 (including the values "g," "h," and "i") can also be similarly obtained using the data traversal program of partition zero.

Data traversal program 728 of partition one is then also similarly executed, as described above, to obtain the bottom three rows of DS1, in order.

The two obtained subsets of sequenced rows are then combined together and provided as output. For example, if the user would like to view the results in a user interface, the sequenced subsets of rows are displayed in corresponding partition order (i.e., the subset of sequenced rows obtained using the data traversal program of partition one is displayed below the subset of sequenced rows obtained using the data traversal program of partition zero). If the user indicates that they would like to publish the results, then the sequenced subsets of rows are appended to each other based on corresponding partition order (i.e., the subset of sequenced rows obtained using the data traversal program of partition one is appended to the bottom of the subset of sequenced rows obtained using the data traversal program of partition zero).

In some embodiments, the execution of the data traversal programs is performed in parallel on each partition. The sequenced subsets of rows resulting from the data traversal programs are then placed in the order of the partitions from which they were obtained.

The data traversal programs written as of the import stage (and representing the results of the import operation) can be saved. The cached data traversal program can be used at a later time, for example, to avoid having to regenerate references and reference tables.

In the above example, the references tables include only one column, and the reference stack includes only one row. Additional examples involving references tables with multiple columns and/or reference stacks with multiple rows will be described in further detail below.

Continuing with the example of script 600, example processing involved in performing the uppercase and filter operations is now described. As the uppercase and filter operations do not result in the movement of rows between partitions, and can thus be performed by the partitions independently of each other, the processing that occurs on partition zero is shown below. Similar processing occurs on partition one.

Uppercase

Figure 8A:
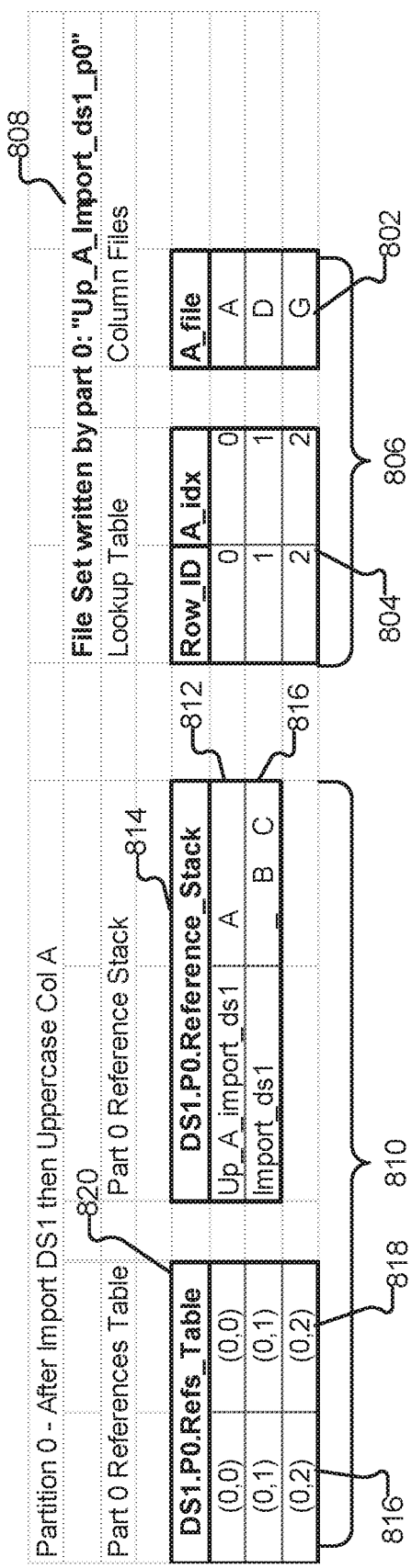
FIG. 8A illustrates an example embodiment of an updated data traversal program.

After importing the data, the next step in script 600's pipeline is to perform an uppercase on the values of column A. Here, the operation is performed relative to a specific column, column A. FIG. 8A illustrates an example embodiment of an updated data traversal program (810) and new file set (806) generated as part of performing the uppercase on column A operation.

In this example, the uppercase operation on column A is performed as follows. Prior to performing the uppercase operation, the state of the data traversal program of partition zero is as shown in the example of FIG. 7A.

The current values of column A are obtained, for example, by performing a reading of column A using the current state of the data traversal program. The uppercase operation is performed on those obtained column values. Because the values of column A are now different as a result of the operation, a new column file for the new, uppercase version of column A is written, as shown at 802 (that includes the uppercase values). A corresponding lookup table 804 is also written so that the values in the new version of column A can be looked up. The new column file 802 and corresponding lookup table 804 are included in file set 806, which, in this example, is given the name "Up_A_Import_ds1_p0," as shown at 808. In this example, the file set name is generated by combining together (e.g., using a string concatenation, hash function, etc.) the operations that have been performed thus far that resulted in the column files in the file set having been written. The partition number that wrote the file set is also added to the name. For example, the name "up_A_Import_ds1_p0" at 808 is generated to reflect that file set 806 was written by partition zero when performing an uppercase operation on column A that was performed after importing DS1.

As shown, because only column A has been specified in the operation, and only the values in column A were modified (i.e., column A is the only active column in this operation), only a file set for the new version of column A need be created at this stage of the pipeline. Thus, no new data needs to be generated/written for other columns in the data set DS1 that were not touched by the uppercase operation. Thus, the data that is changing as of the execution of a data preparation operation can be written incrementally.

Due to a new column file having been written as a result of the uppercase step, the data traversal program of partition zero is updated/amended (e.g., from its state as of the import step) accordingly. The new state of the data traversal program as of the uppercase step is shown at 810.

The new data traversal program is generated as follows. The current data traversal program that partition zero is responsible for is obtained (data traversal program 726 of FIG. 7A as of the import step). A new row 812 is added to ("popped onto") the top of the existing reference stack to produce new reference stack 814 of partition zero. The new row 812 indicates: (1) the cache identifier/handle portion of the newly written file set 806 (without partition number); and (2) the title of the column ("A") that was written. In this example, a new version of the column A file has been written. This new version of column A supersedes the previous version of the column A file that was written as part of the import step. To represent this, the "A" value of row 816 has been marked unavailable to the data traversal program, as indicated by an underscore. When reading the data, the value from the new column A file will be read, and the earlier version of the column A file (found in file set 722 of FIG. 7B) will not be accessed and read. This allows the data traversal program to enforce only the most recent version of a column to be read.

A new column 816 is also added to the left of the existing references table (which included only column 818), resulting in a new references table 820 for partition zero. In this example, the rows of the imported data set did not change position, and thus each of the coordinates in the references included in new column 816 still identify the same partitions and row identifiers as shown in column 818.

The columns in the references table, from left to right, are mapped to corresponding respective rows in the references table, from top to bottom. For example, column 816 of references table 820 is mapped to row 812 of reference stack 814. Column 818 of references table 820 is mapped to row 816 of reference stack 814. This mapping will inform how the data traversal program as of a particular pipeline stage reads values from previously written file sets to assemble rows of a data set as of the particular pipeline stage. Any other appropriate mapping can be performed.

Thus, the data traversal program from the import step is updated/amended to reflect the new result of having performed an uppercase on column A after importing ds1. Data traversal program 810 can be cached to store the representation of the result at the stage in the pipeline at which ds1 has been imported and then column A has been uppercased. In some embodiments, a signature corresponding to the data traversal program is generated. The signature can be generated based on the operations that led to the result represented by the data traversal program to be cached (e.g., by hashing the representations of the operations (e.g., string representations) together, by concatenating the operations together, or through any other combination function). A copy of data traversal program 810 is then cached with its corresponding signature. The cached data traversal program can then be later identified by its corresponding signature, as will be described in further detail below.

Figure 8B:
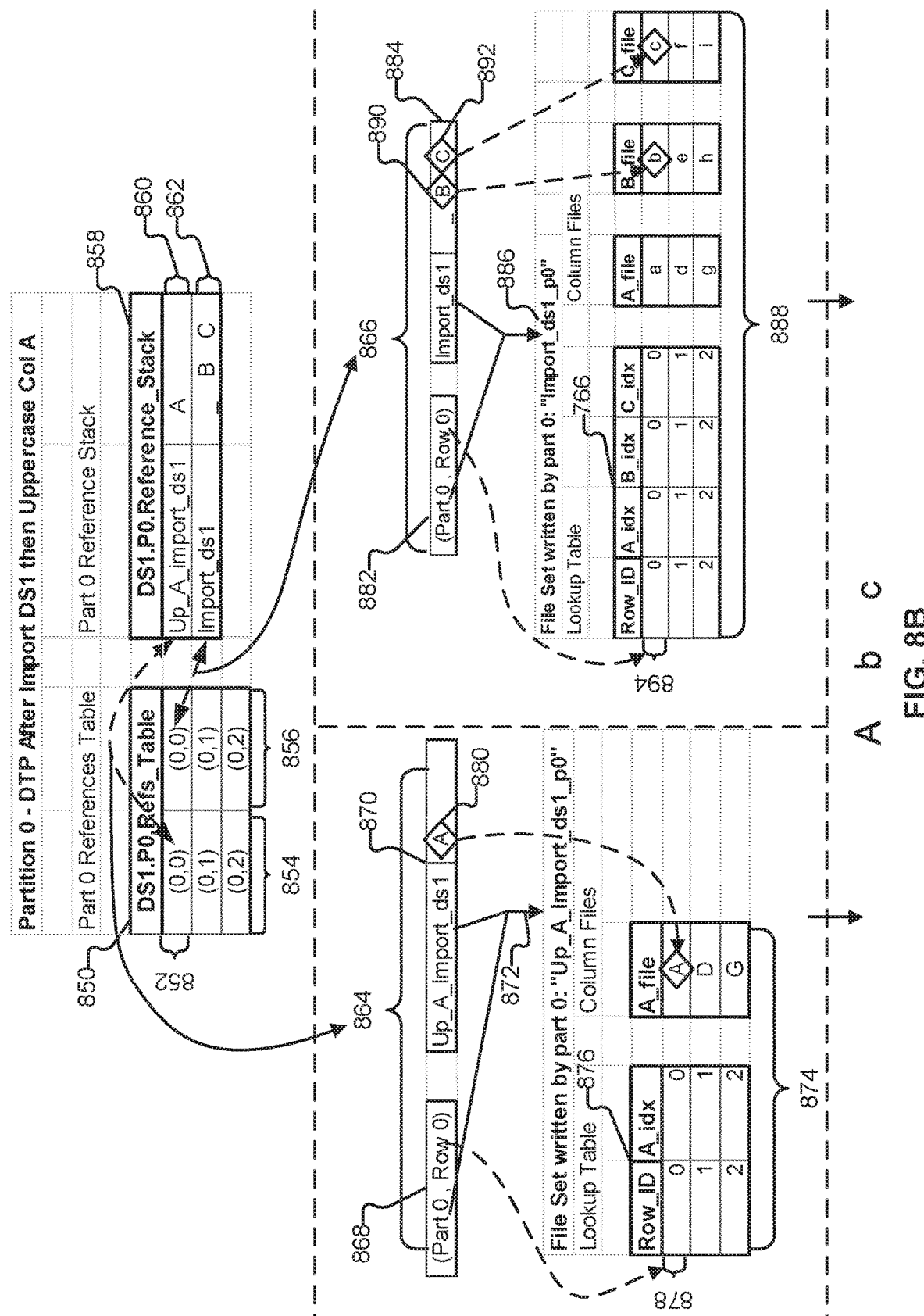
FIG. 8B illustrates an example embodiment of executing a data traversal program.

An example of executing the updated data traversal program 810 to obtain a portion of the results after having performed the uppercase on column A after importing DS1 is described in conjunction with FIG. 8B.

FIG. 8B illustrates an example embodiment of executing a data traversal program. In the example shown, a first row of the data set that results from performing an uppercase on column A after importing data set DS1 is read. The row can be read, for example, when the results of the import and then the uppercase operations are to be outputted (e.g., for viewing in a user interface, for publishing/exporting, etc.). In the example of FIG. 8B, the various references tables, reference stacks, and file sets correspond to their respective counterparts in FIG. 8A.

In this example, the data traversal program (e.g., data traversal program 810 of FIG. 8A) for partition zero is executed. The data traversal program begins by reading the first row 852 of references table 850 (which corresponds to references table 820 of FIG. 8A). The row includes two entries, references/coordinates (0,0) in column 854, and references/coordinates (0,0) in column 856. As described above, the leftmost column (854) of references table 850 is mapped/corresponds to the topmost row (860) of reference stack 858 (which corresponds to reference stack 814 of FIG. 8A). The rightmost column (856) of references table 850 is mapped/corresponds to the bottom-most row (862) of reference stack 858.

The pairing of the reference (0,0) at row 852 and column 854 of references table 850 with the entries in row 860 of reference stack 858 is shown at 864. The pairing of the reference (0,0) at row 852 and column 856 of references table 850 with the entries in row 862 of reference stack 858 is shown at 866.

The processing performed by the data traversal program using pairing 864 is described first (the processing of 864 and 866 may be performed in any order, in parallel, or in any other appropriate manner). The coordinates obtained from row 852 and column 854 of references table 850 are shown at 868, and indicate as shown a partition number (zero) and a row identifier (zero). The entries obtained from row 860 of reference stack 858 are shown at 870. The obtained values shown at 868 and 870 are used together as follows.

The partition number "zero" extracted from reference 868 is combined with the cache identifier "Up_A_Import_ds1" value extracted from 870 to generate the file name "Up_A_Import_ds1_p0" (872). The combination is used to locate and access the file set of the same name (file set 874), which was written as a result of the uppercase on column A operation being performed on imported DS1, as described above in conjunction with FIG. 8A. In this example, file set 874 corresponds to file set 806 of FIG. 8A.

The row identifier "zero" extracted from reference 868 is then used to perform a lookup of lookup table 876 of file set 874. Based on the extracted row identifier "zero," row 878 of lookup table 876 is identified and accessed.

Based on the column title 880 ("A") specified in reference stack row 870, the value for the specified column title corresponding to row 878 is obtained. The value is obtained by looking up the index value for column A in row 878 of the lookup table. This provides the byte index "0." The value at the zeroth byte index of the file for column A (A_file) is obtained. This is the value "A." This is the uppercase version of the value prior to the uppercase step ("a"). Thus, the value for the column A in the first row of the data set resulting from the uppercase on column A of the imported data set DS1 is obtained.

The data traversal program is then configured to use pairing 866 to obtain the remaining values for columns B and C. In contrast to the processing described above in which the current value (as of stage of pipeline after the uppercase on A after import ds1) for column A was obtained from the file set "Up_A_Import_ds1_p0," the current values for columns B and C are obtained from a different file set. In this example, the values for columns B and C are obtained using the file set that was written during the import step ("Import_ds1_p0"). This reflects, in part, that columns B and C were not changed by the uppercase on the column A operation, and thus, their values written at the previous stage are still valid (and are still the most current version) at this stage of the pipeline.

Pairing 866 is used by the data traversal program as follows. The coordinates obtained from row 852 and column 856 of references table 850 are shown at 882, and indicate as shown a partition number (zero) and a row identifier (zero). The entries obtained from row 862 of the reference stack are shown at 884. The obtained values shown at 882 and 884 are used together as follows.

The partition number "zero" extracted from reference 882 is combined with the cache id "import_ds1" value extracted from 884 to generate the file name "import_ds1_p0" (886). The combination is performed, for example, by concatenating strings, generating a hash of the combined values, or by any other appropriate combination function. This is used to locate and access the file set of the same name (file set 888), which was previously written as a result of the import step, as described above in conjunction with FIG. 7A. In this example, file set 888 corresponds to file set 722 of FIG. 7A.

Based on the column titles 890 and 892 ("B" and "C," respectively) specified in reference stack row 884, the values for those specified column titles corresponding to row 894 are looked up in file set 888 and obtained. This is performed as follows. Because columns "B" and "C" have been specified, the byte index values for those corresponding columns in row 894 are obtained. Those indices are then used to look up actual data values written to respective corresponding column files in the file set. In this example, the corresponding values of the specified column titles "B" and "C" are "b" and "c," respectively.

In this example, as described above, because the column A was modified by the uppercase operation, the column title "A" has been removed (indicated by an underscored) from row 862 of reference stack 858 to indicate that the version of column A that is obtained from file set 888 is no longer valid/current and values should not be obtained from that version of the column A file. Thus, the value for column A in file set 888 was not obtained.

As shown above, new column files (and corresponding lookup tables) are only written for columns that are changed by an operation. The reference stack is used in part to indicate where the most current (as of some corresponding stage of a pipeline) version of a column is located (i.e., the location of a file set and what columns should be read from that file set).

The values obtained from the two file sets are combined together to produce the first row of the cumulative result of performing an uppercase on column A after importing data set DS1 ("A," "b," "c").

The remaining rows of the result are determined by going down the rows of the references table in order and performing the same processing as described above. By executing the data traversal program on the references table in this order, the subset of the overall results that are obtained using the data traversal program for partition zero will be in their correct order.

Similar processing is performed on partition one. The sub-results obtained for partition zero and partition one are then combined together to form the overall result, where the subset of results obtained from partition zero precede the subset of results from partition one.

As shown in this example, two different file sets were accessed to determine the values that make up a single row in a data set resulting from multiple operations having been performed on an input data set.

Filter

Continuing with the example of script 600 of FIG. 6A, after performing an uppercase on column A, the next stage of the pipeline/next step in the set of sequenced operations is to filter on column B. In particular, the data is filtered on column B according to attached criteria, namely that the data is to be filtered on the values "e" and "h" in column B. This will potentially reduce the total number of rows in the data set (and the number of rows in each partition).

In the filter operation, no data values are modified. Thus, because no columns are modified, no new file sets are written as a result of the operation. However, the number of rows represented by the data traversal program of a partition may be decreased. Thus, the references table and reference stack of a partition will be updated to reflect this.

In one example embodiment, the state of the data traversal program (and references table and reference stack) is determined/updated as described below in conjunction with FIG. 9A.

Figure 9A:
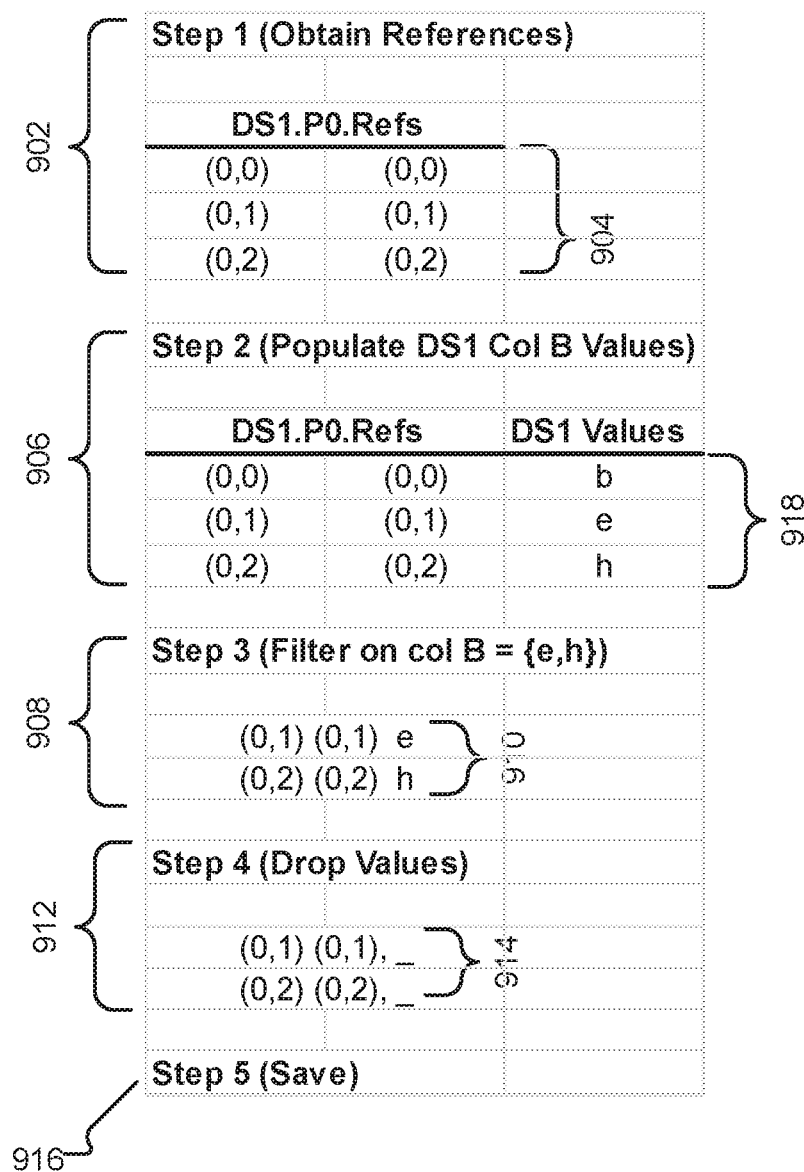
FIG. 9A illustrates an embodiment of a process for updating a data traversal program to reflect the results of a filter operation.

FIG. 9A illustrates an embodiment of a process for updating a data traversal program to reflect the results of a filter operation. In some embodiments, the processing performed in FIG. 9A is performed by one or more pipeline executors (e.g., Spark workers) working on a partition such as partition zero. In some embodiments, each executor operates on its work portion independently (as rows will not move between partitions as a result of the filter operation).

The references table is updated as follows. At step 1 (902), the current references (as of the uppercase on column A having been performed) for the partition are obtained. In some embodiments, obtained references are obtained from references table 820 of FIG. 8A. Each row of references in table 904 represents a particular row in the cumulative results of having performed the sequenced set of operations up to the uppercase on column A operation.

At step 2 (906), the column B values corresponding to the rows represented by table 904 are obtained. In some embodiments, the values are obtained by performing a data traversal using the references and corresponding reference stack as described above. In some embodiments, the corresponding reference stack that is used to obtain the values is reference stack 814 of FIG. 8A. In some embodiments, a column populated using the column B values is added to the right of table 904 to generate modified table 918.

At step 3 (908), table 918 is filtered according to the filter criteria (filter on column B values "e" and "h"). The results of the filter are shown at 910. For example, in a Spark implementation, the Spark filter operation is called on table 918 (represented as an RDD). The filter transformation returns a new RDD with a subset of the rows in table 918, which is shown at 910. At step 4 (912), the column B values are dropped, resulting in table 914 that includes only references. These references represent the rows that remain after the filtering operation. At step 5 (916), table 914 is saved as the updated references table for this stage of the pipeline.

Regarding the reference stack, because no new column data has been written, the reference stack need not be updated for the filter step. In some embodiments, a save is automatically performed after a filter, which includes saving the current references table. When performing the save, in some embodiments, a new entry (row) is popped onto the top of the reference stack. In some embodiments, the new row of the reference stack includes a handle/cache identifier to the saved references table so that it can be retrieved for later use. For example, in some embodiments, the references table is stored as part of a file set that is referenced in part using the handle/cache identifier. In this example, the file set would include only the references table, but no lookup table and column files (as no new column data has been written). The columns portion of the new row of the reference stack is empty. A corresponding column in the references table is also generated.

Figure 9B:
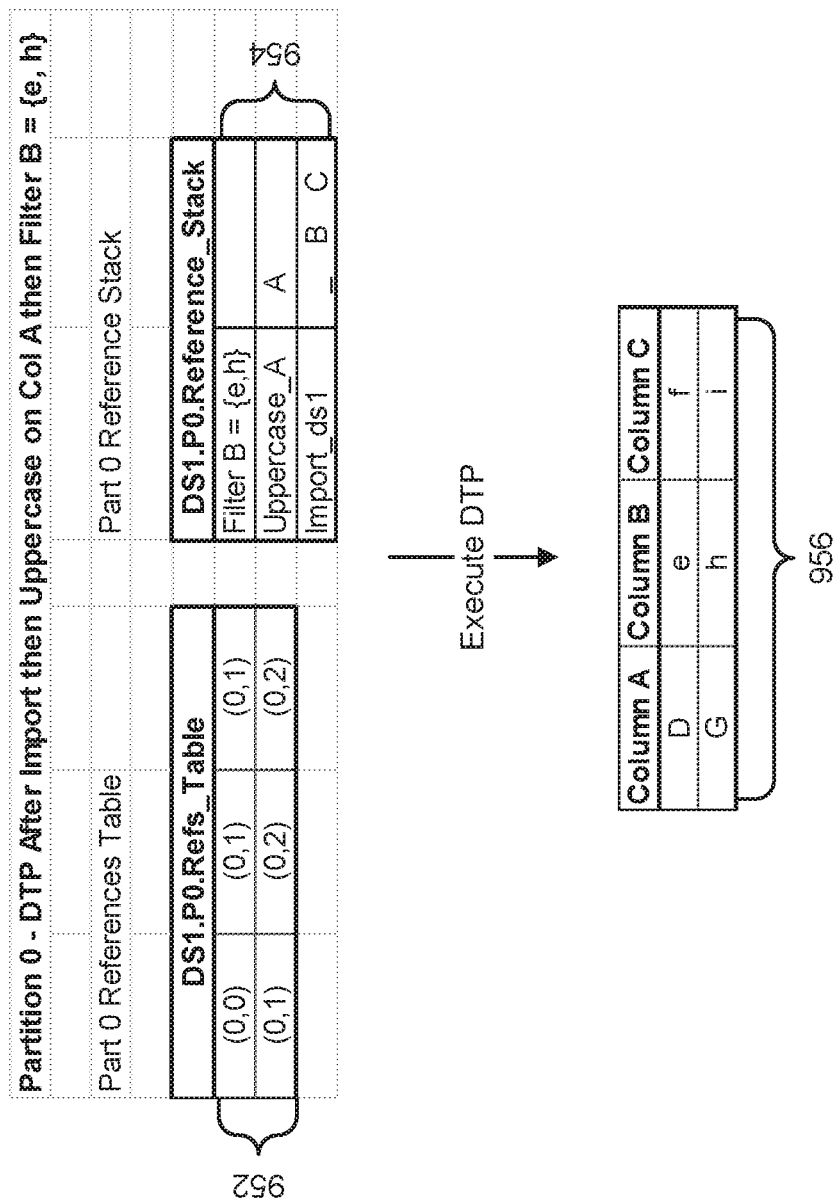
FIG. 9B illustrates an example embodiment of a data traversal program.

This results in the data traversal program shown in FIG. 9B.

FIG. 9B illustrates an example embodiment of a data traversal program. In this example, an updated data traversal program for partition zero representing the result of having done the filter operation on column B on the values "e" and "h" is shown. The data traversal program includes updated references table 952, which was, for example, generated using the processing described in FIG. 9A. As described above, because a save was performed after the operation, even though no data has been modified, the reference stack 954 has been updated from the previous stage of the pipeline.

To read the cumulative results at this stage of the pipeline, the data traversal program for partition zero (and other logical partitions) is executed in a similar manner as described above. For example, the data traversal program shown in FIG. 9B can be executed to obtain a subset of the cumulative results (the first two rows of the cumulative results) of performing the filter operation after the uppercase operation after the import operation. In some embodiments, if there are no columns specified in a row of reference stack entries, then no data values are read (i.e., only the reference stack entries with columns relevant to the data traversal program are read). Thus, by executing the data traversal program shown in FIG. 9B, the results shown at 956 are obtained.

As shown, the result of cumulative operations is reflected in the data traversal program, but there is not necessarily any indication in the data traversal program of what exact operations were performed to achieve those cumulative results. In some embodiments, when caching the data traversal program of a particular stage in a pipeline, a set of one or more signatures is built/generated based on the steps that were performed to achieve the cumulative result. The one or more generated signatures are assigned to the cached data traversal program.

As shown, the processing that was performed to arrive at the state of the data as of a filter operation was to look directly at the values of column B and filter those values to determine what rows remain in the data set. Only those rows that remained are reflected in the updated references table as of the filter step. No new data was written when performing the filtering using this data representation. Rather, the reduction in rows as a result of the filter is captured in the reduced number of rows in the references table, and was accomplished by looking only at the values of column B. This is in contrast to other filtering techniques that write out the results, where the cost of writing an entire filtered data set is a function of the total number of columns of the data set. Here, a compact representation of the results is updated to reflect the cumulative results of a sequenced set of data preparation operations.

The example operations described above with respect to the script of FIG. 6A would not result in movement of information between partitions. In the following example, an operation (sort) which results in movement of references across partitions (e.g., where rows exchange partitions) is shown.

Sort

Figures 10A, 10B:
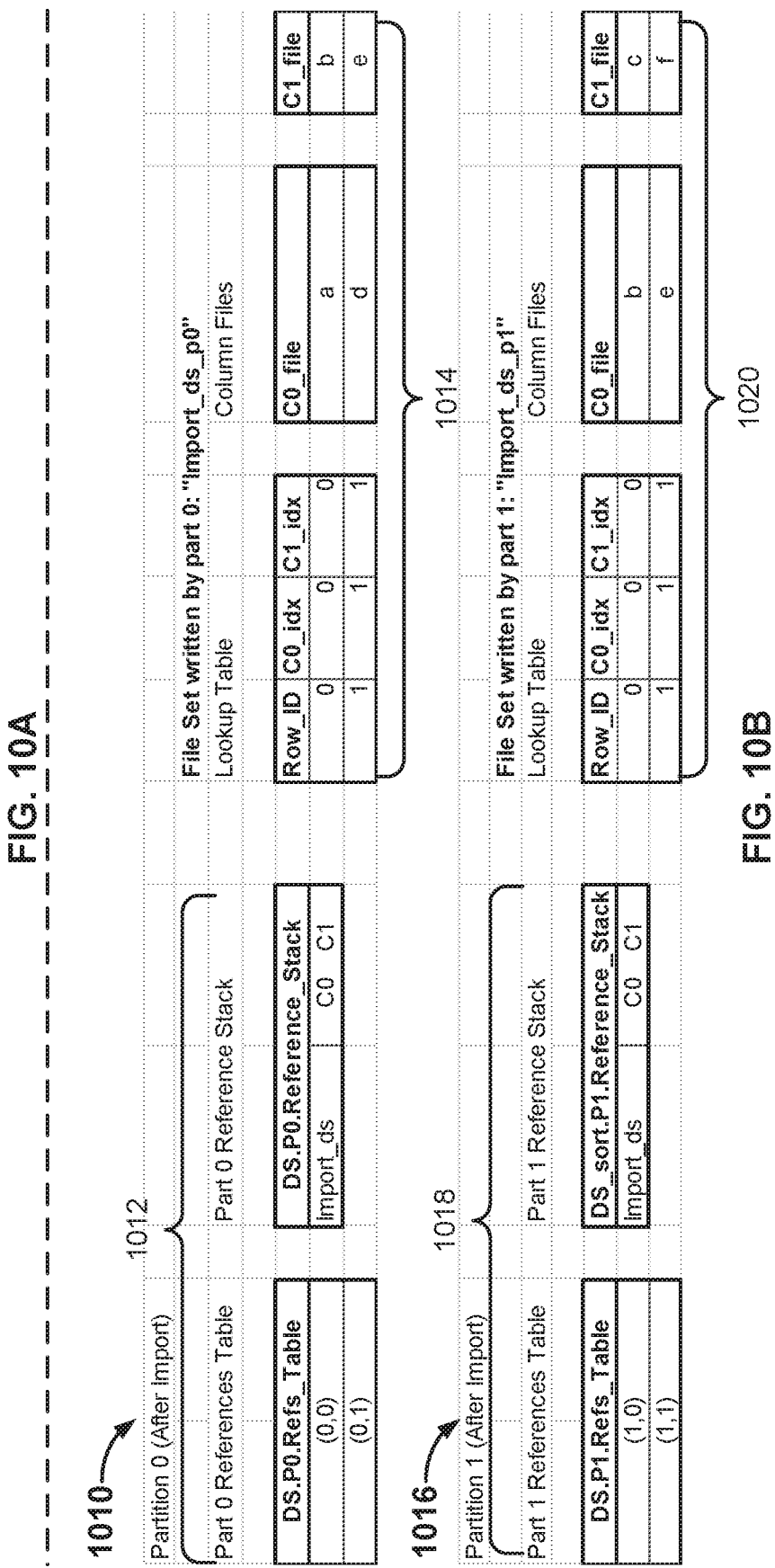
FIG. 10A is a diagram illustrating an embodiment of a data set to be sorted.
FIG. 10B is a diagram illustrating an embodiment of data traversal programs and file sets.

FIG. 10A is a diagram illustrating an embodiment of a data set to be sorted. Throughout this example sort operation, the data set to be sorted (1000) is referred to as "DS." Data set 1000 includes two columns, C0 and C1, and four rows.

FIG. 10B is a diagram illustrating an embodiment of data traversal programs and file sets. Continuing with the example of FIG. 10A, suppose that data set DS has been divided into two partitions, partition zero and partition one, each with two rows, and imported, as shown at 1010 and 1016. In this example, partition zero has initialized data traversal program 1012 and written file set 1014. In this example, file set 1014 is named "import_ds_p0." Similarly, partition one has initialized data traversal program 1018 and written file set 1020. In this example, file set 1020 is named "import_dsp1." The cache identifiers for partition zero's reference stack and partition one's reference stack both include the same cache identifier/handle, "Import_ds." In some embodiments, each partition stores its respective written file set local to the place of its computation.

In this example, the sort condition C0 is used to determine where the rows of the data set should move. In some embodiments, a distributed computing platform such as Spark is leveraged to perform the work of moving rows (represented by references) to the correct place (i.e., the movement of rows due to the sort is represented by moving references between partitions).

Figure 10C:
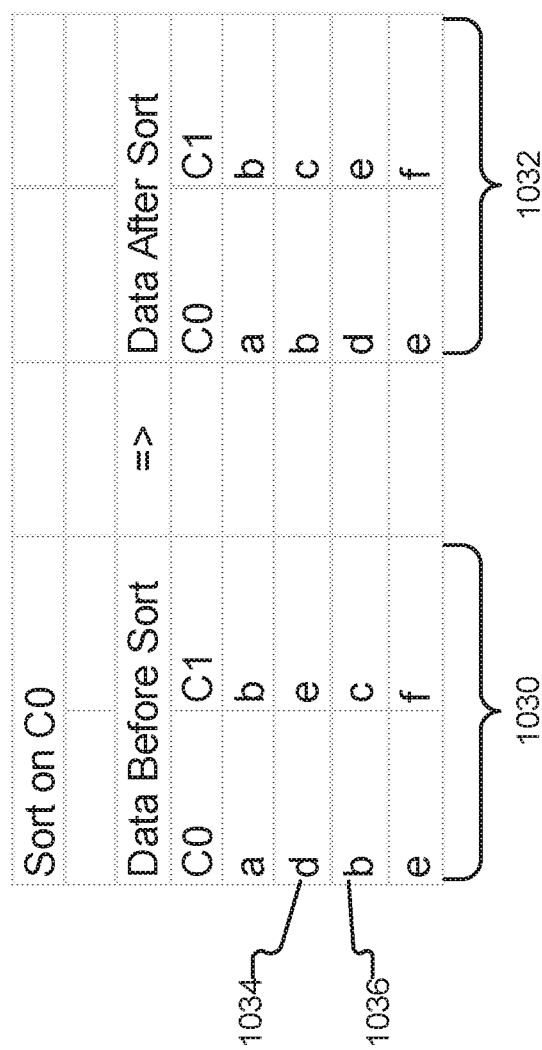
FIG. 10C illustrates an example of a sorted result.

In this example, the sort is to be performed on C0. FIG. 10C illustrates an example of a sorted result. Data set DS prior to the sort is shown at 1030. The result of the sort operation on data set DS is shown at 1032. As shown, rows 1034 and 1036 of the data set DS swap positions due to the sort operation. The process involved in updating data traversal programs to represent the result of the sort operation will be described in further detail below.

Figure 10D:
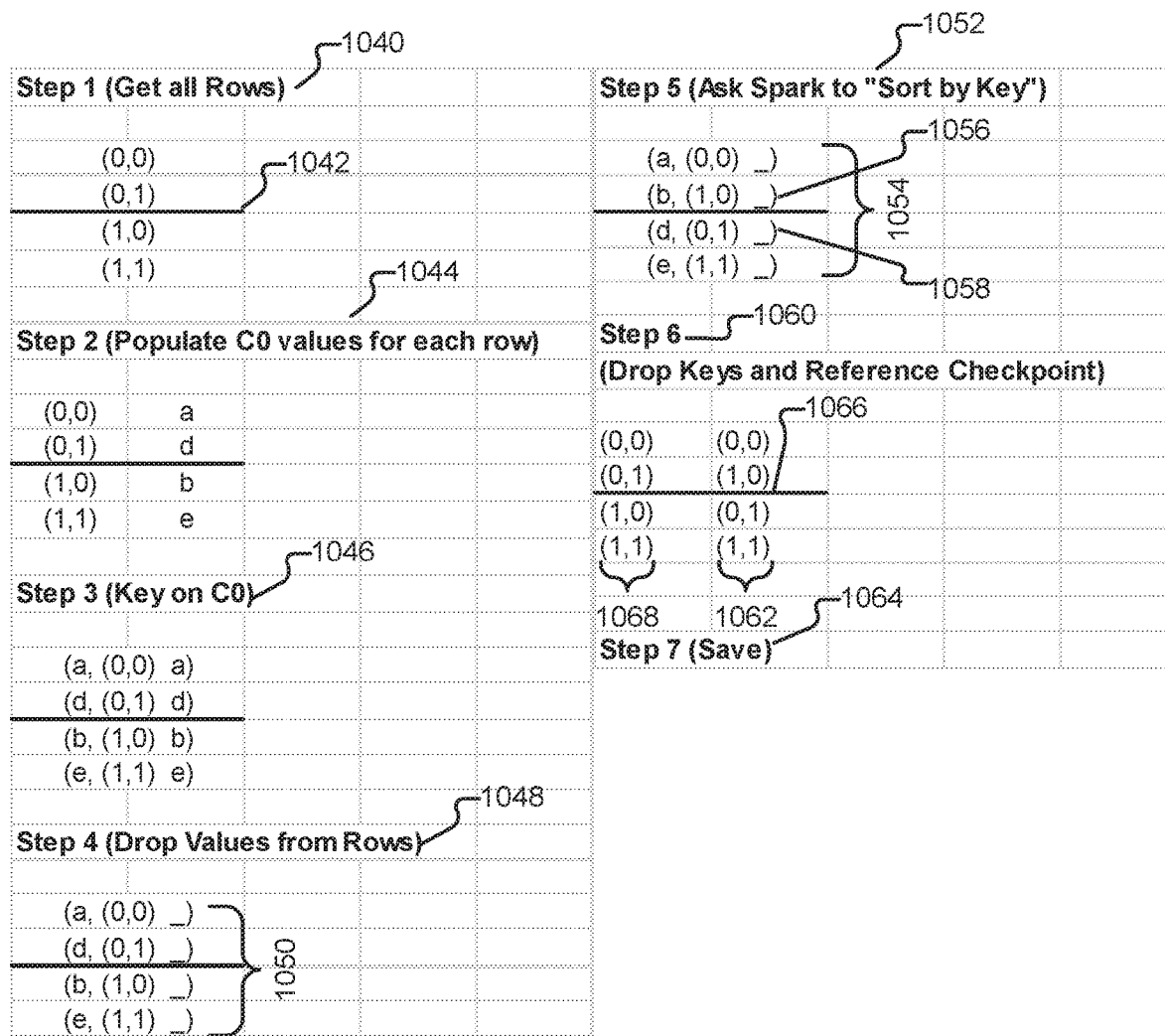
FIG. 10D is a diagram illustrating an embodiment of a process for performing a sort operation.

FIG. 10D is a diagram illustrating an embodiment of a process for performing a sort operation. In this example, the sort operation will be implemented in part by generating and sorting key-value pairs. A key-value pair allows for data to be represented as a value and some key that characterizes that value. In the following example, the key will be what is sorted on. As will be shown in this example, key-value pairs will be generated, wherein the value of the key-value pair is a row (represented by a set of references) and the key is the actual data value of C0 for that row. The key-to-row pairs will then be sorted by key, which will cause the rows (references) to be rearranged (e.g., across the partitions). One embodiment of the sort operation processing is performed as follows. As will be shown below, the result of the processing will be an updated references table for an updated data traversal program that represents the result of the sort operation on the imported data set DS.

At step 1 (1040), all rows of the data set DS are obtained. Each row of the data set DS is represented using a set of one or more references, which are obtained from data traversal programs 1012 and 1018 of FIG. 10B. In this example, the references above line 1042 were obtained from data traversal program 1012 of partition zero. The references below line 1042 were obtained from data traversal program 1018 of partition one. In some embodiments, the references shown at step 1 are the references table for each partition.

At step 2 (1044), C0 values for each row are populated. As will be shown below, the C0 values will be used as keys for each row. A sort will then be performed on the keys. In some embodiments, the C0 values for each row are obtained by executing data traversal programs 1012 and 1018 of FIG. 10B to look up C0 values from respective file sets in the manner described above.

At step 3 (1046) keys on C0 are generated. In this step, the obtained C0 values are used as keys that are paired with their corresponding rows (references) to generate key-to-row pairs. In some embodiments, at step 3, the values that were obtained at step 2 are extracted to the key position. In some embodiments, step 3 is an intermediate step to generating a key-to-row, key-value pair. At step 4 (1048), the values obtained at step 2 are dropped from the rows. This results in a set of four key-value pairs as shown at 1050.

In some embodiments, the key-value pairs are generated by manipulating the reference tables in place. First, the references tables are obtained, as described in step 1. The C0 values are pulled/extracted from file sets at step 2 and added as additional cells of the references table (e.g., in a new column added to the right of the references table). The C0 values are copied to create the key-value pair by copying the C0 values to the left of the references table (as the left position corresponds to the "key" position of the key-value pair). The extracted values that were in the cells to the right of the references table are dropped to save storage space. The key-value pairs are also referred to herein as "key-to-row pairs."

In some embodiments, the key-value pair generation is performed in parallel, by various partitions/workers, as they stream in rows from file sets and obtain corresponding C0 values to be used as keys.

At step 5 (1052), the key-to-row pairs 1050 generated at step 4 are sorted by key (e.g., by issuing the Spark "sortByKey" command on the key-to-row pairs). The result of the "sortByKey" command is shown at 1054, where the key-value pairs have been sorted by the key values (i.e., C0 values). As shown, the position of key-to-row pair 1056 and key-to-row pair 1058 have been swapped due to the "sortByKey" command.

At step 6 (1060), the keys of 1054 are removed so that only references remain. As the keys were added to form key-value pairs for sorting purposes, they are no longer needed and are removed. After removal of the keys, only references 1062 remain. In this example, because a save point is to be created after the sort operation, at step 6, a reference checkpoint is also created (where, in some embodiments, each save creates a reference checkpoint). In some embodiments, creating the reference checkpoint includes, as with the filter operation described above, updating and saving the references tables. As with the filter operation, a new column of references is added (shown at 1068). In this example, column 1068 is added to the left of column 1062. The new entries in column 1068 are assigned reference values based on the updated partition/row identifier of their corresponding references in column 1062. For example, the top two references in column 1062 (above line 1066) will be associated with partition zero. Thus, the top two corresponding values in column 1068 above line 1066 will be (0,0) and (0,1). Similarly, the bottom two references in column 1062 will be associated with partition one. Thus, the bottom two corresponding values in column 1068 below line 1066 will be (1,0) and (1,1). If no save were to be performed after the sort operation, then column 1068 would not need to be added.

In some embodiments, as part of creating the reference checkpoint (because the references table is to be saved), a new row is added to the top of the corresponding reference stacks, as in the filter operation described above. For example, the new row in a references stack includes a handle/cache identifier to the corresponding saved references table, while the columns portion of the row is left empty. This newly added row of the reference stack corresponds to the new column that was added to the references table. In some embodiments, if no save were to be performed after the sort operation, then the new rows would not need to be added to the reference stacks.

Figure 10E:
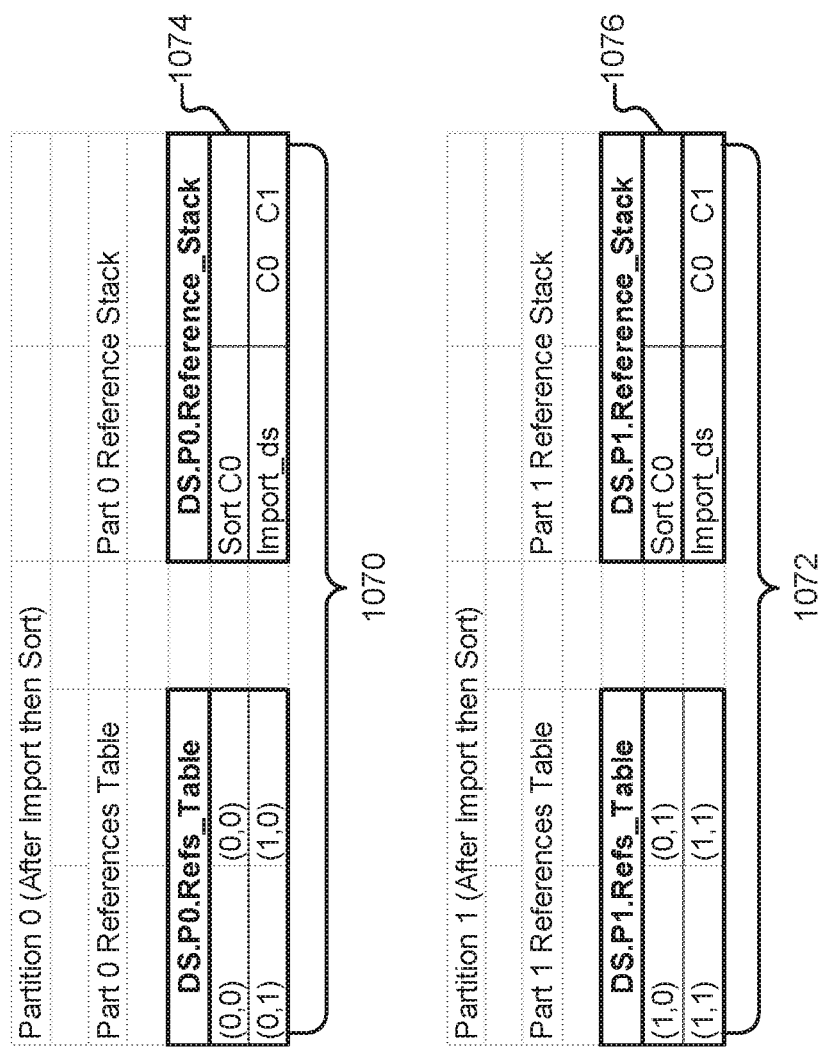
FIG. 10E illustrates an example embodiment of data traversal programs.

Examples of the updated references table and reference stacks are shown in conjunction with FIG. 10E.

At step 7 (1064), the references are saved. In this example, the references above line 1066 are saved as the newly updated reference table for partition zero. The references below line 1066 are saved as the newly updated reference table for partition one.

In one example implementation, steps 1-7 are implemented/performed as follows. Partitions zero and one separately and in parallel perform steps 1-4. In some embodiments, a partition performs steps 1-4 to obtain one key-value pair at a time (i.e., serially). As the key-value pairs are generated by the partitions, which operate in parallel, they are streamed by the partitions to a collector (e.g., Spark collector). For example, the collector is provided, by each partition, an iterator, which the collector uses to read one key-value pair at a time (i.e., by asking the iterator "next" to obtain the next key-value pair (if it exists)). The collector then sorts the key-value pairs as it receives them from the various iterators. Upon completion of the sort, the collector itself returns an iterator, from which the sorted key-value pairs can be streamed serially. The sorted key-value pairs are streamed to their appropriate partitions. This allows the references to be distributed to their appropriate partitions. In some embodiments, a global sort is performed. Key-value pairs are then sent to their appropriate partitions. A local sort is then performed inside a partition to ensure that the key-value pairs are in the correct order.

FIG. 10E illustrates an example embodiment of data traversal programs. In this example, the data traversal programs updated as of the sort on the C0 operation are shown (using the processing of FIG. 10D described above). The data traversal program for partition zero is shown at 1070. The references table for data traversal program 1070 was generated using the references above line 1066 of step 6 (1060) of FIG. 10D. The data traversal program for partition one is shown at 1072. The references table for data traversal program 1072 was generated using the references below line 1066 of step 6 (1060) of FIG. 10D.

In this example, as with the filter operation, no new data (columns) was written after the sort. However, because the results of the sort operation are saved, and a reference checkpoint created in step 6 above, a new entry/row has been popped onto the top of the reference stacks, as shown at 1074 and 1076. No columns were written, so the column portions of the new rows are empty. If no save were done, then the reference stacks for each partition would remain the same.

As shown in this example, as a result of the sort operation processing described above, the references (1,0) and (0,1) have exchanged partitions. Although the data traversal program for a partition includes references in its references table that were from two partitions, execution of the data traversal programs to read the subset of results maintained by those data traversal programs is performed in the same manner as described above.

For example, as the references table for a single partition includes two rows from different partitions, the values for those rows must be obtained from two different file sets (e.g., file sets 1014 and 1020 of FIG. 10B). However, there is only one cache identifier in the reference stack for the partition. By executing the data traversal program in the manner described in the examples of above, both file sets can be accessed. This is due in part to the names of file sets 1014 and 1020 sharing the same base/handle, "import ds." Thus, when executing the data traversal program, the appropriate file set will be obtained by combining the partition identifier of the reference/coordinates being evaluated to the base/handle "import ds" cache identifier from the reference stack. In some embodiments, the file sets are stored locally to the partition that wrote them. When a row exchanges partitions, in some embodiments, its corresponding file set is replicated locally on the node to which the row has moved. This allows the file sets to be locally accessible, improving speed in obtaining values, as well as reducing network bandwidth (e.g., in transferring data between nodes). In other embodiments, the file set is not replicated, and is referenced.

As shown in the above example sort processing, portions of the sort operation are performed in place, such as the generation of key-value pairs which will be sorted by key. This provides memory optimization, where a new memory space does not to be created to store key-value mappings. Rather, existing data entities are modified until they are in a format that is able to be sorted. Additionally, the only values that were read from the file sets were C0 values. The movement of the rows of the data set, represented by the references, was determined based on the sorting of just the C0 values. References were then moved to different partitions to create updated data traversal programs that reflect the result of the sort.

This is in contrast to the manner in which sort operations are handled natively in computing platforms such as Spark. For example, in Spark, actual data is moved and written, which involves a greater amount of data than writing references as described above, and is therefore more costly.

Figure 10F:
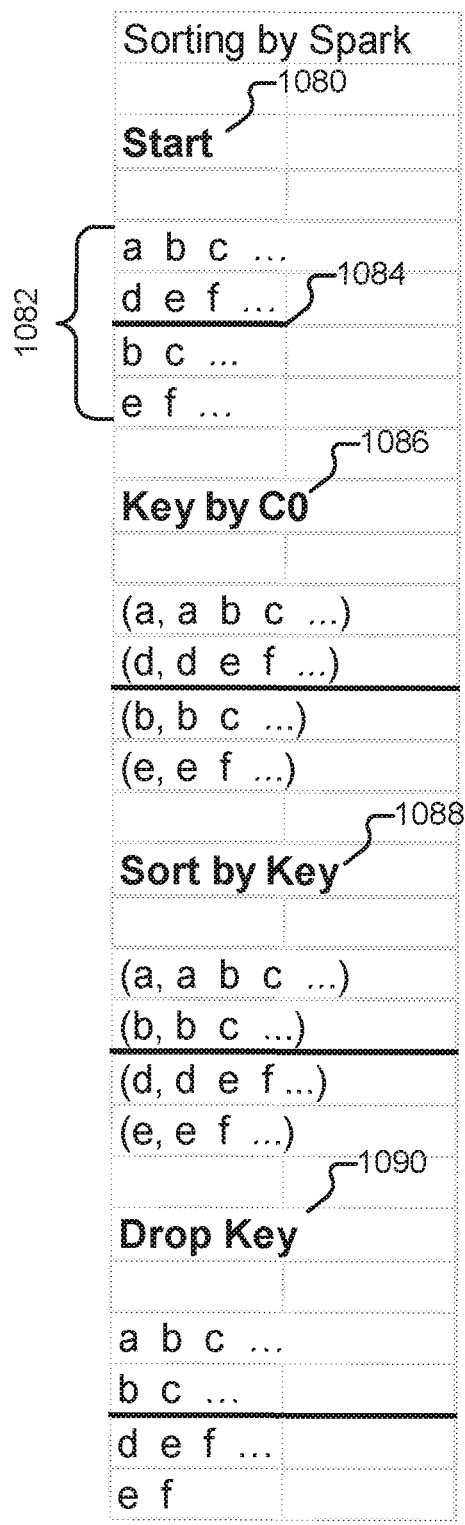
FIG. 10F illustrates an example embodiment of a native Spark sort.

FIG. 10F illustrates an example embodiment of a native Spark sort. Suppose in this example, that at start 1080, a data set 1082 has been divided into two partitions by Spark, as indicated by dividing line 1084. In this example, each row in the data set may have a large number of values, all of which will be operated on by Spark. This is in contrast to the techniques described herein, where references representing the rows of the data set are manipulated, rather than performing operations on entire sets of actual data. At 1086, keying by C0 values is performed to generate key-value pairs. At 1088, the key-value pairs are sorted by key. The keys are then dropped at 1090 to obtain the resulting data set. As shown in this example, the operation starts with all of the data of the entire data set, which is carried throughout the operation. This results in a potentially large consumption of resources, such as central processing unit (CPU) resources, memory resources, disk resources, bandwidth (e.g., to move entire data sets between partitions), etc. in order to accommodate the entire data set. Using the techniques described herein, rather than operating on actual data sets, a compact representation of the data set (e.g., data traversal program) is operated on, and data values are obtained only as necessary. This allows for a much smaller amount of data to be processed through a pipeline of sequenced operations, improving the efficiency of performing data preparation.

In the above, operations with respect to a single data set were performed. In the following example data preparation operations of append and join, multiple data sets are combined. The data sets before combining could have each potentially been processed through their own pipelines before being combined. As will be shown below, the resulting data traversal programs for the combined data sets will comprise partitions with multiple histories of what has happened to them.

Append

Figure 11B:
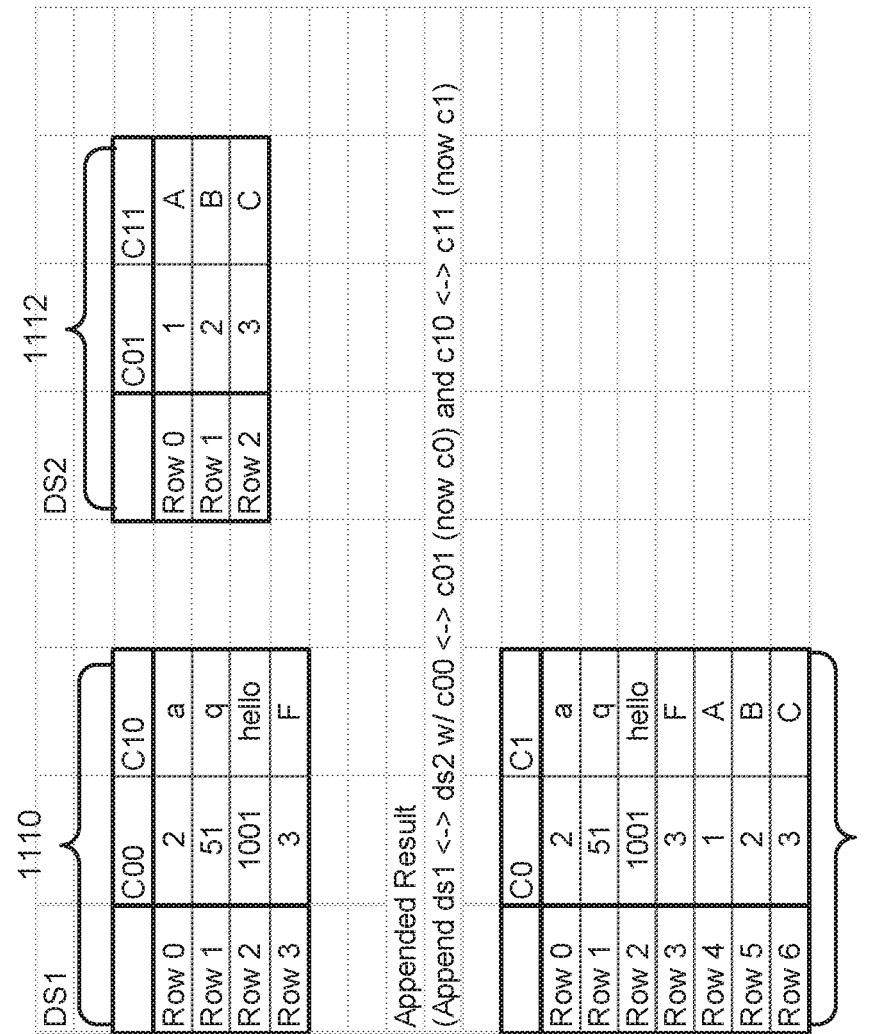
FIG. 11B illustrates an example embodiment of data sets to be appended.
Figure 11A:
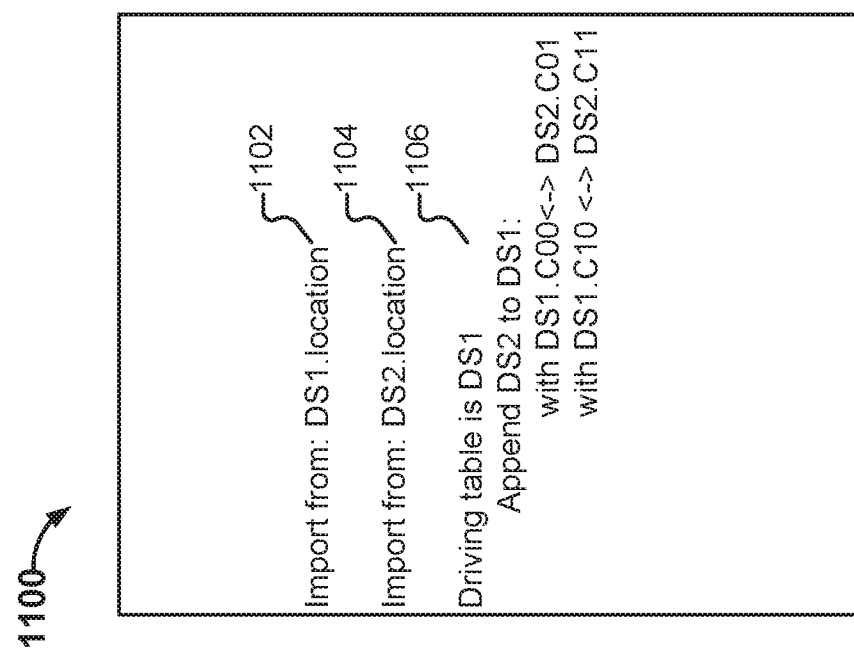
FIG. 11A illustrates an example embodiment of a script including an append operation.

FIG. 11A illustrates an example embodiment of a script including an append operation. At 1102, the location of a first data set (referred to as "DS1" in these examples) to be imported is specified. At 1104, the location of a second data set (referred to as "DS2" in these examples) to be imported is specified. At 1106, the append operation is specified. As part of specifying the append operation, one of the data sets to be appended is designated as the driving (anchor) table, to which the other table will be appended (referred to as the "append table"). In this example, DS1 is the driving table, and DS2 is the append table. In example script 1100 a specification of what columns in DS1 and DS2 to append on is also shown. In this example, column C00 of DS1 is mapped to column C01 of DS2. Column C10 of DS1 is mapped to column C11 of DS2. The example data sets DS1 and DS2 and the resulting appended data set based on the conditions specified in script 1100 are described in conjunction with FIG. 11B.

FIG. 11B illustrates an example embodiment of data sets to be appended. In this example, data set DS1 is shown at 1110. Data set DS2 is shown at 1112. The resulting appended data set is shown at 1114. As shown, as DS1 has been designated as the driving table according to script 1100 of FIG. 11A, DS2 has been appended to the bottom of DS1, where column C01 of DS2 has been appended to column C00 of DS1, and column C11 of DS2 has been appended to column C10 of DS1, the mapping of which was described in script 1100 of FIG. 11A. Also shown is a renaming of the columns for the appended data set. For example, the new column that includes column C01 of DS2 appended to column C00 of DS1 has been renamed to column "C0." Similarly, the new column that includes column C11 of DS2 appended to column C10 of DS1 has been renamed to column "C1."

Figure 11C:
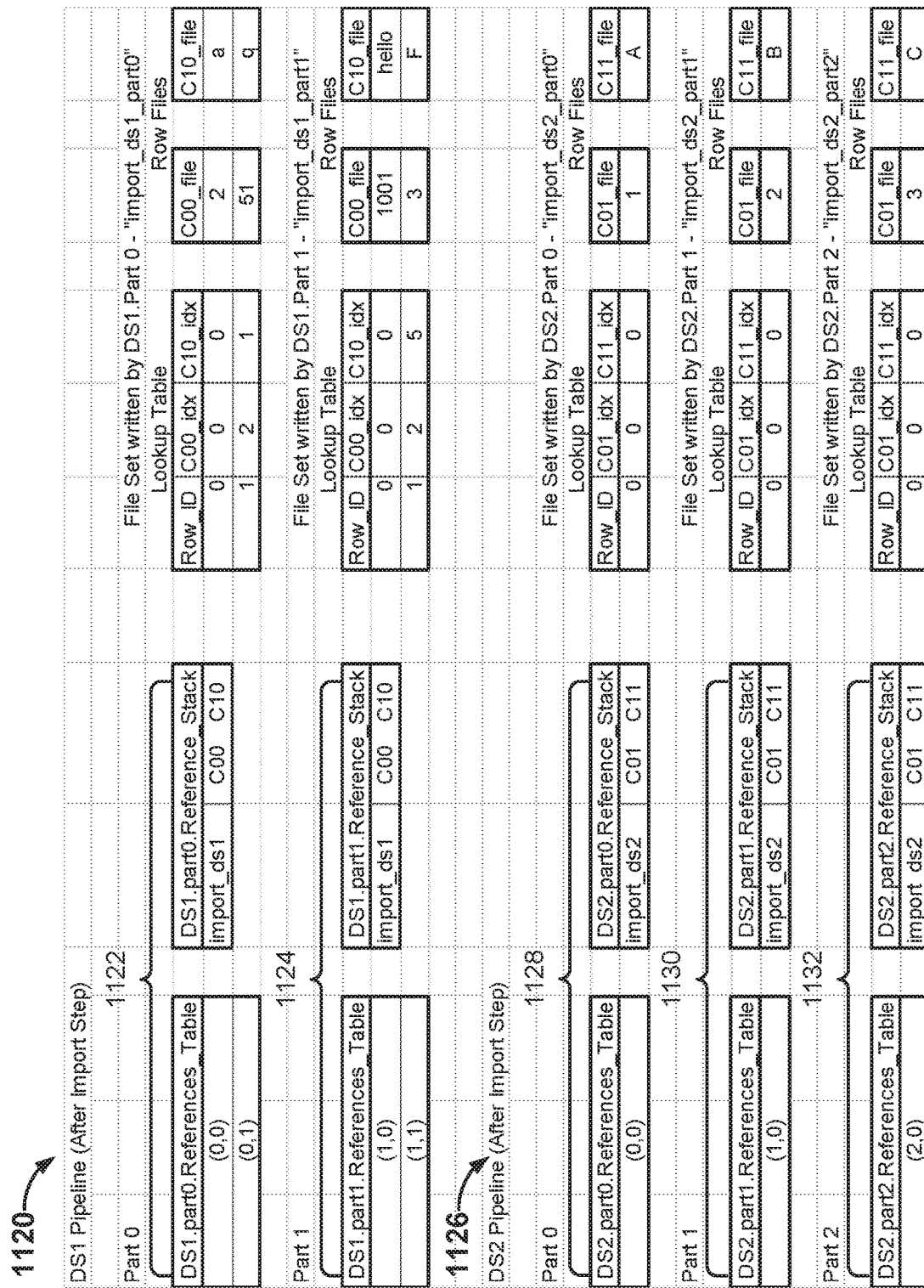
FIG. 11C illustrates an example embodiment of logical file/name spaces associated with pipelines for two different data sets.

FIG. 11C illustrates an example embodiment of logical file/name spaces associated with pipelines for two different data sets. Shown in this figure are DS1 and DS2, which have been imported prior to the append operation. In the example shown, DS1 and DS2 have been imported in their own respective pipelines (where a pipeline has been declared for DS1 and a separate pipeline has been declared for DS2). In some embodiments, declaring a pipeline includes importing the data set (e.g., as described above) and declaring the transformation steps that will be applied to the data set. In the DS1 pipeline 1120, DS1 has been divided into two partitions, partitions zero and one, each with two rows of DS1. The data traversal program for the partitions zero and one are shown at 1122 and 1124, respectively. The top two rows of DS1 are represented by data traversal program 1122 of partition zero, and the bottom two rows of DS1 are represented by data traversal program 1124 of partition one. In the DS2 pipeline 1126, DS2 has been divided into three partitions (partition zero, partition one, and partition two), each including one row of DS2. The data traversal program for the partitions zero, one, and two are shown at 1128, 1130, and 1132, respectively. The top row of DS2 is represented by data traversal program 1128 of partition zero, the middle row of DS2 is represented by data traversal program 1130 of partition one, and the bottom row of DS2 is represented by data traversal program 1132 of partition two. The corresponding file sets written by the partitions are also shown. In some embodiments, the data sets DS1 and DS2, being in different pipelines, were partitioned independently.

In this example, as independent pipelines have been declared for DS1 and DS2, the numbering for the logical partitions for each pipeline both start from zero. In some embodiments, each pipeline is associated with its own name/file space.

Figures 11D, 11E:
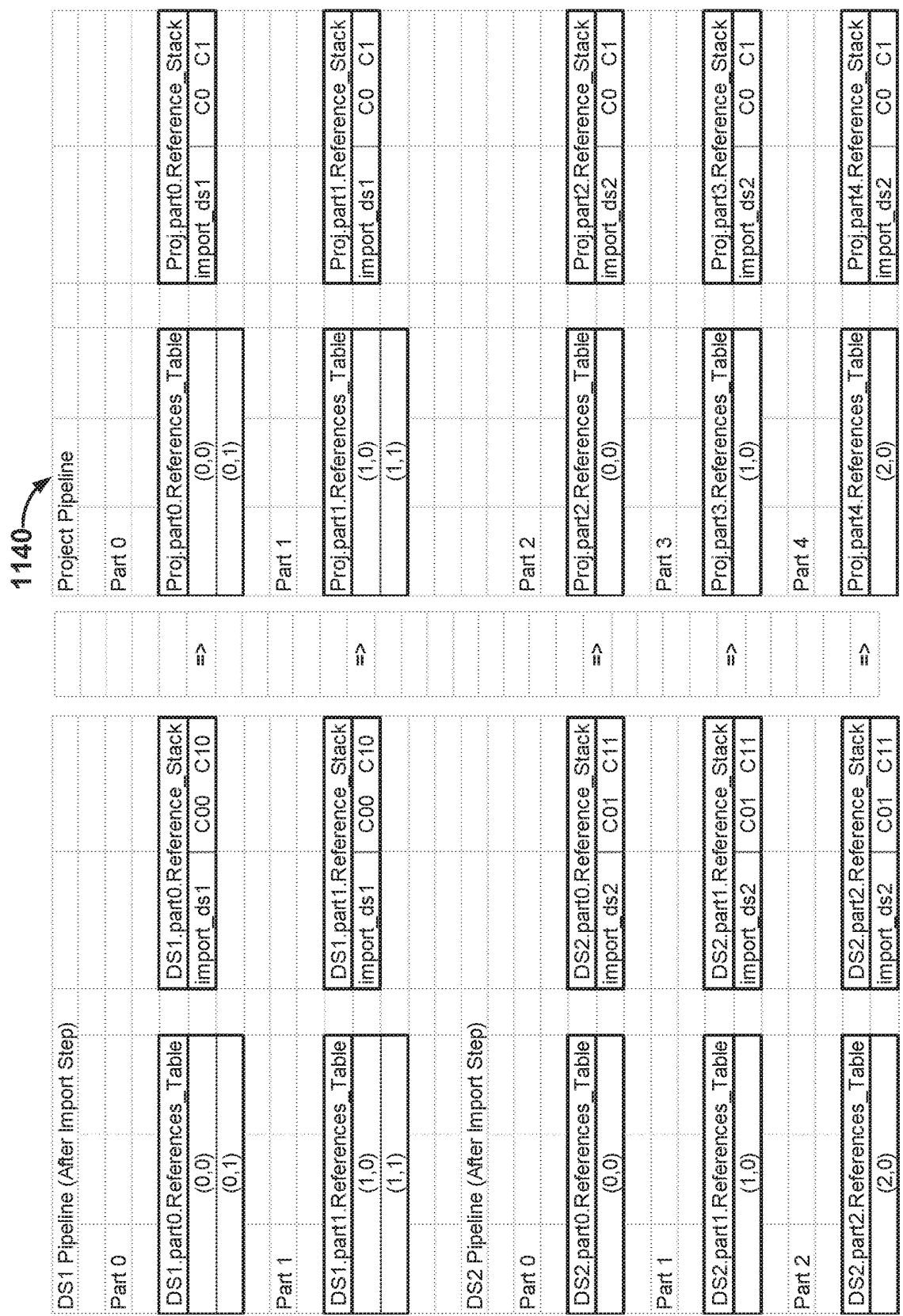
FIG. 11D illustrates an example embodiment of data traversal programs prior to an append.
FIG. 11E illustrates an example embodiment of data traversal programs subsequent to an append.
Figure 11:
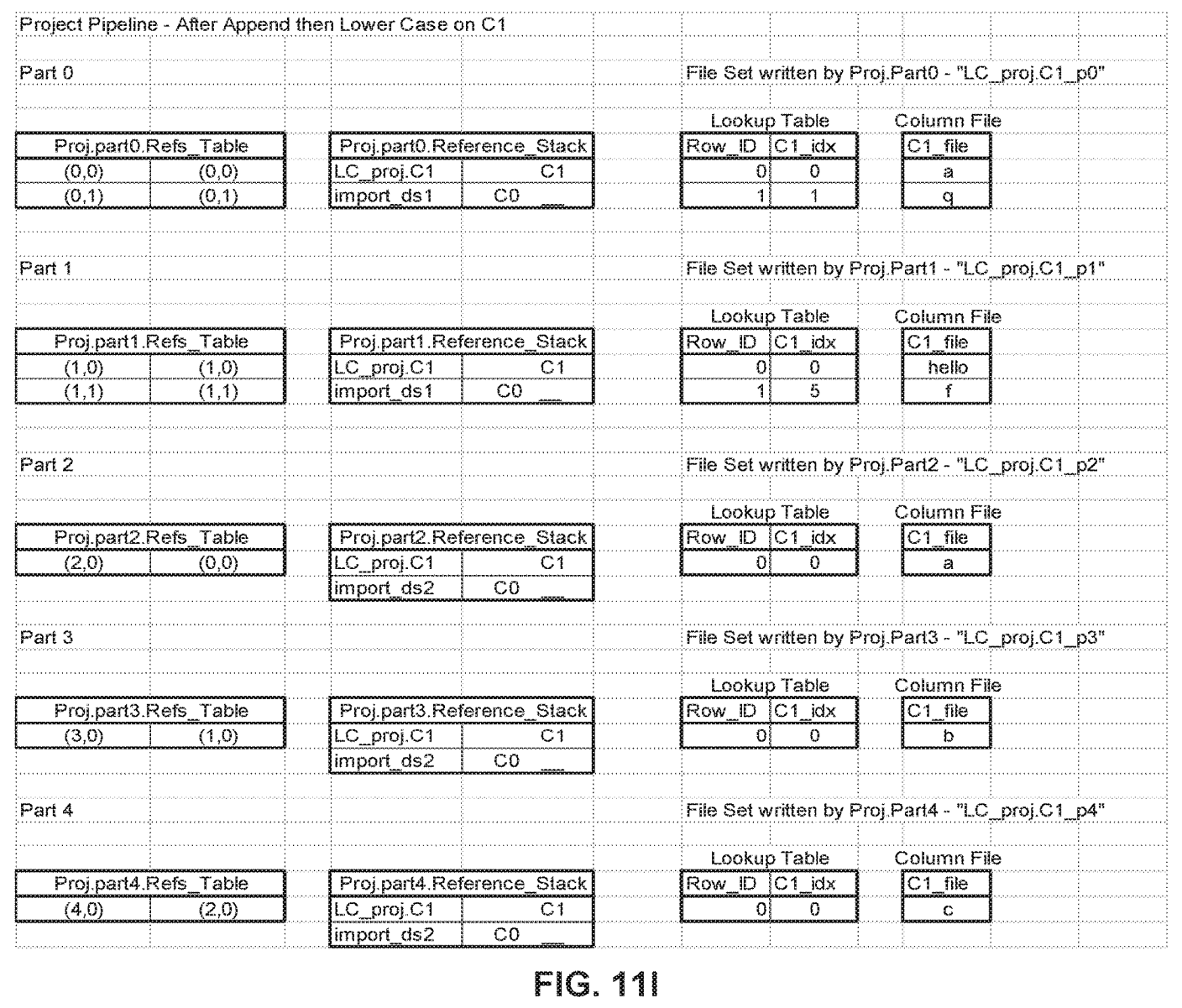

FIGS. 11D and 11E illustrate an example embodiment of data traversal programs before and after the append operation, respectively. The partitions and corresponding data traversal programs in the DS1 space and DS2 space shown in FIG. 11D correspond to the partitions and corresponding data traversal programs in the DS1 space and DS2 space shown in FIG. 11C.

In some embodiments, appending the two data sets includes creating a new pipeline for the appended result (e.g., a new pipeline is declared for the new appended data set). The pipeline includes its own file/namespace and partitions. In this example append, the number of partitions in the new pipeline equals to the total number of partitions across the two pipelines for the data sets being appended together. For example, if DS1 included M partitions, and DS2 included N partitions, the new pipeline would include M+N partitions. Thus, in this example, as the DS1 pipeline includes two partitions, and the DS2 pipeline includes three partitions, the resulting pipeline (referred to herein as the "project" pipeline) includes five partitions.

The append operation effectively places the rows of DS2 under the rows of DS1. As will be shown below, this result is represented by placing all of the partitions of DS1 and DS2 under a single pipeline (the new "project" pipeline). By doing so, the partitions are treated as one single data set (rather than two separate data sets, as they were prior to the append). When placing the partitions under the single pipeline, the partitions (which include their corresponding data traversal programs) are renumbered so that their ordering reflects the new arrangement of rows in the appended data set (i.e., the partitions have been remapped from their original pipeline space to the new project pipeline space). An example of the resulting "project" pipeline space is described in conjunction with FIG. 11E.

FIG. 11E illustrates an example of partitions in a pipeline file/namespace. In this example, "project" pipeline 1140 was declared as part of the append operation. Project pipeline 1140 includes five logical partitions.

As shown, each partition of the new pipeline corresponds to an existing partition in the DS1 and DS2 pipeline spaces. In this example, project pipeline partition zero corresponds to partition zero of the DS1 space. Project partition one corresponds to partition one of the DS1 space.

Because DS2 is appended below DS1, partition zero of DS2 pipeline space corresponds to partition two of the new project pipeline space. Partition three of the project pipeline space corresponds to partition one of the DS2 pipeline space. Partition four of the project pipeline space corresponds to partition two of the DS2 pipeline space.

As shown, the partitions of the DS1 pipeline space and the DS2 pipeline space have been effectively repartitioned under the new space of the project pipeline. As part of the repartitioning, the partitions from DS1 and DS2 are renumbered in a manner representing that the rows of DS2 follow from the rows of DS1 (e.g., the append table DS2 partitions are numbered to follow from the anchor table DS1 partitions).

As shown, each new partition inherits the data traversal program from its corresponding DS1 or DS2 partition. For example, the references tables and reference stacks are inherited. Because no data is moved or changed, the reference stacks, which include references to the existing file sets, remain the same in structure (e.g., where no new entry is popped onto the top of the reference stack because of the append operation processing). One change is in the naming of the columns to be found in the file sets referenced by the reference stack. The column names, which originally referred to their original names in DS1 and DS2, are renamed to indicate the new common name for the appended columns that are mapped to each other. In some embodiments, a record/bookkeeping is maintained of the mapping between original column names and their corresponding new names to which they refer. In this example, column C01 of DS2 is appended to column C00 of DS1. Both columns are mapped to a common column name, "C0." Similarly, column C11 of DS2 is appended to column C10 of DS1. Both columns are mapped to a common column name, "C1."

In the above examples, the partitions were added under a newly declared pipeline. In some embodiments, the partitions of the append table are pulled/incorporated into the pipeline of the anchor table, and renumbered accordingly (i.e., the partitions of DS2 are repartitioned so that they are consumed by DS1). For example, the partitions of DS2 are reassigned and incorporated into the DS1 pipeline, and are numbered such that they follow sequentially from the last partition number of the DS1 partitions. In some embodiments, rather than creating a new name for the columns that are mapped to each other in the append, a column in the append table assumes the name of the corresponding column in the anchor table (e.g., column C01 of DS2 assumes the name of column C00 of DS1 when it is integrated into the DS1 pipeline).

The data from this new appended data set in the new pipeline is read using the same techniques described above. In this example, the data traversal program of each partition of the project space is executed to obtain an ordered subset of the appended results. The subsets are combined together and ordered by corresponding partition numbers to arrive at the overall appended result. As shown, when assembling the overall result, data values will be pulled from file sets that were originally written for two different data sets (e.g., the file sets shown in FIG. 11C). While the appended result will have new column names "C0" and "C1," when performing a lookup of the file sets, the maintained mapping of the new column names to the original names in DS1 and DS2 will be used to perform the lookup and obtain the appropriate column values.

Thus, in the append operation, the processing described above creates a virtual representation of the appended data set, where the partitions (and corresponding data traversal programs) of the appended data sets have now been brought under a single logical space so that they will be treated altogether as a single data set. Further operations (e.g., sequenced set of data preparation operations) can be performed on the new logical single data set, an example of which will be described below.

Append Example—Lowercase on DS2.C11 Prior to Append

As shown in the above examples, separate pipelines were originally declared for DS1 and DS2. In the following example, suppose that prior to performing the append, a lowercase operation was performed on column C11 of DS2, while no further steps were performed on DS1 after being imported.

Shown in the example of FIG. 11F is the state of the partitions and corresponding data traversal programs of the DS1 pipeline space as of the import operation. Not shown are the corresponding file sets that were written when importing DS1.

Also shown in the example of FIG. 11F is the state of the partitions and corresponding data traversal programs of the DS2 pipeline space as a result of performing a lowercase on column C11 of DS2 after having imported DS2. The file sets written due to the lowercase operations are also shown. Not shown are the file sets written when importing DS2. In some embodiments, the data traversal programs and file sets shown are generated using techniques similar to those described in conjunction with FIGS. 7A-8B.

DS1 and DS2, whose virtual representations prior to the append are shown in FIG. 11G (which correspond to their counterpart representations shown in FIG. 11F), are virtually appended by remapping/repartitioning, as described above, the partitions in the DS1 and DS2 pipeline spaces to a new third "project" pipeline. The virtual representation of the results of the append operation are shown in FIG. 11H. Also shown is the renaming of columns in the reference stacks, whose structure, again, did not change, as no data values were written or moved.

As shown in this example, partitions zero through one of the DS1 pipeline were remapped to partitions zero through one, respectively of the new project pipeline. Partitions zero through two of the DS2 pipeline were remapped to partitions two through four, respectively, of the new project pipeline. Because an additional lowercase operation has been performed on column C11 of DS2 prior to the append, the reference stacks of partitions two through four have more entries than in project partitions zero through one. Additionally, the references tables for partitions two through four include an additional column as compared to the references tables for partitions zero through one. Thus, the partitions in the same pipeline have different reference stacks and references tables. This reflects the histories of the data sets prior to having been appended.

When reading the result of the append, the partitions of the project pipeline space are read using the same techniques described above (e.g., in conjunction with FIGS. 7B and 8B). For example, a partition of the project pipeline (representing operations on a single (virtual) data set) is accessed. The data traversal program for the partition is obtained. References, file handles, and columns to look up are obtained from the data traversal program. These items are used together to determine a file hash (or any other file name representation) to locate a file set. A lookup is performed on the found file set to obtain the values for the specified columns. By doing so, a subset of the cumulative results represented by the data traversal program of a partition is obtained. Subsets of the cumulative results obtained from various partitions are combined together according to partition order.

Append Example—Lowercase on Proj.C1 (After Append)

In the above example of FIGS. 11F-H, a lowercase on column C11 of the DS2 operation was performed on DS2 before it was appended to DS1. The following is an example that continues from the example of FIGS. 11A-11E, in which DS1 and DS2 were appended directly after having each been imported. In this example, a lowercase operation on the new project's column C1 is performed after DS1 and DS2 have been appended.

The representation of the result of performing the lowercase on column C1 of the project is shown in FIG. 11I. In this example, all of the partitions of the project were affected by the lowercase operation, and thus all of the data traversal programs (including the references tables and references stacks) were updated (from the state of the virtual representation in FIG. 11E) to reflect the result of the lowercase operation.

Cache Fingerprint Example

Suppose, for example, that a first user had previously performed and saved/cached the results of having performed the lowercase on DS2.C11, prior to append, as shown in FIGS. 11F-H. Suppose, for example, that the signature/fingerprint attached to the cached representation indicates the steps that were performed that lead to the cached results (e.g., the signature is a hash of the operations, or a concatenation of the string representations of the operations that led to the cached results, etc.). In some embodiments, the fingerprint can be used to produce the tree structure 1150 shown in FIG. 11J, which shows the pipeline of an import DS2 step followed by a lowercase on column C11 of DS2.

Suppose that the next day, a second user uses a step editor interface to specify that they would like to append DS2 to DS1 and then perform a lowercase on the resulting C1 column, which is the sequenced set of data preparation operations that resulted in the generation of the representations described in conjunction with FIG. 11E.

Although the ordering of operations and the results of the different sequences of operations specified by the two users differs, before performing the second sequenced set of operations specified by the second user, it can be determined whether the previously cached representation can be leveraged to provide at least some or all of the results.

The following is an example of using signatures/fingerprints to determine whether an existing cached representation can be reused. Suppose, for example, that the second sequenced set of operations specified by the second user is used to derive a signature that corresponds to tree 1160 of FIG. 11K. The tree representation 1150 of the previously cached representation is also obtained. The trees can be compared to determine whether the graph or any subgraphs/paths match between the two. A match indicates that a cached representation for some portion of the second sequenced set of operations exists.

In this example, no direct match is found between 1160 and 1150. In some embodiments, tree 1160 can be further manipulated to determine an equivalent tree that can then also be compared to 1150. For example, an operator push down can be performed on 1160. In this example, the lowercase operation of 1160 is pushed down below the append to produce tree 1170. Trees 1160 and 1170 are functionally/semantically equivalent, in that performing a lowercase on column C1 of the data set resulting from appending DS1 and DS2 is the same as having performed the lowercase operation on C10 of DS1 and C11 of DS2 first before performing the append.

When comparing trees 1170 and 1150 together, it is determined that subgraph 1172 of 1170 matches to 1150. For example, a signature for portion 1172 (e.g., hash of the operations in portion 1172) matches to the signature for the cached results 1150 (e.g., an equivalent hash has been identified).

The cached result associated with the signature representing tree 1150 can then be obtained. In this example, the cached result associated with signature 1150 is associated with performing a lowercase operation on the values in column C11 of DS2. The cached result can then be leveraged to reduce the amount of computation to perform the second sequenced set of operations. For example, because a cached result associated with performing a lowercase operation on the values in column C11 of DS2 exists, a lowercase operation need only be performed on the values in column C10 of DS1, rather than computing the lowercase on all values in C10 of DS1 as well as the values in C11 of DS2. This reduces the amount of writing that needs to be performed. The results of the lowercase operation on C10 of DS1 can then be appended with the cached results to obtain the result desired by the second user.

Join

Described below is an example embodiment of processing associated with a join operation. While a full outer join is shown in the following examples, the techniques described herein can be adapted accordingly to perform any other type of join (e.g., Cartesian joins).

Figure 12A:
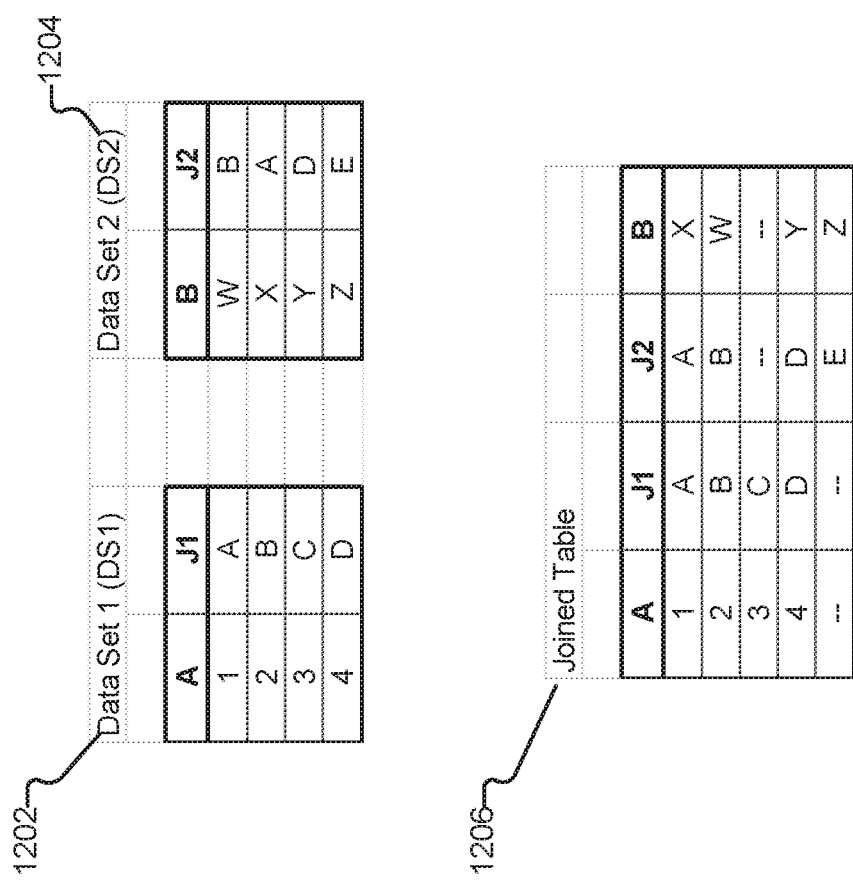
FIG. 12A illustrates an example of data sets to be joined.

FIG. 12A illustrates an example of data sets to be joined. In this example, suppose that a user would like to perform a full outer join of data set DS1 (1202) and data set DS2 (1204) on columns J1 and J2, with DS1 as the anchor/driving table and DS2 as the lookup table (i.e., DS2 is joined to DS1), which will result in joined table 1206. The join operation can be specified, for example, by a user via a step editor user interface, examples of which will be described below.

Figure 12B:
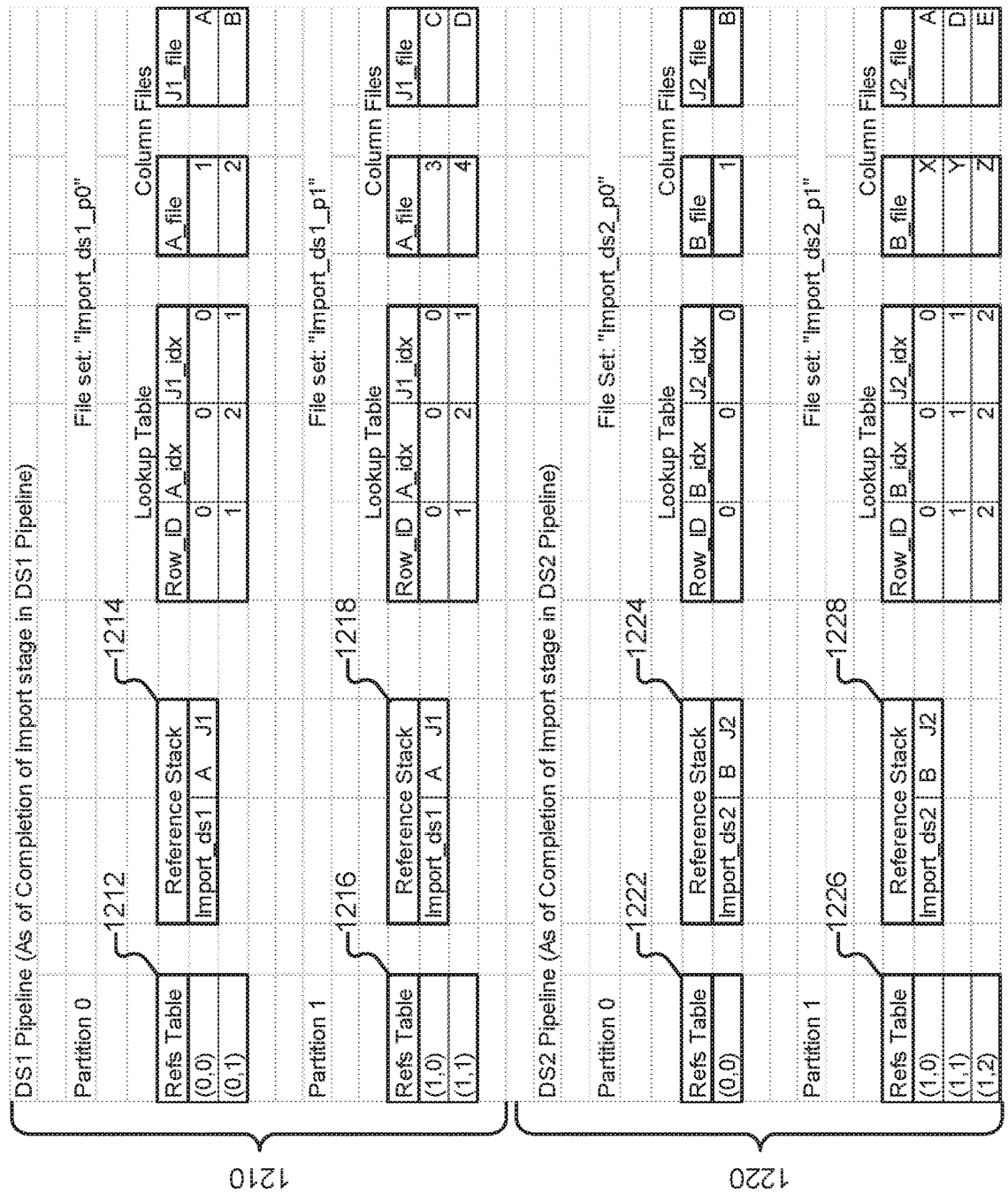
FIG. 12B illustrates an example of data traversal programs and file sets generated for imported data.

FIG. 12B illustrates an example of imported data. Continuing with the example of FIG. 12A, data sets DS1 and DS2 have been partitioned and imported into respective DS1 and DS2 pipeline spaces as shown at 1210 and 1220. Corresponding file sets written by each partition are also shown. Also shown are the current states (as of the import operation) of the data traversal programs (including references tables and reference stacks) for the partitions.

In this example, DS1 has been partitioned into two partitions, partition zero and partition one, as shown. Partition zero of the DS1 pipeline 1210 includes references table 1212 and corresponding reference stack 1214. The data traversal program including references table 1212 and corresponding reference stack 1214 represents the top two rows of DS1. Partition one of the DS1 pipeline 1210 includes references table 1216 and corresponding reference stack 1218. The data traversal program including references table 1216 and corresponding reference stack 1218 represents the bottom two rows of DS1.

In this example, DS2 has been partitioned into two partitions, partition zero and partition one, as shown. Partition zero of the DS2 pipeline 1220 includes references table 1222 and corresponding reference stack 1224. The data traversal program including references table 1222 and corresponding reference stack 1224 represents the top row of DS2. Partition one of the DS2 pipeline 1220 includes references table 1226 and corresponding reference stack 1228. The data traversal program including references table 1226 and corresponding reference stack 1228 represents the bottom three rows of DS2.

As in the example of append, a new pipeline is declared to represent the combined result of the join. In the example of the full outer join, the new pipeline space (referred to herein as the "project" pipeline) will include the same number of partitions as the aggregate number of partitions across the DS1 and DS2 pipeline spaces. An example embodiment of a process for arriving at the full outer join will be described below in conjunction with FIGS. 12C-E.

Figure 12C:
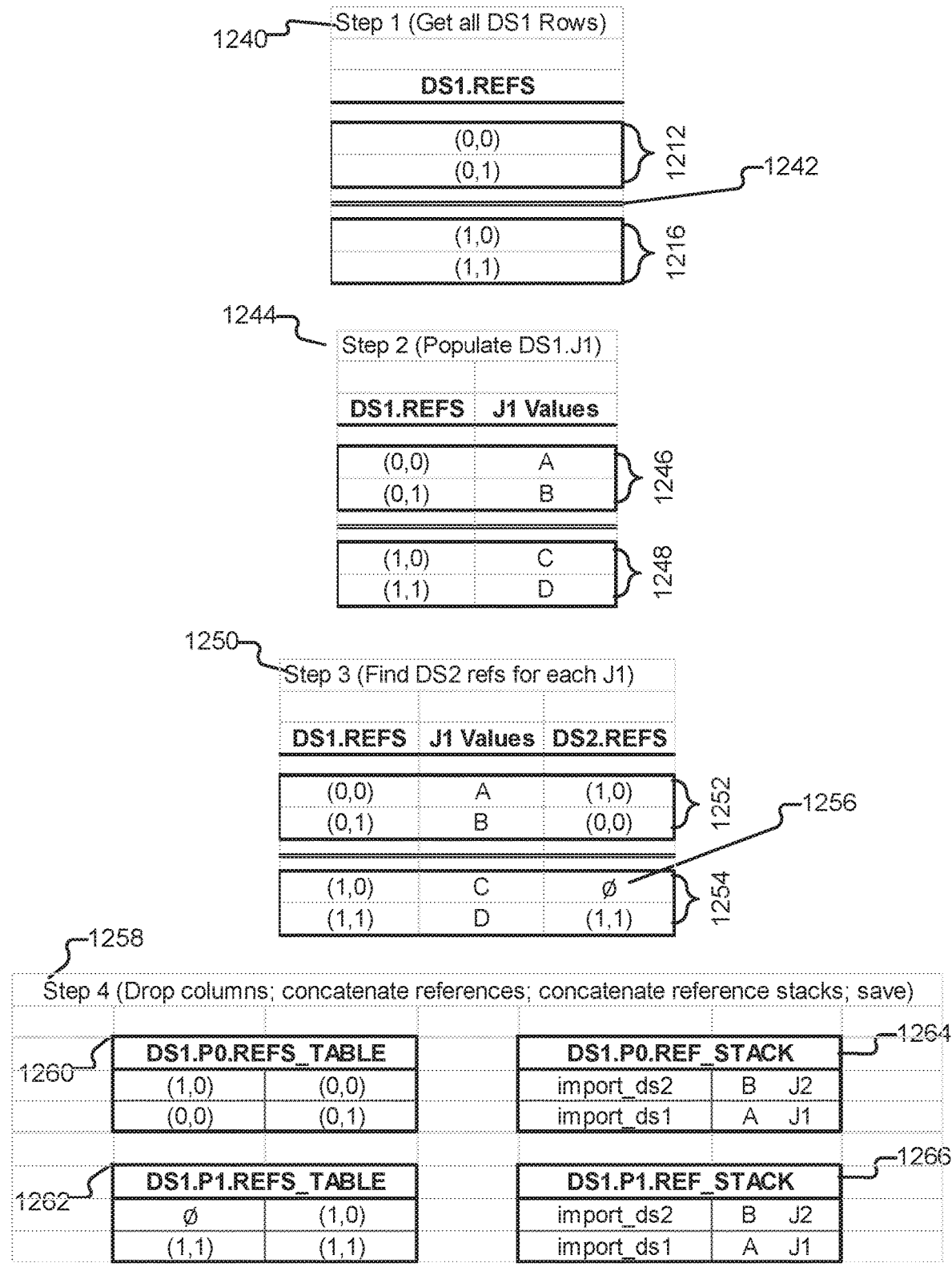
Figure 12D:
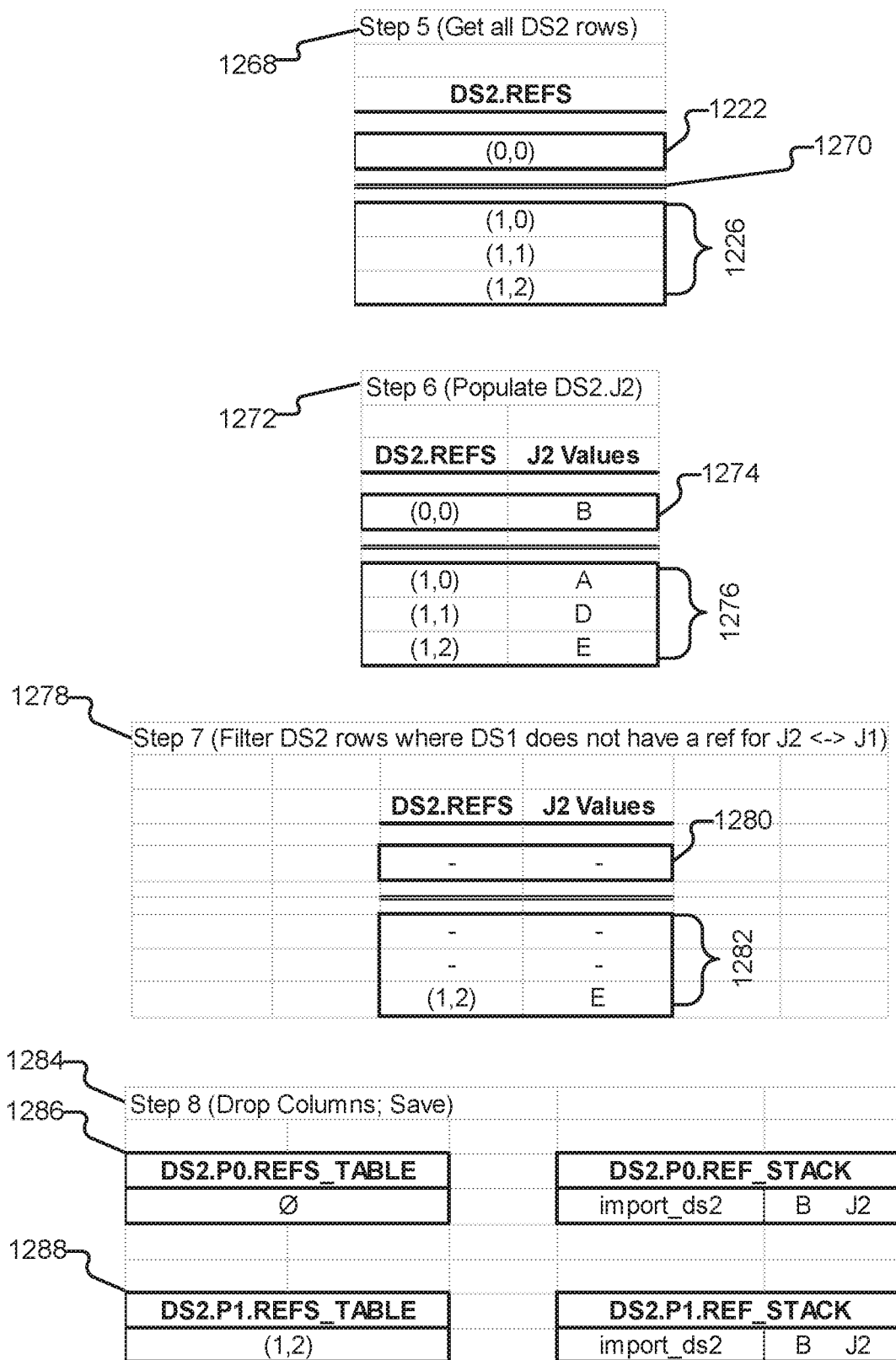

FIGS. 12C-E illustrate an example embodiment of a process for performing a full outer join. In some embodiments, the full outer join is performed by performing a left outer join and a right anti-join, with the results appended together to generate the virtual representation of the full outer join result. In the following nine steps described below, the first four steps are used to perform the left outer join. Steps five through eight are used to perform the right anti-join. Step nine is used to combine the results of the left and right joins to produce the representation of full outer join. The steps are described as follows.

Left Outer Join

FIG. 12C illustrates an example embodiment of a process for performing a left outer join. In some embodiments, the results of the left outer join are determined (and represented) by modifying/amending the data traversal programs (i.e., the references tables and reference stacks) of partitions zero and one of the DS1 pipeline 1210 shown in FIG. 12B. The processing performed in steps one through four is performed separately on each of the data traversal programs, but is shown together here for illustrative purposes.

At step one (1240), all DS1 rows are obtained. The rows of DS1 are represented by the references included in the references tables of the partitions of the DS1 space (e.g., references tables of partitions zero and one in DS1 pipeline space 1210 of FIG. 12B). In some embodiments, obtaining all DS1 rows includes obtaining the current references tables for each of the partitions of DS1.

For example, references table 1212 of partition zero of the DS1 pipeline space 1210 of FIG. 12B is obtained and shown above double line 1242. Similarly, the references table 1216 of partition one of the DS1 pipeline space 1210 is obtained and shown below line 1242.

At step two (1244) a column of J1 values corresponding to the rows/references obtained at step one is populated. For example, a column is added to the right of each of references tables 1212 and 1216 and is populated with corresponding J1 values, resulting in tables 1246 and 1248, respectively. In some embodiments, the J1 values are obtained by executing the data traversal programs shown in partitions zero and one of the DS1 pipeline space 1210 as shown in FIG. 12B.

At step three (1250), DS2 references for each J1 value are shown. In this step, the rows of DS2 (represented by their corresponding references) that include, in the J2 column, values matching to those in column J1 of DS1 are found. The identified rows are represented by references as indicated in the references tables of the partitions of the DS2 pipeline space 1220 of FIG. 12B.

In this step, the rows in DS1 and DS2 that share the same value in their respective J1 and J2 values are identified and mapped together. These rows will be concatenated together horizontally to create a joined row. In this example, the mapping is performed in part by adding an additional column (or columns if a row in DS2 is represented using multiple references) to the right of tables 1246 and 1248 to produce tables 1252 and 1254, respectively. The columns are populated with the appropriate DS2 references that have been identified as described above.

As shown at 1254, there is no row in DS2 in which the J2 column has the value "C" (i.e., the top row of references table 1216 in partition one of DS1 that is associated with the value "C" in its J1 column has no matching counterpart in DS2). In this example, the absence of a matching row is represented by the "0" symbol (1256).

At step four (1258), the J1 values columns are dropped from tables 1252 and 1254. For each of table 1252 and 1254, this leaves only the column of DS1 references and the column of corresponding/matching DS2 references remaining. The columns are concatenated together. In this example, the column containing DS2 values is concatenated to the left of the column containing DS1 values.

Thus, table 1252 is modified into table 1260, which is saved as the new, updated version of the references table for partition zero of the DS1 pipeline. Similarly, table 1254 is modified into table 1262, which is saved as the new, updated version of the references table for partition one of the DS1 pipeline. As each of the references tables for partitions one and zero of the DS1 pipeline have been updated to include a new column of corresponding DS2 references (that match according to the left outer join condition as determined in steps one through three, above), the corresponding reference stacks are updated as well. In this example, the reference stacks of DS2 (shown at 1224 and 1228 of FIG. 12B) are concatenated to the tops of reference stacks 1214 and 1218 of FIG. 12B to generate updated reference stacks 1264 and 1266, respectively.

Thus, the data traversal programs of partitions zero and one of the DS1 pipeline have been modified to represent the result of performing the left outer join. As will be described in further detail below, as the left outer join is an intermediary step in performing the full outer join, the updated partitions zero and one of DS1 will be repartitioned into the new project pipeline via an append Right Anti-Join FIG. 12D illustrates an example embodiment of a process for performing a right anti join of the full outer join. In some embodiments, the process of FIG. 12D continues from the process of 12C. In some embodiments, the results of the right anti join are determined (and represented) by modifying/amending the data traversal programs (i.e., the references tables and reference stacks) of partitions zero and one of the DS2 pipeline 1220 shown in FIG. 12B. The processing performed in steps five through eight is performed separately on each of the data traversal programs, but is shown together here for illustrative purposes.

At step five (1268), all DS2 rows are obtained. The rows of DS2 are represented by the references included in the references tables of the partitions of the DS2 space (e.g., references tables of partitions zero and one in DS2 pipeline space 1220 of FIG. 12B). In some embodiments, obtaining all DS2 rows includes obtaining the current references tables for each of the partitions of DS2.

For example, references table 1222 of partition zero of the DS2 pipeline space 1220 of FIG. 12B is obtained and shown above double line 1270. Similarly, the references table 1226 of partition one of the DS2 pipeline space 1220 is obtained and shown below line 1270.

At step six (1272) a column of J2 values corresponding to the column of DS2 rows/references obtained at step five is populated. For example, a column is added to the right of each of references tables 1222 and 1226 and is populated with corresponding J2 values, resulting in tables 1274 and 1276, respectively. In some embodiments, the J2 values are obtained by executing the data traversal programs shown in partitions zero and one of the DS2 pipeline space 1220 as shown in FIG. 12B.

At step seven (1278) tables 1274 and 1276 are filtered to identify DS2 rows where there is no corresponding DS1 row (represented using references) whose J1 column value matches to a DS2 J2 column value. In this example, no references in table 1274 survived, resulting in an empty table 1280. Only one row of table 1276 remains, resulting in table 1282.

At step eight (1284), the J2 values column of tables 1280 and 1282 are removed, leaving in each table only the DS2 references that remained (if any) as a result of the filtering operation in step seven. Thus, table 1280 is modified into empty table 1286, which is saved as the new, updated version of the references table for partition zero of the DS2 pipeline (represented with a "0" symbol). Similarly, table 1282 is modified into table 1288, which is saved as the new, updated version of the references table for partition one of the DS2 pipeline. In this example, the newly updated references for partitions zero and one of DS2 still obtain DS2 references, and the reference stacks for those partitions are not modified (e.g., are the same as shown at 1224 and 1228 of FIG. 12B).

Thus, the data traversal programs of partitions zero and one of the DS2 pipeline have been modified to represent the result of performing the right anti-join. As will be described in further detail below, as the right anti join is an intermediary step in performing the full outer join, the updated partitions zero and one of DS2 will be repartitioned into the new project pipeline.

Determining the Representation of the Full Outer Join Result

FIG. 12E illustrates an example embodiment of a process for performing a full outer join. In some embodiments, the process of FIG. 12E continues from the process of 12D.

At step nine (1290), the results of step four and step eight described above are appended together. In some embodiments, the appending is performed similarly to as described in conjunction with FIGS. 11A-I. For example, the partitions of DS1 and DS2 are repartitioned into a newly declared pipeline (referred to as the "project" pipeline), which also includes renumbering the partitions in sequential order in the new pipeline.

In this example, because DS1 is the driving table, partition zero of DS1 as of step four is repartitioned as partition zero of the new project pipeline, and includes the data traversal program including references table 1260 and corresponding reference stack 1264 as shown in FIG. 12C. Partition one of DS1 as of step four is repartitioned as partition one of the new project pipeline, and includes references table 1262 and corresponding reference stack 1266 as shown in FIG. 12C.

In this example, because DS2 is the lookup table, partition zero of DS2 as of step eight is repartitioned as partition two of the new project pipeline, and includes the data traversal program including references table 1286 and corresponding reference stack as shown in FIG. 12D. Partition one of DS2 as of step eight is repartitioned as partition three of the new project pipeline, and includes the data traversal program including references table 1288 and corresponding reference stack as shown in FIG. 12D.

In the above, the processing of FIGS. 12C (left outer join) and 12D (right anti-join) was described sequentially. In some embodiments, the processing of FIGS. 12C and 12D is performed in parallel. The results of the left outer join and right anti join are then appended together to determine the representation of the full outer join result as described above in conjunction with FIG. 12E.

As shown in the example virtual representation of the result of the full outer join shown in FIG. 12E, the reference stacks for partition zero and one of the project pipeline each include references to file sets and steps from disjoint sources. For example, the reference stacks for the project partitions zero and one each include handles for file sets that were generated both for the DS1 pipeline as well as the DS2 pipeline.

As described above, using the techniques described herein, a set of sequenced operations on one or more input data sets results in a virtual representation of the results of the operations on the data sets. The virtual representation includes data traversal programs, which when executed, output the actual data values of the results.

Additional Join Example—Lowercase on J2 of DS2 Before Join

In the following example, suppose that a user decides to perform a lowercase on column J2 of DS2 before it is joined with DS1. The state of the data traversal programs of the partitions of the DS1 and DS2 pipeline spaces prior to the join are shown in FIG. 12F.

In this example, no rows in DS2 will have J2 values that match to J1 values in the DS1 rows. By performing steps one through nine as described above in conjunction with FIGS. 12C-E, the result of the full outer join is represented as shown in FIG. 12G.

As shown above, the techniques described herein, such as the use of a representation such as a data traversal program, have various benefits. One example is an increase in the efficiency of storage, where the amount of storage needed to represent the results of operations is reduced. This is for example due to a compact data traversal program representation of the results being maintained, rather than actual values of a data set. As another example, the efficiency in processing speed is also increased, as only data that is modified by operations is written. Furthermore, by performing operations on references that represent data, rather than the actual data itself, further efficiency gains can be realized, as the references are more compact than the data itself (e.g., a set of references representing a row of data takes less space than the data values that make up the row). Additionally, by performing caching, as described above, as well as identification of caches, as described below, redundancy can be avoided, where, for example, existing cached results can be leveraged to avoid repeating computations.

Figure 13:
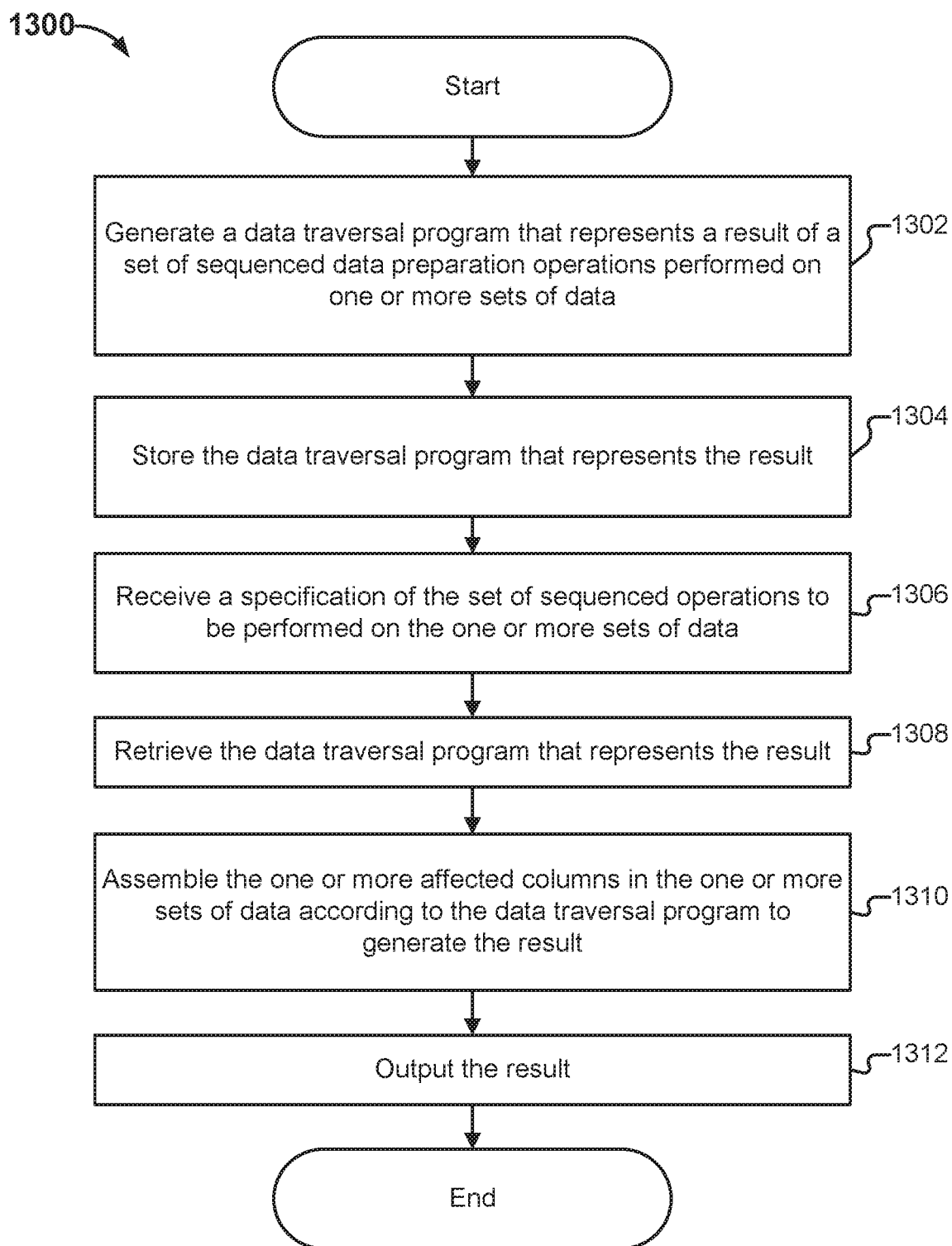
FIG. 13 is a flow diagram illustrating an embodiment of a process for caching transformation results.

FIG. 13 is a flow diagram illustrating an embodiment of a process for caching transformation results. In some embodiments, process 1300 is executed by data transformation engine 210 and caching engine 212 of FIG. 2. The process begins at 1302 when a data traversal program that represents a result of a set of sequenced data preparation operations performed on one or more sets of data is generated. In some embodiments, the set of sequenced data preparation operations form a pipeline through which the input data is pushed. In some embodiments, the data traversal program indicates how to assemble one or more affected columns in the one or more sets of data to derive the result. In some embodiments, the one or more sets of data are re-written as an addressable data set. For example, the one or more sets of data are re-written as column files, as described above, which are columns of cells stored in a file. In some embodiments, the values of the column files are obtained from the sources of the one or more data sets. As operations are performed, new versions of column files are written for those columns that are affected (e.g., modified/changed) by an operation. In some embodiments, the set of sequenced data preparation operations is received in the form of a script (e.g., generated by script generator 204 of FIG. 2). In some embodiments, the script is generated based on user input received via a step editor user interface (e.g., provided by user interface engine 202). The step editor user interface provides a user interface by which a user can configure a sequenced set of data preparation operations to be performed on one or more input sets of data.

The data traversal program records the cumulative effects of performing the set of sequenced data preparation operations. In some embodiments, as described above, the data traversal program includes references (e.g., stored in references tables). The references are references to mappings of row transformations that occurred during the set of sequenced data preparation operations. In some embodiments, the references refer to data values (e.g., in column files) that are used to describe/define a row in the result. In some embodiments, the data traversal program includes a reference stack. The reference stack includes a record/history of the sequenced operations and columns that were changed by the sequenced set of operations. In some embodiments, the reference stack includes references to file sets that store column files of data values that were written due to data preparation operations that were performed.

In some embodiments, the data traversal program requires less storage/memory than what is required to store the result. In some embodiments, the data traversal program is generated without moving the set of data. In some embodiments, the data traversal program is generated without generating the result.

In some embodiments, the manner in which the data traversal program is generated/updated throughout a sequenced set of operations is operation dependent, as described in the various data preparation operation examples above. Example techniques for generating and executing data traversal programs are described in the examples above.

At 1304, the data traversal program that represents the result is stored. For example, the data traversal program is cached to a cache layer. In some embodiments, data pertaining to the data traversal program, such as a references table is stored. In some embodiments, the decision of whether to store/cache a data traversal program can be based on a variety of factors. For example, a user can explicitly indicate (e.g., via an editor user interface) where in a sequenced set of operations that they would like to create a save point. The cache representation corresponding to that save point location will then be stored. In some embodiments, rather than storing the data traversal program, the data traversal program is maintained in memory.

In some embodiments, the decision of whether to cache a representation is based on the data operation that was performed. For example, the complexity/computational cost of an operation/set of operations can be considered. As one example, for costly/expensive operations, such as sort, filter, or join that affect an entire set, the resulting data traversal program can be cached. As another example, the cost of an aggregate set of operations can be considered. For example, while the cost of an individual operation, such as performing an uppercase, may be inexpensive, performing multiple of the operation (e.g., uppercases on twenty columns) may be costly. Thus, the contents of a script can be evaluated to determine where caching should be performed.

Another example factor that can be considered includes a measure of the likelihood that a user may revise an operation. For example, by observing, over time, various users' behaviors, the types of operations that are often changed or swapped out in scripts can be identified and learned.

By caching the representations at various stages of the pipeline, users can, for example, return to view the results of a certain point in a pipeline without recomputing the sequenced set of operations that led up to that point.

In some embodiments, the data traversal program is stored with a set of one or more corresponding signatures. In some embodiments, the set of one or more signatures is derived based on the set of sequenced operations that were performed. For example, each signature is generated using a hash function (e.g., a cryptographic hash such as MD5, SHA-1 or some other signature generating function). of the operations that were performed, where the operations are combined in a manner that preserves the order in which they were applied. Signatures are described in further detail below with respect to process 1400 of FIG. 14.

In some embodiments, the data traversal program representing the result can be recomputed and updated. For example, suppose that the user has performed a set of sequenced operations on a source dataset DSX. The next morning, another user makes a change to the source dataset DSX. In response to an indication that the source dataset DSX has been changed, the data traversal program can be updated by re-performing the set of sequenced operations on the modified source dataset (i.e., a new cache is built using the newer version of the data, allowing for automatic updating of caches).

At 1306, a specification of the set of sequenced operations to be performed on the one or more sets of data is received. At 1308, the data traversal program that represents the result is accessed. In some embodiments, a stored copy of the data traversal program that represents the result is accessed. In some embodiments, the data traversal program (or copy of) is accessed in response to receiving the specification at 1306. As one example, a user further performs data preparation steps beyond those that result in the data traversal program being generated. The user decides that they would like to go back to the stage in the pipeline at which the generated data traversal program was stored/cached. This indicates that the user would like to perform the same set of sequenced operations. The cached data traversal program is then retrieved.

As another example, another user happens to configure (e.g., via a step editor user interface) a same (or equivalent) sequenced set of data preparations as was performed to generate the cached data traversal program. A signature is derived from the received specification of the set of sequenced operations. The signature is determined to match to the signature of the cached data traversal program. The matching cached data traversal program is then obtained. Further details regarding the use of signatures to obtain cached results are described in conjunction with process 1400 of FIG. 14.

At 1310, the one or more affected columns in the one or more sets of data are assembled according to the data traversal program to generate the result. Examples of executing data traversal programs are described above in conjunction with FIGS. 7B and 8B. At 1312, the result is outputted. In some embodiments, outputting the results includes publishing or exporting them to another file. In some embodiments, outputting the results includes displaying the results. In some embodiments, only those results that are viewable in a current window of a UI are displayed. For example, if a result includes one thousand rows, but only three hundred rows are viewable in a UI, only those three hundred rows are assembled using the data traversal program. (More rows can be assembled to accommodate for potential scrolling by the user through the results). In some embodiments, the rows that are visible to the user determine the amount of computation to be performed. For example, rather than performing data preparation operations on all of the data, the operations are performed only on those rows that are visible to a user.

As one example, a determination is made as to what rows are viewable to the user (e.g., what rows are viewable in a user interface). Data preparation operations are only performed on those partition(s) that include (references to) the rows currently viewable by the user. This reduces the amount of calculation load while still providing the results that the user desires.

In some embodiments, as described above, process 1300 is performed in the context of a distributed computing environment (e.g., Spark distributed computing platform), where the one or more data sets to be operated on (transformed through a pipeline/sequenced set of data preparation operations) are divided into partitions (e.g., using process 500 described in FIG. 5) to be worked on (e.g., by pipeline executors, as described above).

In some embodiments, each partition includes its own data traversal program, which when executed provides a subset of the overall results of applying a set of sequenced data preparation operations to one or more sets of data.

One example embodiment of the processing performed at 1310 to assemble a result in such a distributed computing platform using data traversal programs is as follows. A subset of the cumulative results at a stage in the pipeline is obtained by accessing a partition. The data traversal program for the partition is obtained and executed. A set of references representing a row of the subset of results is obtained from a references table of the data traversal program. Each reference comprises a coordinate identifying a partition number and a row identifier. A coordinate is used in conjunction with an entry of a reference stack to identify and access a previously written file set. The file set includes a set of columns that were modified as a result of performing an operation. The row identifier is used to identify the row in a specified subset of the columns that was written to the file set. The values in that row for the specified subset of columns are obtained. The columns to be looked up are specified in the reference stack entry. Thus, one or more affected columns in the one or more sets of data are assembled according to the data traversal program.

The overall results as of the stage of the pipeline are determined by aggregating and collating the different subsets of results (e.g., by a pipeline master, as described above), where the various subsets of results obtained from the partitions are organized in a particular order (e.g., by partition order, as described above).

Knowledge of the location of different subsets of the result can be managed by a pipeline master. This can be used to perform optimizations when providing output. For example, when determining what window of results to provide in the UI to a user (e.g., as they are scrolling through a result), only those subsets of results corresponding to the current position of the user in the overall results are obtained from their corresponding partitions.

Figure 14:
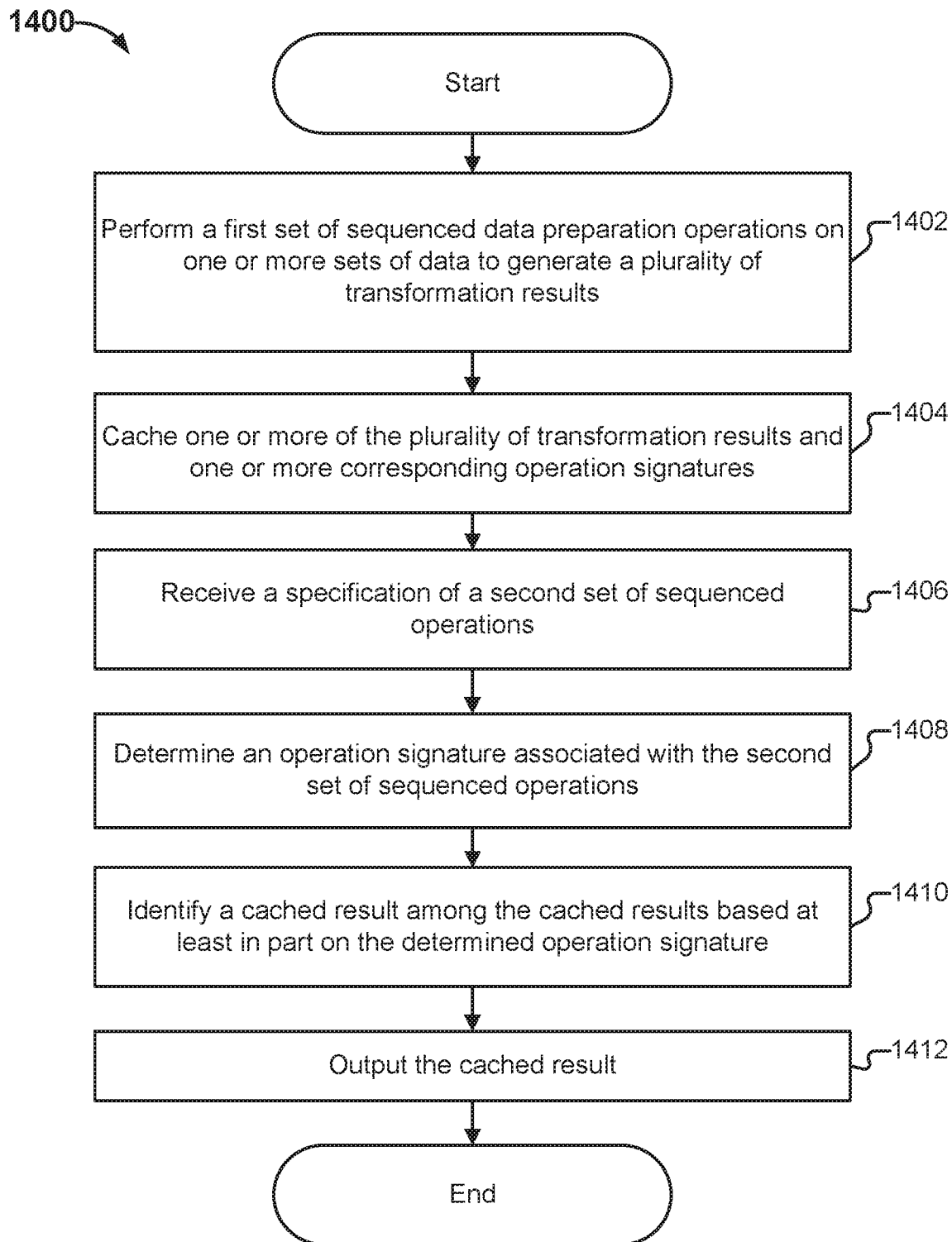
FIG. 14 is a flow diagram illustrating an embodiment of a process for cache reuse.

FIG. 14 is a flow diagram illustrating an embodiment of a process for cache reuse. In some embodiment, process 1400 is executed by data transformation engine 210 and caching engine 212 of FIG. 2. The process begins at 1402 when a first set of sequenced data preparation operations is performed on one or more sets of data to generate a plurality of transformation results. In some embodiments, a data preparation operation is an operation that transforms/mutates an input data. In some embodiments, the data is accessible dynamically upon execution of the set of sequenced operations, where the data is not necessarily stored, but may be computed on-the-fly, as needed. This is in contrast to operating against data stored at a fixed and known location. Further, the first set of sequenced operations is performed without the advantages of the input having been previously indexed and partitioned. In various embodiments, data preparation operations include clustering, joining, appending, sorting, uppercase, lowercase, filtering, deduplicating, grouping by, adding or removing columns, adding or removing rows, pivoting, depivoting, order dependent operations, etc. In some embodiments, the plurality of transformation results includes data traversal programs, such as those described in the examples above and in process 1300 of FIG. 13.

At 1404, one or more of the plurality of transformation results and one or more corresponding operation signatures are cached. In some embodiments, a cached operation signature is derived based at least in part on a subset of sequenced operations that generated a corresponding result. One example of a signature is a hash of the subset of sequenced operations. In some embodiments, the cached operation signature comprises an order independent grouping of representations of the subset of sequenced operations that were performed to arrive at the corresponding result. For example, the signature is a grouping of (hashed) identifiers (e.g., serial numbers, string representations, etc.) representing the subset of sequenced operations. In some embodiments, the grouping can be order-dependent. In some embodiments, having a signature based on a grouping of operation representations allows for collective comparisons with other groupings of operation representations, for example, to determine if there is any overlap between different groups of data preparation operations (e.g., specified in different sets of sequenced operations). In some embodiments, the cached operation signature is also derived based on a reference to the set of data that was operated on. For example, the cached operation signature can also be generated based on an identifier and/or version number of the set of data that is operated on. In some embodiments, the transformation results include data traversal programs, such as those described above.

At 1406, a specification of a second set of sequenced operations is received. For example, via a user interface, a user creates the new second set of sequenced operations or manipulates an existing set of sequenced operations. At 1408, an operation signature associated with the second set of sequenced operations is determined.

At 1410, a cached result among the cached results is identified based at least in part on the determined operation signature. For example, in some embodiments, the determined operation signature is compared with the signatures corresponding to stored results. For example, the groupings of operation representations associated with the signatures can be collectively compared with each other to determine any overlap (e.g., partial or complete overlap) between the operations of the determined operation signature and the operations associated with the stored results.

Figures 11J, 11K:
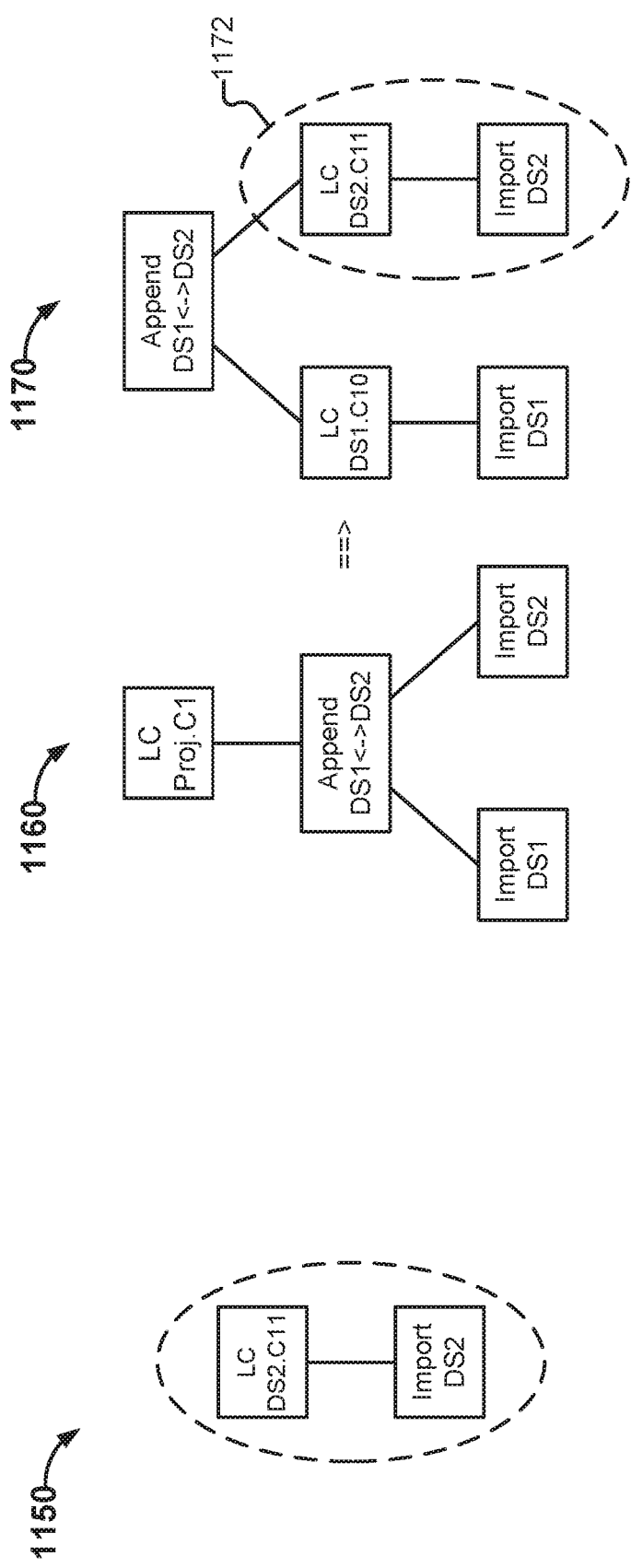
FIG. 11J illustrates an example embodiment of a tree representation of a set of sequenced operations.
FIG. 11K illustrates an example embodiment of a tree representation of a set of sequenced operations.

In some embodiments, the signatures correspond to graph structures such as those shown in FIGS. 11J-K that represent the flow of a set of sequenced operations. Comparing different signatures includes comparing different graph structures. In some embodiments, it is determined whether any or all of the signatures being compared match or are otherwise equivalent (e.g., sub-signatures can be identified). In some embodiments, operator push down, such as described above in conjunction with FIG. 11K, can be used to find matches. In some embodiments, the operator push down generates functionally (semantically) equivalent signatures. Thus, stored results that match to portions of the second set of sequenced operations can be identified and leveraged as well.

At 1412, the cached result is outputted. In some embodiments, if the stored result is equivalent to the result of having performed the second set of sequenced operations, then the identified stored result is outputted directly (e.g., displayed in a UI or published/exported). In some embodiments, if the identified stored result is a partial match and an intermediary result usable to obtain a desired final result, then that portion of the results is obtained and need not be computed. This reduces the amount of computation required to perform the second set of sequenced operations, which can incorporate the identified stored result to arrive at a final result.

Step Editor

FIGS. 15A-E illustrate example embodiments of user interfaces of a step editor usable to configure a sequence of data preparation operations and to view corresponding results. In some embodiments, the user interface examples of FIGS. 15A-E are implemented by user interface engine 202 of front end 200 of FIG. 2.

Figure 15A:
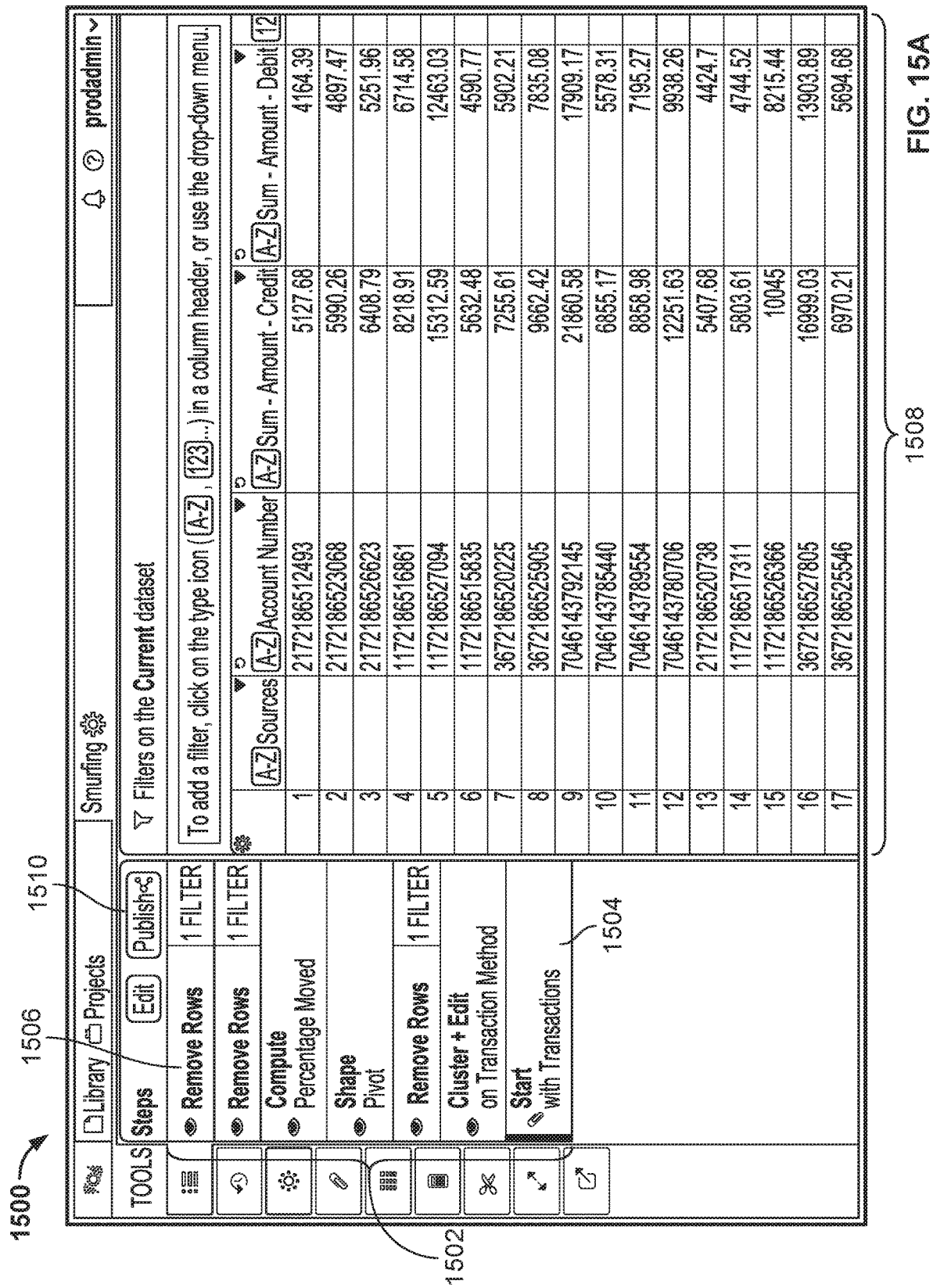
Figure 15B:
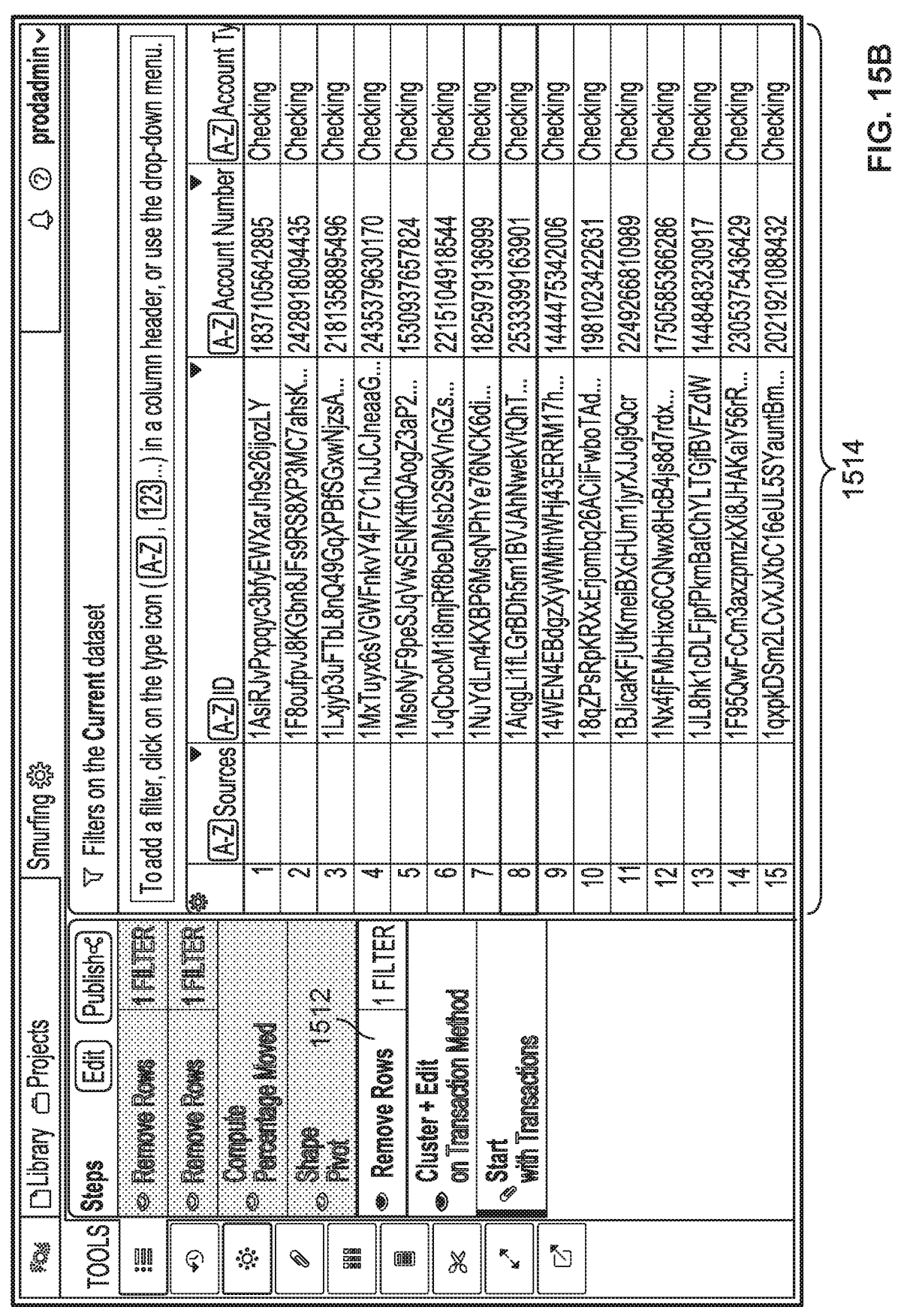
Figure 15C:
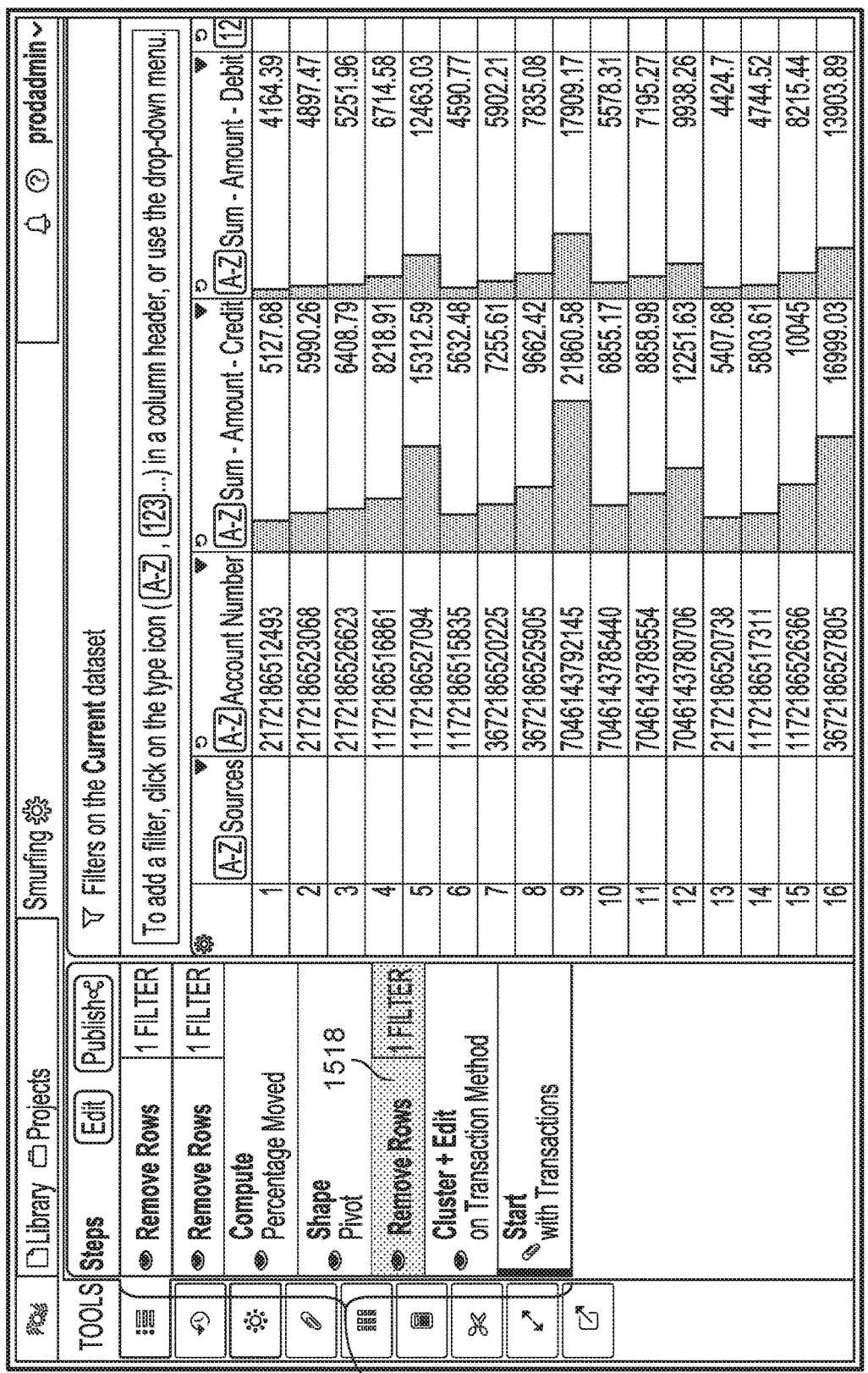

Suppose for example that a user, via step editor UI 1500 of FIG. 15A, specifies a set of sequenced data preparation operations 1502. The set of sequenced operations starts at 1504, where a data set (called "Transactions" in this example) is specified. In some embodiments, the data set is partitioned and imported using the techniques described above. A step in the set of sequenced operations can be edited to specify criteria on which the step/action is performed. For example, at step 1506, rows can be removed based on configurable filtering criteria. In some embodiments, the specified steps are used to generate a script (e.g., using script generator 204 of front end 200 of FIG. 2). The operations specified in the script are then performed, for example, by pipeline server 206 of FIG. 2 and/or pipeline server 300 of FIG. 3.

At 1508, results as of a particular step can be viewed. In this example, the result of having sequentially performed steps 1504-1506 is shown. The results can be determined using the techniques described above, where, for example, data traversal programs representing the result are generated. The data traversal programs can then be executed to output the corresponding results. By using such data traversal programs and operating on references that are intermediate representations of the actual data set (rather than operating on the actual data itself), the resulting increase in computational efficiency as described above can improve application response time, where for example, the results are provided to the user in real-time, without the user having to wait long periods of time for the operations to be performed. In some embodiments, only those results that are viewable in portion 1508 of the UI are computed and displayed, as described above. At 1510, the results as of a particular step can also be published (e.g., exported).

The step editor user interface also provides the ability to go backwards and forwards through the sequenced set of steps. Continuing with the example of FIG. 15A, suppose that the user would like to go back to the third step 1512 of FIG. B to see the data at that step. If the result at that step was previously cached (e.g., at a corresponding save point), then the cached result can be retrieved and displayed at display region 1514. For example, as the sequenced set of operations is performed, the results as of step 1512 can be saved by the user (e.g., by pressing a "save" button corresponding to that stage of the pipeline), or automatically saved (e.g., by a pipeline server such as pipeline server 300 based on various cost functions and criteria as described above).

In some embodiments, if there was no save point for that step, it is determined whether there are any existing cached results that can be leveraged. For example, as described above, operation signatures (e.g., hashes) can be generated for the current set of steps of interest and compared against the signatures associated with cached results. If a match is found, the matching cached result can be obtained so that the computations to arrive at the cached result need not be performed. In some embodiments, matches that identify cached results that are intermediary results on the path to determining a final result can also be leveraged. For example, the intermediary result need not be recomputed, reducing the total amount of computation needed to arrive at a desired result. If no matches are found, then the current set of steps can be executed to arrive at the desired result.

The user can also move forward again through the steps (e.g., to return to some point in the pipeline after having previously traversed backwards). Similarly to as described above, if the forward result has been saved/cached, then it can be retrieved and provided as output. If a cached result does not exist, then the results can be recomputed (e.g., by determining a new data traversal program).

In some embodiments, the step editor provides the ability to mute a step to see how data would look like with or without that step. Continuing with the example of FIG. 15B, suppose that a user, via interface 1516 of FIG. 15C, has indicated that they would like to mute the third step, 1518 (which is the same third step 1512 of FIG. 15B). In some embodiments, a new script is generated for steps 1520 that does not include 1518. In some embodiments, the operations of the reduced set of steps are used to generate one or more operation signatures. The generated signatures can be used to determine whether any existing cached representations can be leveraged. If not, then the new sequenced set of steps minus step 1512 of FIG. 15B is recomputed.

In one example embodiment, the signature generated based on the new sequenced set of steps is used to create a tree/graph representation of the new sequenced set of steps 1520 (with 1518 muted). This is compared with the tree/graph generated from the signatures of cached results. Using techniques similar to those described in conjunction with FIGS. 11J-K, it can be determined whether there are any existing cached results that can be leveraged. For example, operator push downs can be used when determining potential matches.

The results of muting step 1518 can then be displayed, as shown at 1519.

Figure 15D:
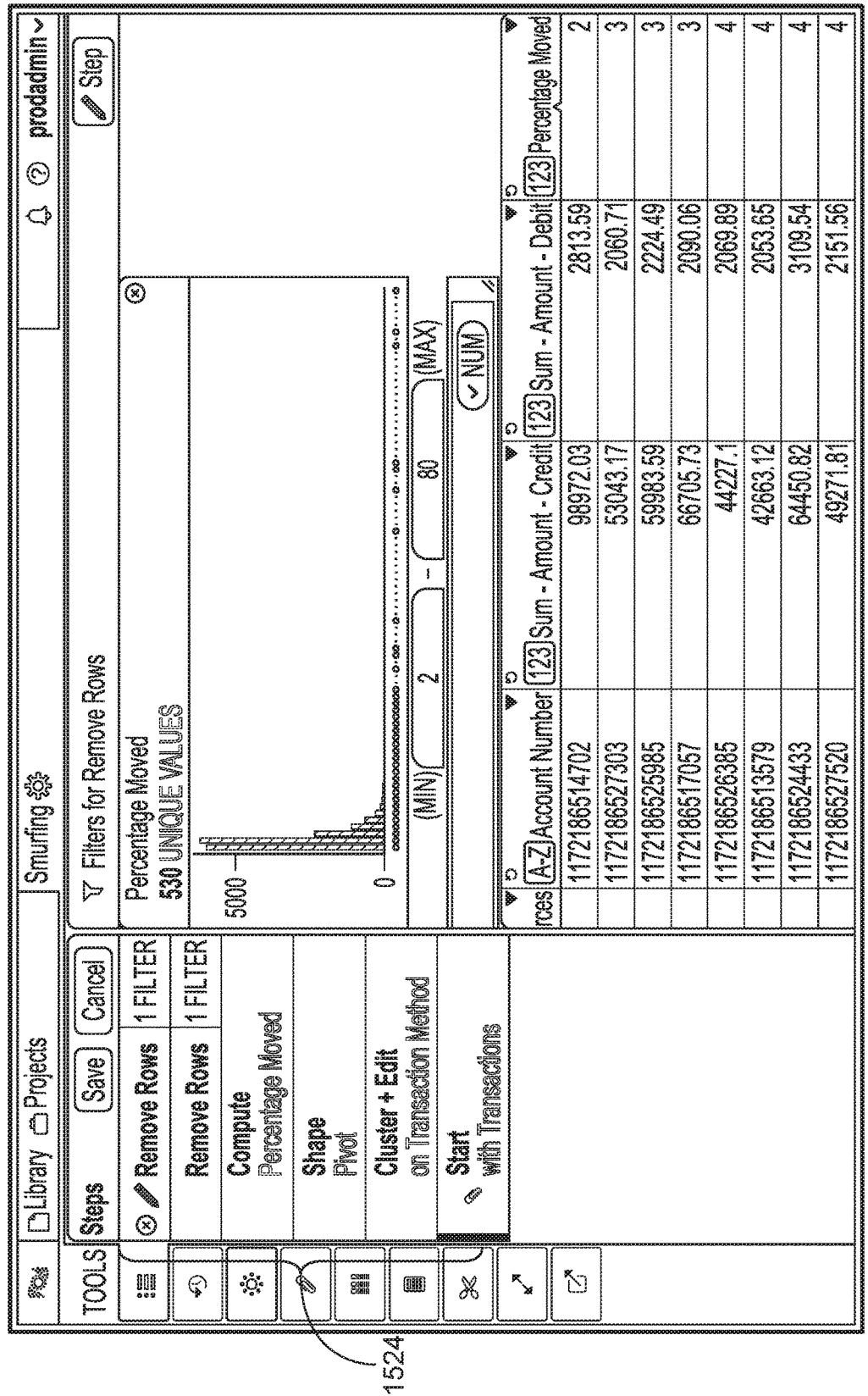
Figure 15E:
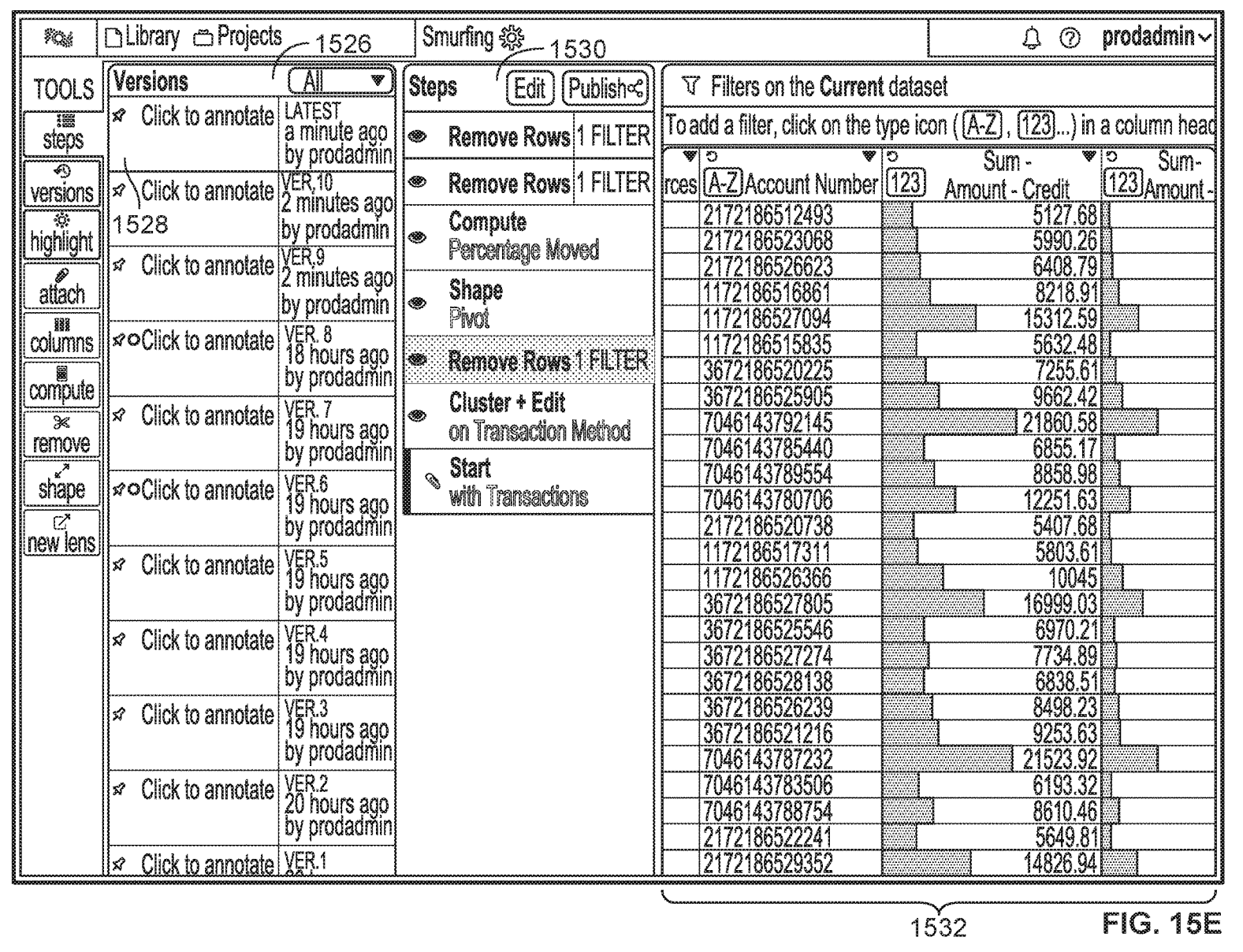

In some embodiments, the step editor also provides the ability to delete a step. Continuing with the example of FIG. 15C, suppose that the user, after viewing the data with step 1518 muted, decides to remove that step. Portion 1524 of interface 1522 of FIG. 15D is updated to reflect the removal of that step.

In some embodiments, the step editor also provides the ability to save changes to the sequenced set of operations. For example, as changes to a pipeline are made, each version of the pipeline can be saved as a different version of the project that is being worked on. For example, different versions of a project are shown at 1526 of FIG. 15E. In this example, the user has selected version 1528 to view. The corresponding pipeline for version 1528 of the project is shown at 1530. In this example, version 1528 was maintained by saving the state of the project as of FIG. 15C, where the third step was muted. The results for version 1528 of the project are shown at 1532.

Figure 16:
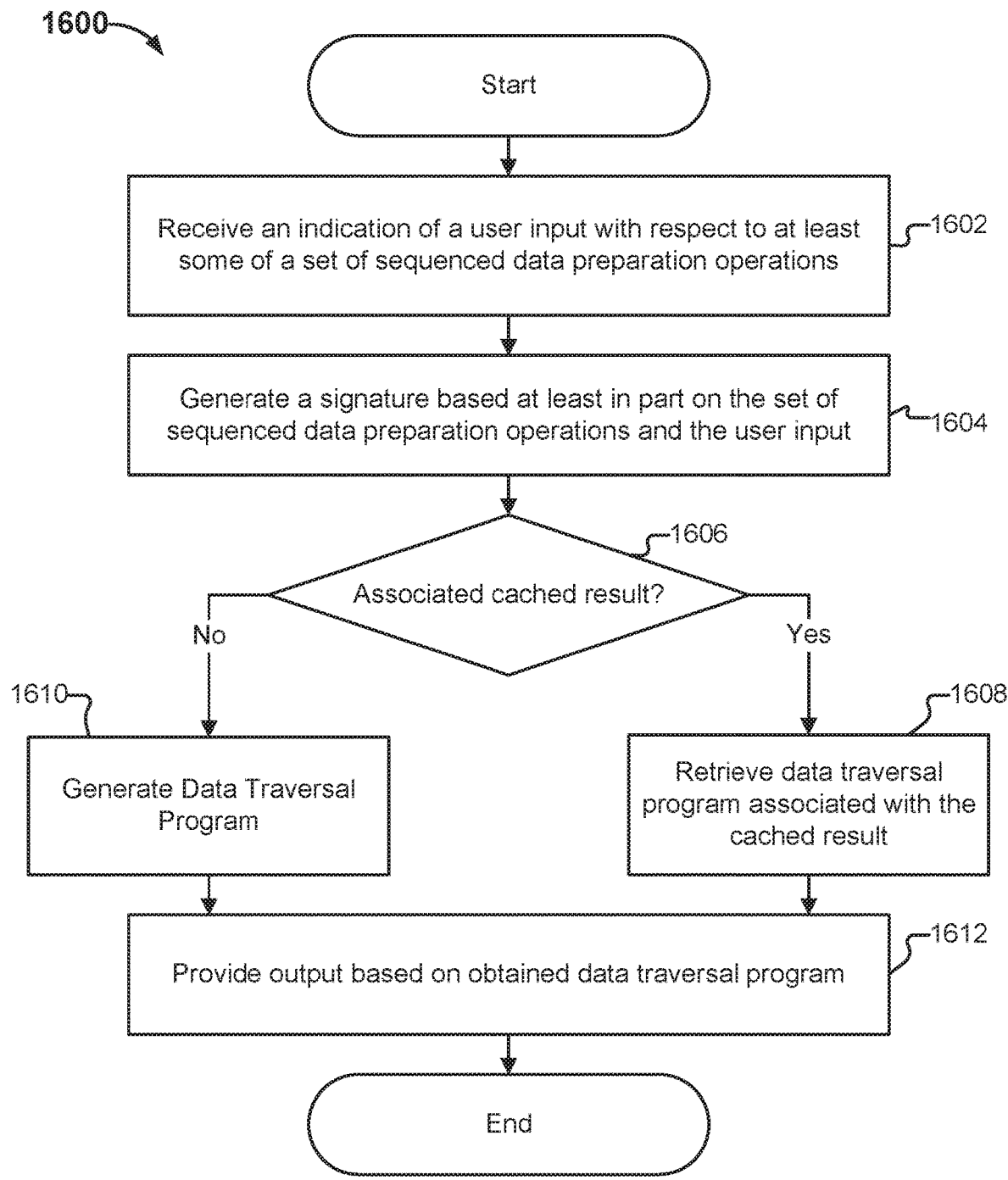
FIG. 16 is a flow diagram illustrating an embodiment of a process for using a step editor for data preparation.

FIG. 16 is a flow diagram illustrating an embodiment of a process for using a step editor for data preparation. In some embodiments, process 1600 is executed by pipeline server 206 of FIG. 2. The process begins at 1602 when an indication of a user input with respect to at least some of a set of sequenced data preparation operations on a set of data is received. For example, user inputs such as those described above (e.g., muting a step, deleting a step, stepping backwards/forwards through the set of sequenced data preparation operations, etc.), are received. In some embodiments, the user input is received via a user interface (e.g., such as step editor user interfaces 15A-E described above) provided by a front end such as front end 200 of FIG. 2 (e.g., using user interface engine 202). In some embodiments, the user input results in a modification to, or a selection of, at least some of the data preparation operations in the set of sequenced data preparation operations. In some embodiments, a script is generated (e.g., using script generator 204 of front end 200 of FIG. 2) based on the set of sequenced data preparation operations and the user input. In some embodiments, the set of sequenced data preparation operations is saved in response to the user input. For example, if a change to the sequenced set of data preparation operations is detected, then the new version of the sequenced data preparation operations is saved (e.g., versioning is performed, as described above).

At 1604, a signature is generated based at least in part on the set of sequenced data preparation operations and the user input. For example, if the user input modifies the set of sequenced data preparation operations (e.g., by muting or deleting a step), then a signature based on the modified set of sequenced data preparation operations is generated. As another example, if the user steps through the set of sequenced data preparation operations (e.g., forwards or backwards) to view the results as of some particular stage in the pipeline (e.g., as of step three in a set of five sequenced data preparation operations), then a signature can be generated for the subset of the sequenced data preparation operations up to the point indicated by the user. In some embodiments, the signature is generated based on the script that is generated in response to the user input with respect to the set of sequenced data preparation operations.

In some embodiments, the signature is generated based on the set of data being/to be processed. For example, references to/representations of the set of data are used to generate the signature. One example representation of the set of data is an identifier and version number of the set of data. For example, different sets of data can be associated with different identifiers. Different versions of the same set of data can be associated with different version numbers. As will be described in further detail below, signatures can be matched based on the set of sequenced data preparation operations, the user input with respect to the set of sequenced data preparation operations, and the representation of the set of data. For example, the same set of sequenced data preparation operations applied to two different sets of data would result in different signatures (and have different results as well).

At 1606, the generated signature is used to determine whether there exists a cached result associated with the set of sequenced data preparation operations, the user input, and the reference to the set of data. In some embodiments, the match determination and cached result identification is performed using the techniques described in conjunction with process 1400 of FIG. 14. For example, the generated signature is compared to signatures corresponding to cached results (represented by data traversal programs). Partial matches can also be identified. Similarly, other techniques described above, such as operation push down can also be used to identify matches. If an associated cached result exists, then the process continues to 1608. If an associated cached result does not exist, then the process continues to 1610.

At 1608, the matching associated cached result is retrieved. In some embodiments, the cached result is represented using a data traversal program, which is retrieved. In some embodiments, if the cached result is equivalent to the result of having applied the user input to the set of sequenced data preparation operations, then the retrieved cached result is outputted directly (e.g., displayed in a step editor UI or published/exported) at 1612. In some embodiments, if the identified cached result is a partial match and an intermediary result usable to obtain a desired final result, then that portion of the results is obtained and need not be re-computed. This reduces the amount of computation required to arrive at the final result. The final result can then be computed using the retrieved data traversal program associated with the cached result and outputted at 1612.

At 1610, if no matching cached result exists, then a data traversal program representing the result of applying the user input to the set of sequenced data preparation operations is generated (e.g., using the processing described above in conjunction with process 1300 of FIG. 13). The result represented by the generated data traversal program is then provided as output at 1612. For example, the results are published or exported (e.g., to an external file).

In some embodiments, the results are displayed to the user via step editor user interfaces such as those described above. In some embodiments, only those results that are viewable in a current window of a UI are displayed. For example, if a result includes one thousand rows, but only three hundred rows are viewable in a UI, only those three hundred rows are assembled using the data traversal program. (More rows can be included to accommodate for potential scrolling by the user through the results).

In some embodiments, the rows that are visible to the user can be used to reduce the amount of computation to be performed. For example, rather than performing data preparation operations on all of the data, the operations are performed only on those rows that are visible to a user. As one example, a determination is made as to what rows are viewable to the user (e.g., what rows are viewable in a user interface). (More rows can be included to accommodate for potential scrolling by the user through the results). Data preparation operations are only performed on those partition(s) that include (references to) the rows currently viewable by the user. This reduces the amount of calculation load while still providing the results that the user desires. Thus, by only performing operations on those rows that are visible to users, users are able to view real-time results as they interact with the step editor user interfaces (e.g., while making changes to the data preparation operations).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system, comprising:
a data processing system comprising memory and one or more processors to:
receive, from a user interface, a first set of operations to be applied in a sequential order to one or more sets of data;

transform, by the first set of operations, a first set of data among the one or more sets of data, to generate a second set of data;
cache a representation of the second set of data to re-generate the second set of data;
cache a first signature corresponding at least in part to a first graph structure of the first set of operations, and the second set of data;
receive a specification of receive, from the user interface, a second set of operations to be applied in a sequential order to one or more sets of data;
generate a second signature corresponding at least in part to a second graph structure of the second set of operations;
regenerate the second set of data based on the cached representation, in response to determining a match between at least a portion of the first graph structure corresponding to the first signature and at least a portion of the second graph structure corresponding to the second signature; and
instruct the user interface to present output based at least in part on the regenerated second set of data.

2. The system of claim 1 wherein the first set of operations comprises at least one of clustering, joining, appending, sorting, uppercase, lowercase, filtering, deduplicating, grouping by, adding or removing columns, adding or removing rows, pivoting, or depivoting.

3. The system of claim 1 wherein the first signature comprises a hash corresponding to at least a portion of the first set of operations.

4. The system of claim 1 wherein the first signature comprises an order independent grouping of representations of at least a portion of the first set of operations.

5. The system of claim 1 wherein determining the match between the first signature and the second signature comprises determining an overlap between at least a portion of the first graph structure corresponding to the first operation signature and at least a portion of the second graph structure corresponding to the second operation signature.

6. The system of claim 1 wherein determining the match between the first signature and the second signature comprises:
manipulating the second signature to determine an equivalent operation signature; and
comparing the equivalent signature against the first signature.

7. The system of claim 6 wherein the equivalent signature is determined at least in part by performing an operator push down on the second signature.

8. The system of claim 1 wherein the representation of the second set of data comprises a data traversal program, and wherein the one or more processors are configured to re-generate the second set of data at least in part by executing the data traversal program.

9. The system of claim 1 wherein instructing the user interface to present output based at least in part on the re-generated second set of data comprises displaying, by the user interface, at least a portion of the re-generated second set of data.

10. The system of claim 1 wherein instructing the user interface to present output based at least in part on the re-generated second set of data comprises exporting at least a portion of the re-generated second set of data.

11. A method, comprising:
receiving, from a user interface, a first set of operations to be applied in a sequential order to one or more sets of data;
transforming, by the first set of operations, a first set of data among the one or more sets of data, to generate a resulting data set that is different from the one or more input sets of data;
caching a representation of the second set of data to re-generate the resulting data set;
caching a first signature corresponding at least in part to a first graph structure of the first set of operations, and the second set of data;
receiving, from the user interface, a second set of operations to be applied in a sequential order to one or more sets of data;
generating a second signature corresponding at least in part to a second graph structure of the second set of operations;
regenerating the second set of data based on the cached representation, in response to determining a match between at least a portion of the first graph structure corresponding to the first signature and at least a portion of the second graph structure corresponding to the second signature; and
instructing the user interface to present output based at least in part on the regenerated second set of data.

12. The method of claim 11 wherein the first set of operations comprises at least one of clustering, joining, appending, sorting, uppercase, lowercase, filtering, deduplicating, grouping by, adding or removing columns, adding or removing rows, pivoting, or depivoting.

13. The method of claim 11 wherein the first signature comprises a hash corresponding to at least a portion of the first set of operations.

14. The method of claim 11 wherein the first signature comprises an order independent grouping of representations of at least a portion of the first set of operations.

15. The method of claim 11 wherein determining the match between the first signature and the second signature comprises determining an overlap between at least a portion of the first graph structure corresponding to the first operation signature and at least a portion of the second graph structure corresponding to the second operation signature.

16. The method of claim 11 wherein determining the match between the first signature and the second operation comprises:
manipulating the second signature to determine an equivalent operation signature; and
comparing the equivalent signature against the first signature.

17. The method of claim 16 wherein the equivalent signature is determined at least in part by performing an operator push down on the second signature.

18. The method of claim 11 wherein the representation of the second set of data comprises a data traversal program, and wherein the one or more processors are configured to re-generate the second set of data set at least in part by executing the data traversal program.

19. The method of claim 11 wherein instructing the user interface to present output based at least in part on the re-generated second set of data comprises displaying, by the user interface, at least a portion of the re-generated second set of data.

20. The method of claim 11 wherein instructing the user interface to present output based at least in part on the re-generated second set of data comprises exporting at least a portion of the re-generated second set of data.

21. A computer program product embodied in a non-transitory computer readable storage medium and comprising one or more instructions executable by a processor to:

receiving, from a user interface, a first set of operations to be applied in a sequential order to one or more sets of data;

transforming, by the first set of operations, a first set of data among the one or more sets of data, to generate a resulting data set that is different from the one or more input sets of data;

caching a representation of the second set of data to re-generate the resulting data set;

caching a first signature corresponding at least in part to a first graph structure of the first set of operations, and the second set of data;

receiving, from the user interface, a second set of operations to be applied in a sequential order to one or more sets of data;

generating a second signature corresponding at least in part to a second graph structure of the second set of operations;

regenerating the second set of data based on the cached representation, in response to determining a match between at least a portion of the first graph structure corresponding to the first signature and at least a portion of the second graph structure corresponding to the second signature; and instructing the user interface to present output based at least in part on the regenerated second set of data.

* * * * *